United States Patent [19]
Belo

[11] Patent Number: 5,379,428
[45] Date of Patent: Jan. 3, 1995

[54] HARDWARE PROCESS SCHEDULER AND PROCESSOR INTERRUPTER FOR PARALLEL PROCESSING COMPUTER SYSTEMS

[75] Inventor: David G. Belo, Lake Forest, Calif.

[73] Assignee: Belobox Systems, Inc., Irvine, Calif.

[21] Appl. No.: 12,505

[22] Filed: Feb. 1, 1993

[51] Int. Cl.⁶ .................................................. G06F 9/46
[52] U.S. Cl. ............................. 395/650; 364/DIG. 1;
 364/281.8; 364/228.7; 364/230.1; 364/231.6
[58] Field of Search ................. 395/650, 700, 200;
 364/DIG. 1 MS File

[56] References Cited

U.S. PATENT DOCUMENTS

| | | | |
|---|---|---|---|
| 4,325,120 | 4/1982 | Colley et al. | 364/DIG. 1 |
| 4,387,427 | 6/1983 | Cox et al. | 364/DIG. 1 |
| 4,642,756 | 2/1987 | Sherrod | 364/DIG. 1 |
| 4,779,194 | 10/1988 | Jennings et al. | 364/DIG. 1 |
| 4,794,526 | 12/1988 | May et al. | 395/650 |
| 4,829,425 | 5/1989 | Bain, Jr. et al. | 364/DIG. 1 |
| 4,985,831 | 1/1991 | Dulong et al. | 364/DIG. 1 |
| 5,261,053 | 11/1993 | Valencia | 395/200 |
| 5,287,508 | 2/1994 | Hejna, Jr. et al. | 395/650 |

Primary Examiner—Thomas M. Heckler
Attorney, Agent, or Firm—Knobbe, Martens, Olson & Bear

[57] ABSTRACT

A general-purpose device for scheduling and dispatching processes having variable processing priorities in parallel processing computer systems having multiple processors. The device comprises a plurality of cluster schedulers for scheduling processes on processor clusters and a processor interrupter for interrupting the processors. The cluster scheduler has an insert register queue that queues processes for execution on the processors. The cluster scheduler outputs the most significant process priority number awaiting execution. Processors access the cluster scheduler output in order to determine the next process to execute. The processor interrupter is initiated by the cluster scheduler whenever a new process is queued by the cluster scheduler. The processor interrupter compares the priority number of the active processes executing on the processors with the cluster scheduler output, and interrupts the processor if it is executing a process with a priority number of lesser value than the cluster scheduler output.

9 Claims, 38 Drawing Sheets

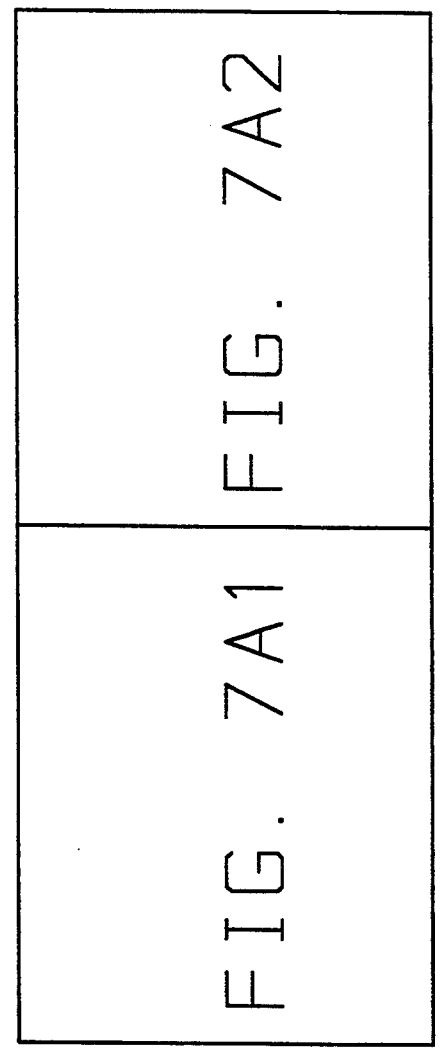

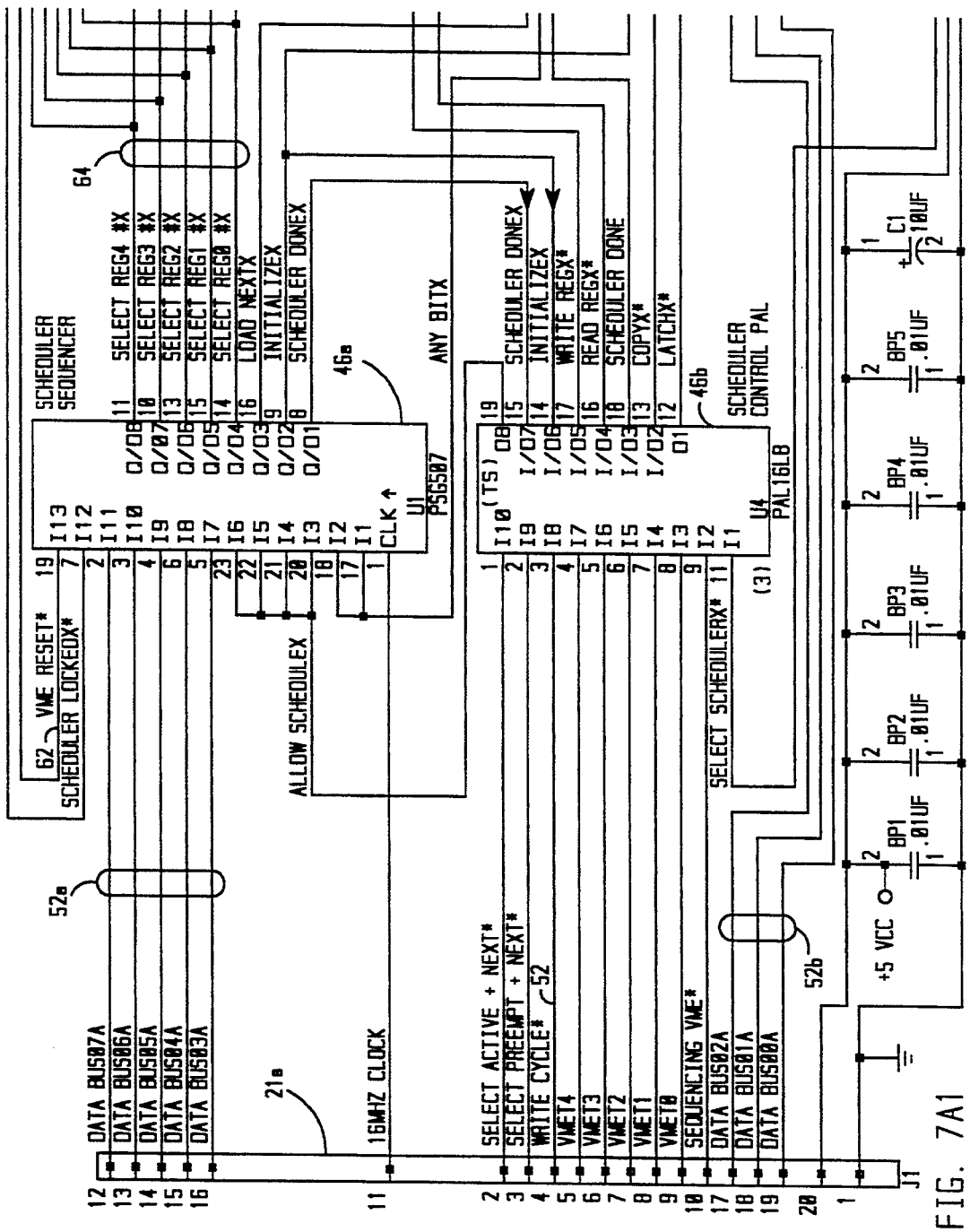
FIG. 7A1

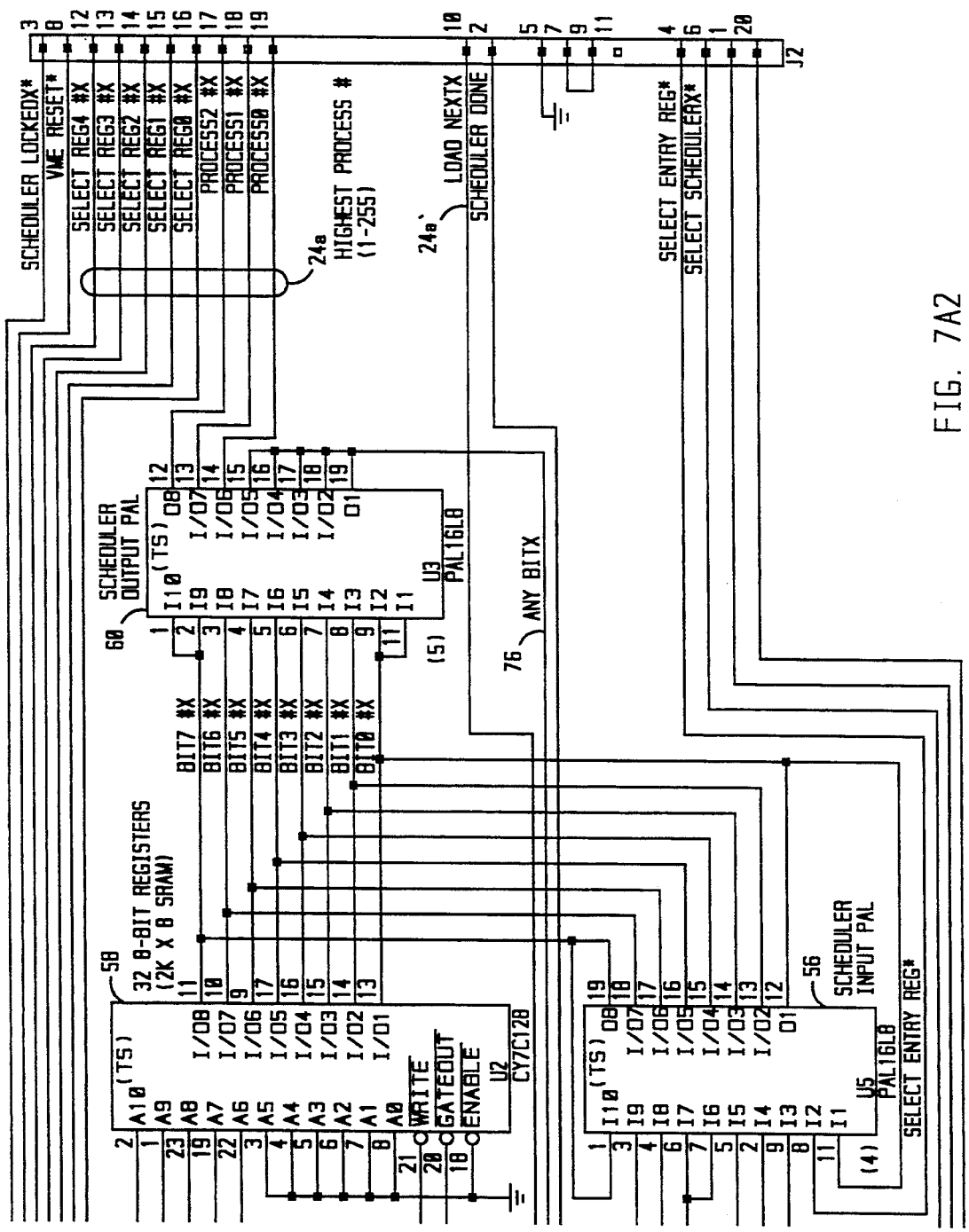
FIG. 7A2

FIG. 7B1
FIG. 7B2
SCHEDULER INPUT PAL
56

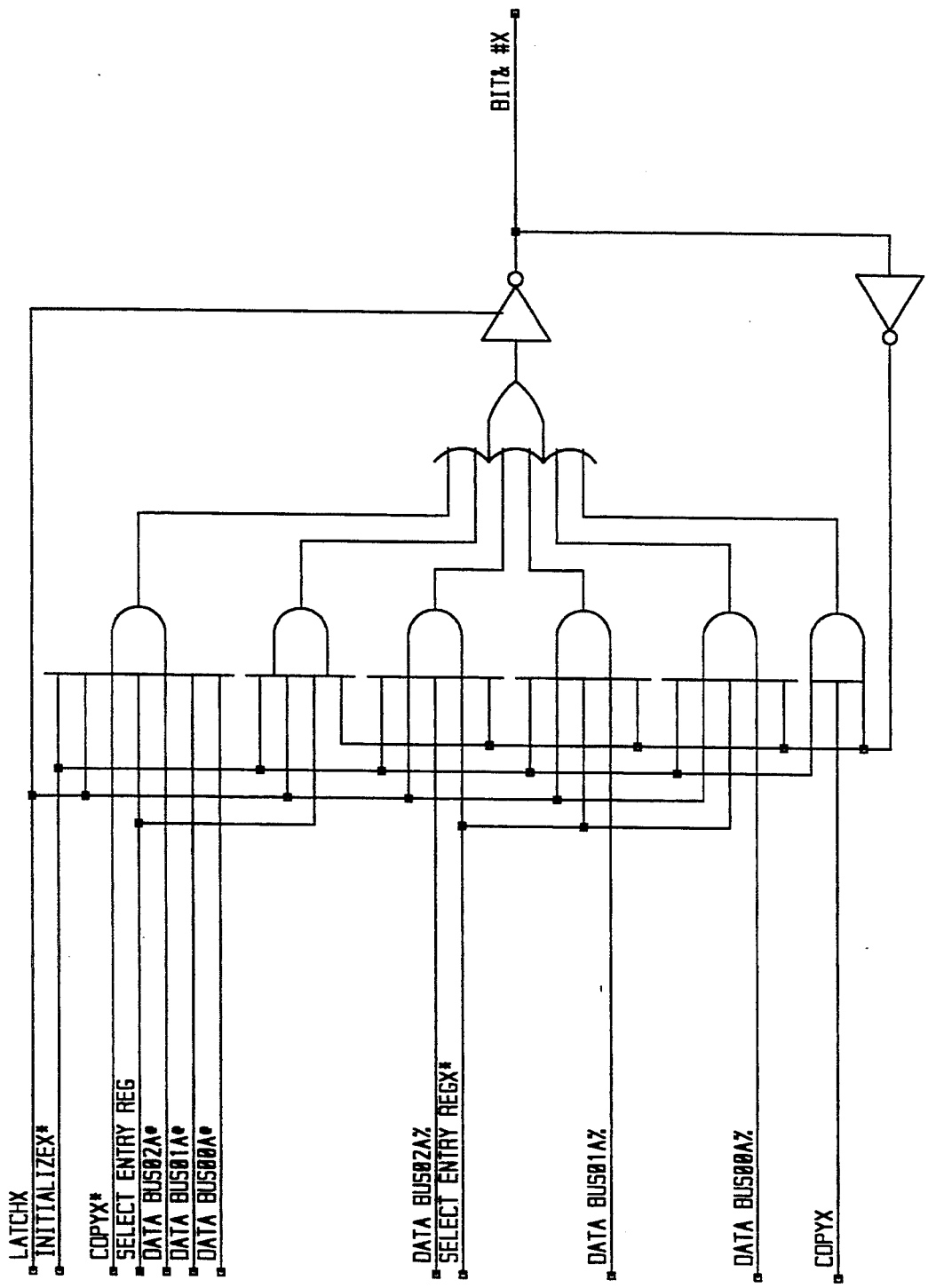
FIG. 7B1

| BIT # | DATA BUS02* | DATA BUS01* | DATA BUS00* | DATA BUS02% | DATA BUS01% | DATA BUS00% | BIT& #X |
|---|---|---|---|---|---|---|---|
| 0 | DATA BUS02* | DATA BUS01* | DATA BUS00* | DATA BUS02 | DATA BUS01 | DATA BUS00 | BIT0 #X |
| 1 | DATA BUS02* | DATA BUS01* | DATA BUS00 | DATA BUS02 | DATA BUS01 | DATA BUS00* | BIT1 #X |
| 2 | DATA BUS02* | DATA BUS01 | DATA BUS00* | DATA BUS02 | DATA BUS01* | DATA BUS00* | BIT2 #X |
| 3 | DATA BUS02* | DATA BUS01* | DATA BUS00* | DATA BUS02* | DATA BUS01* | DATA BUS00* | BIT3 #X |
| 4 | DATA BUS02 | DATA BUS01* | DATA BUS00 | DATA BUS02* | DATA BUS01 | DATA BUS00 | BIT4 #X |
| 5 | DATA BUS02 | DATA BUS01* | DATA BUS00* | DATA BUS02* | DATA BUS01 | DATA BUS01* | BIT5 #X |
| 6 | DATA BUS02 | DATA BUS01 | DATA BUS00* | DATA BUS02* | DATA BUS01* | DATA BUS00 | BIT6 #X |
| 7 | DATA BUS02 | DATA BUS01 | DATA BUS00 | DATA BUS02* | DATA BUS01* | DATA BUS01* | BIT7 #X |

SCHEDULER CONTROL PAL

46b

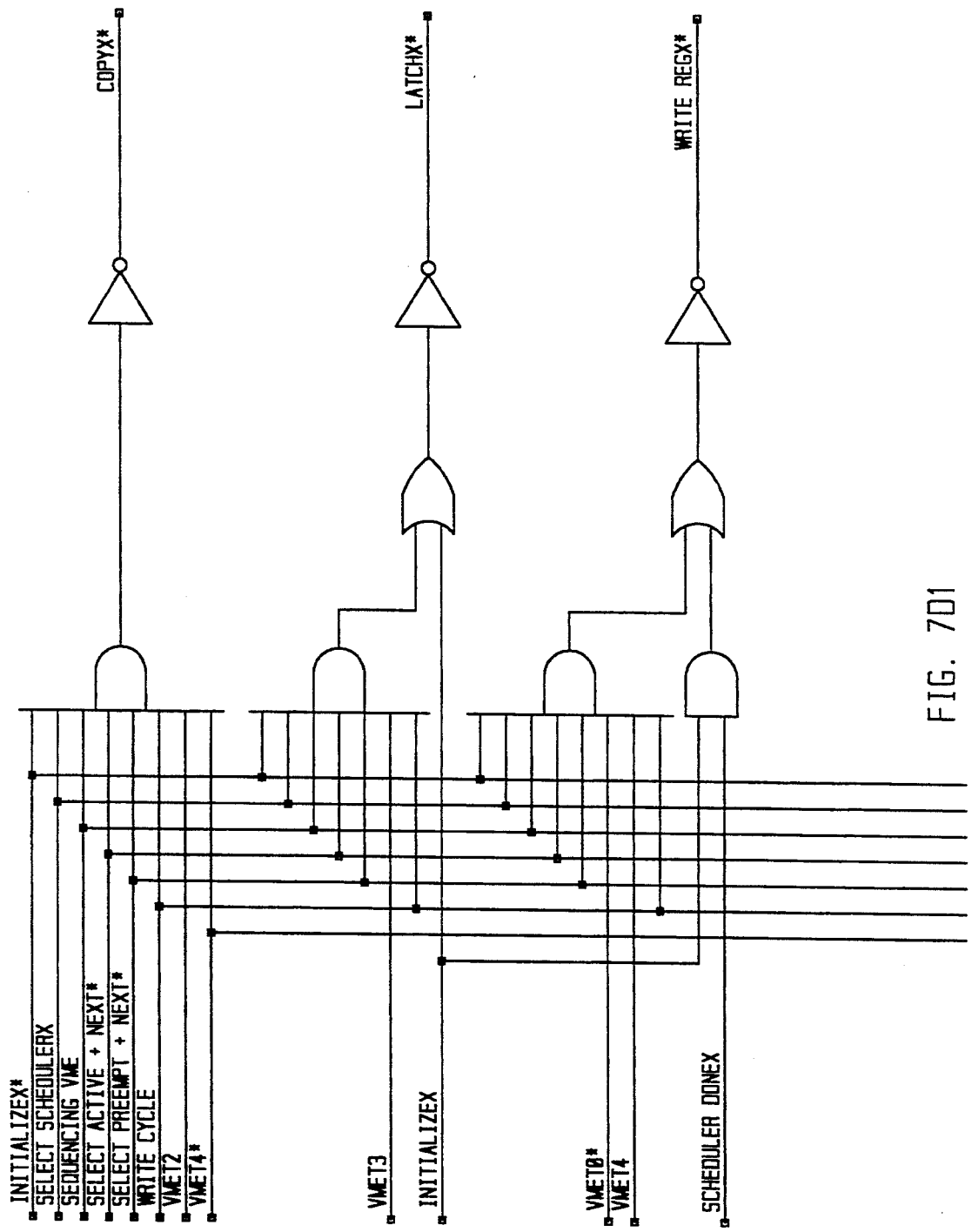
FIG. 7D1

PROCESSOR INTERRUPTER

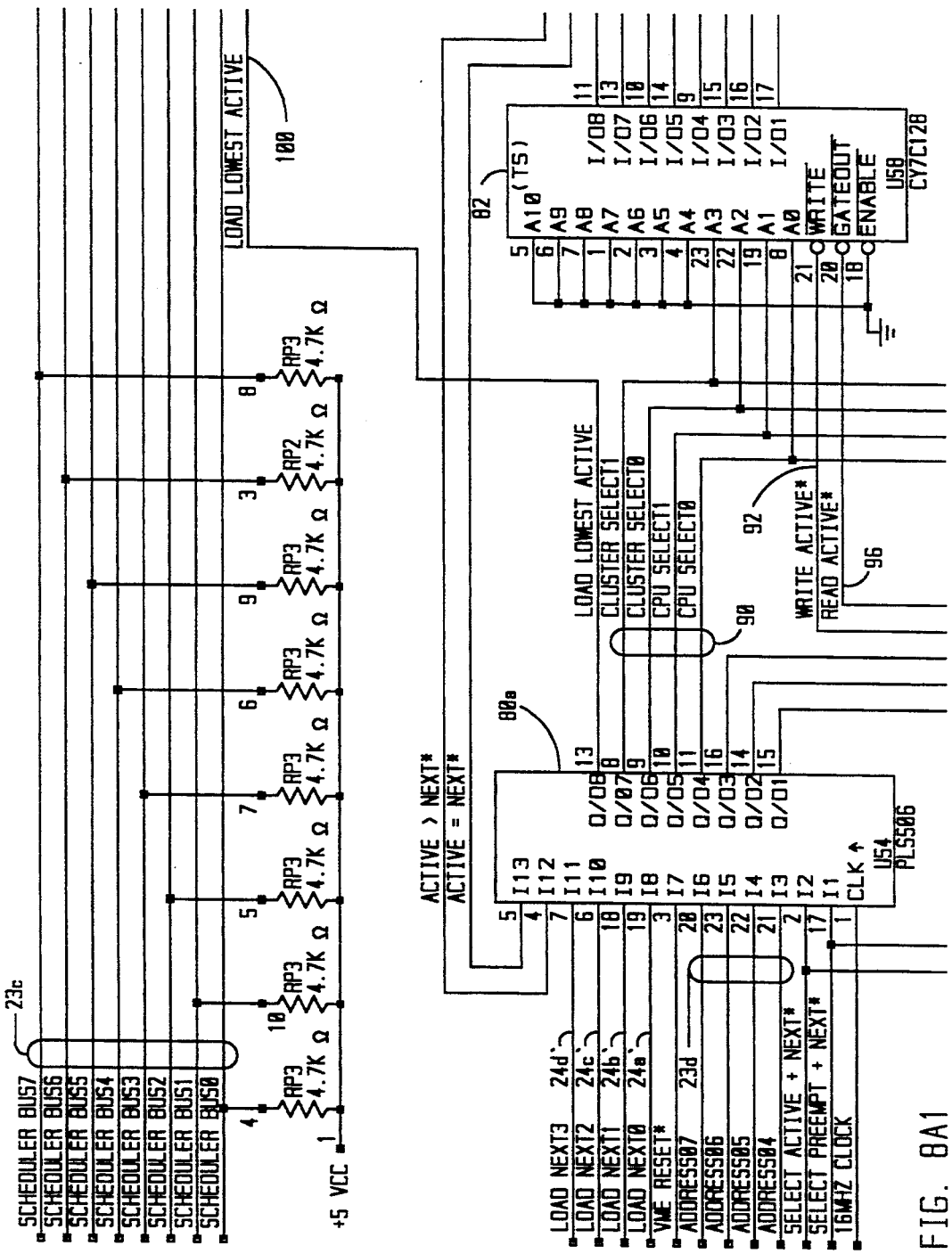
FIG. 8A1

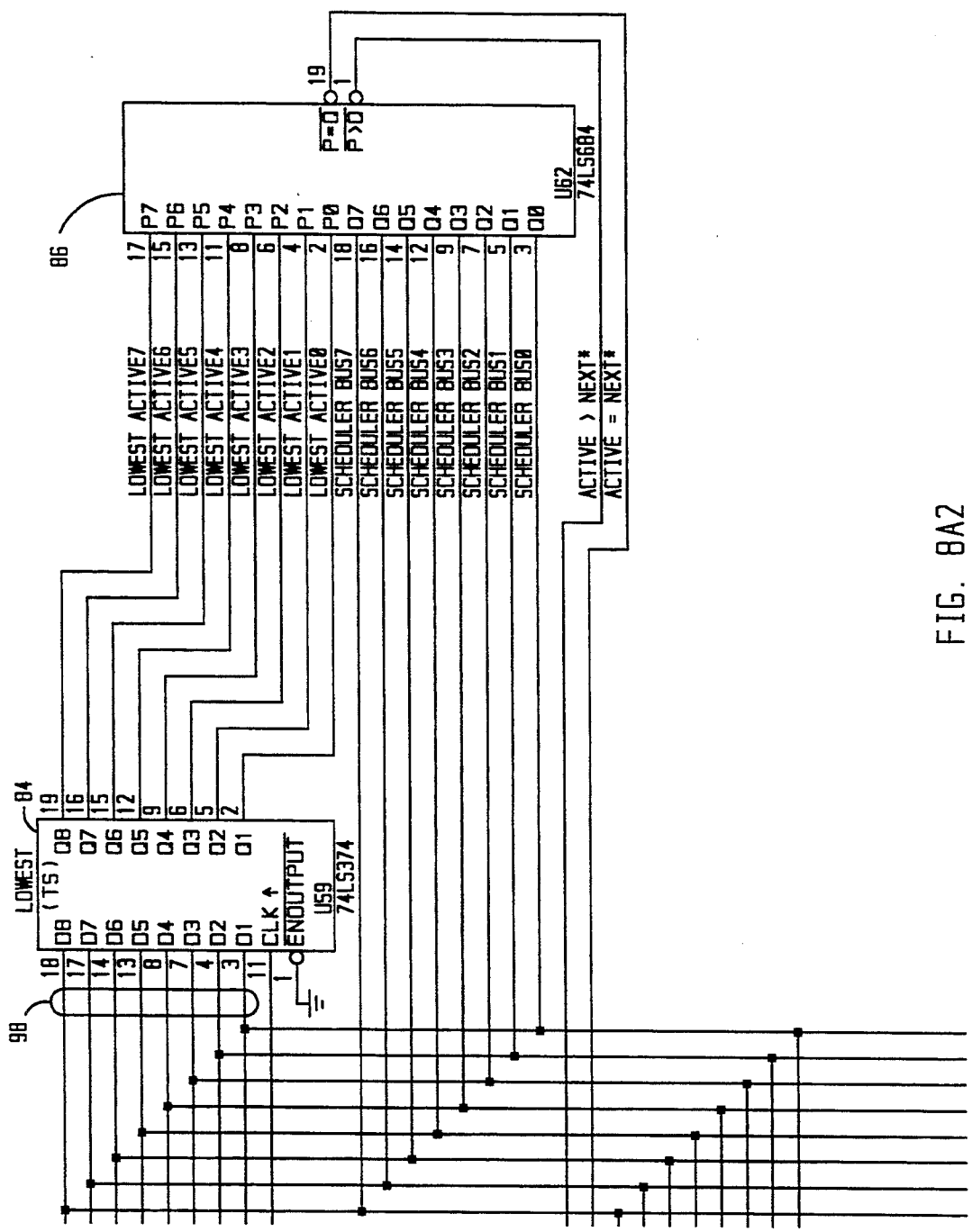
FIG. 8A2

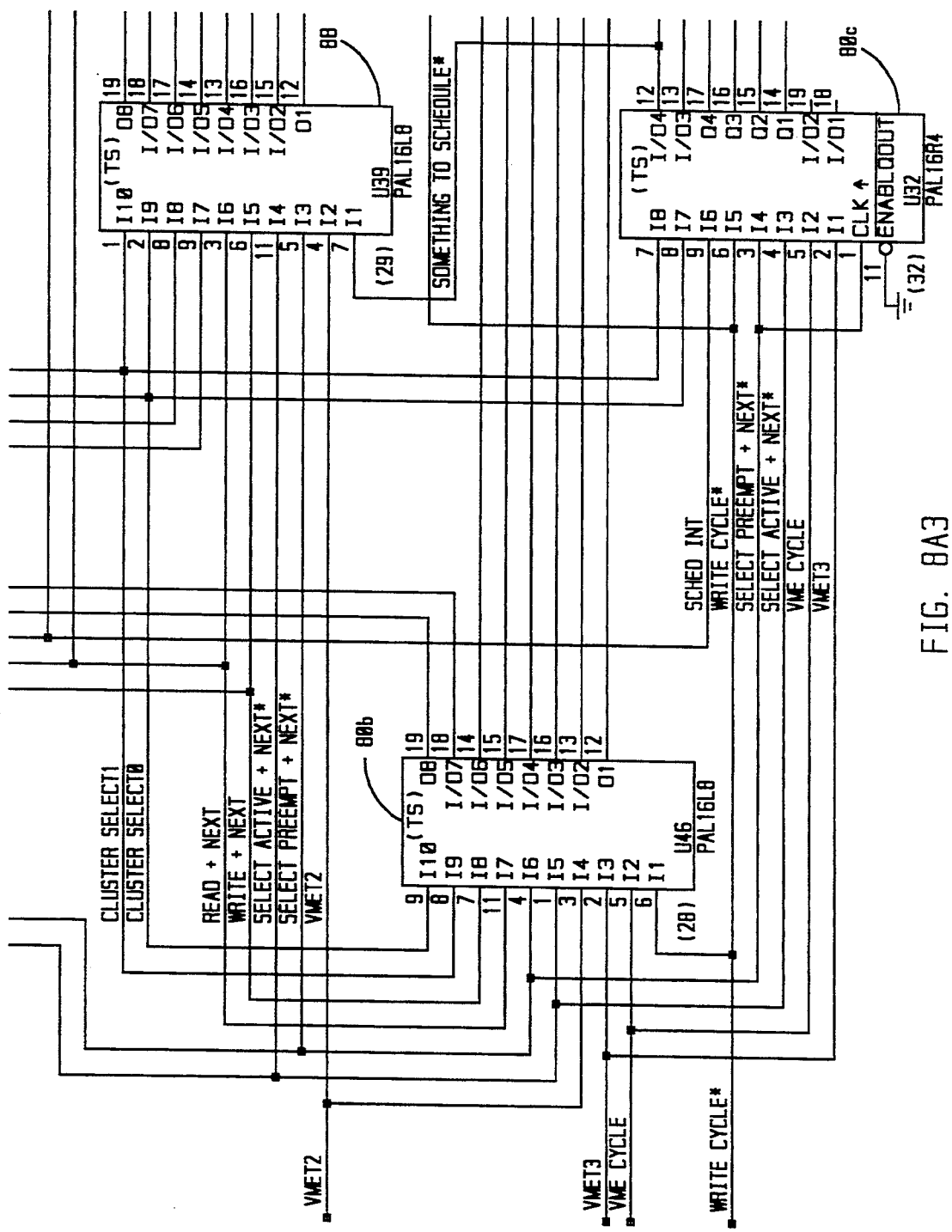
FIG. 8A3

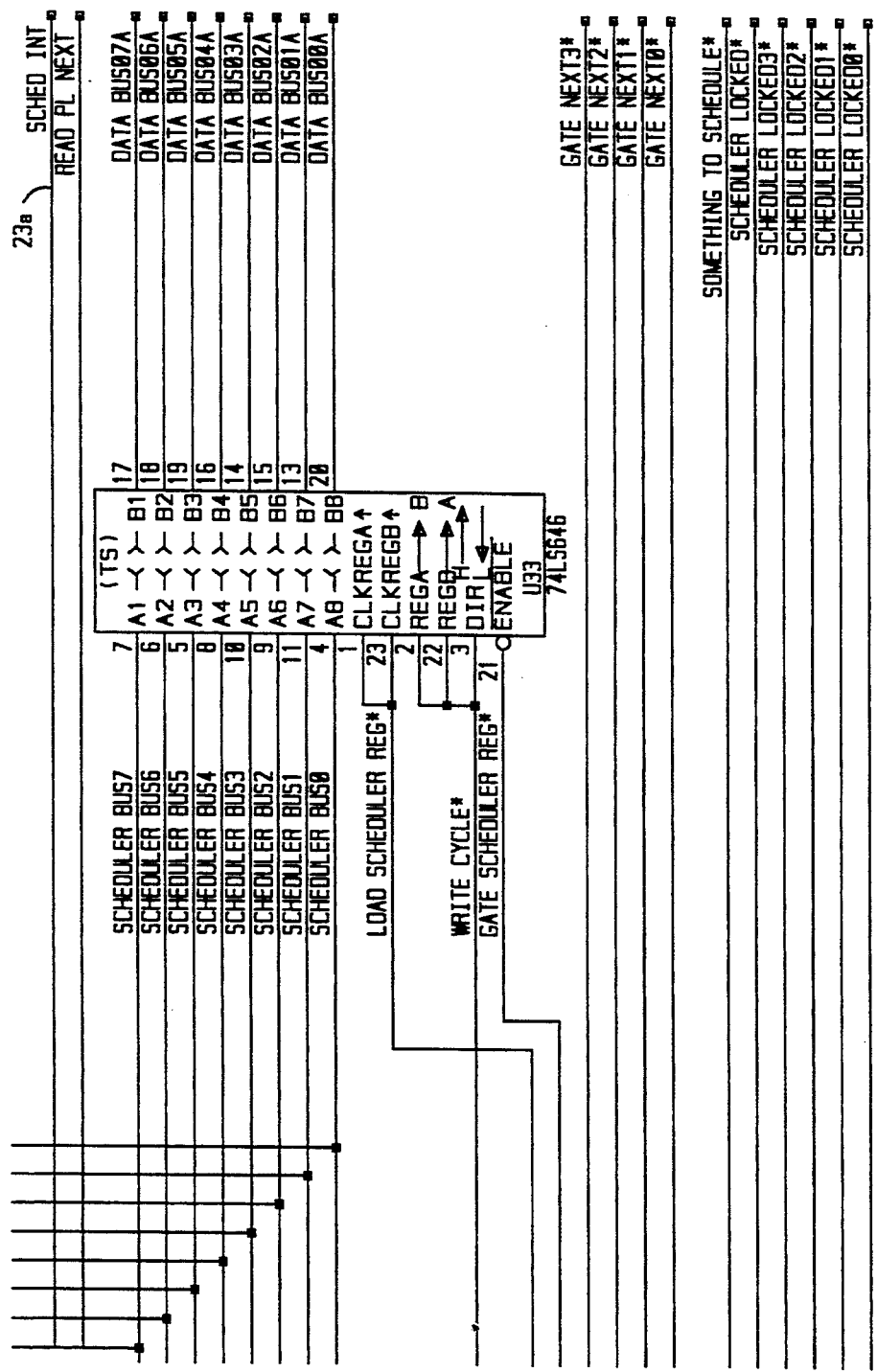
FIG. 8A4

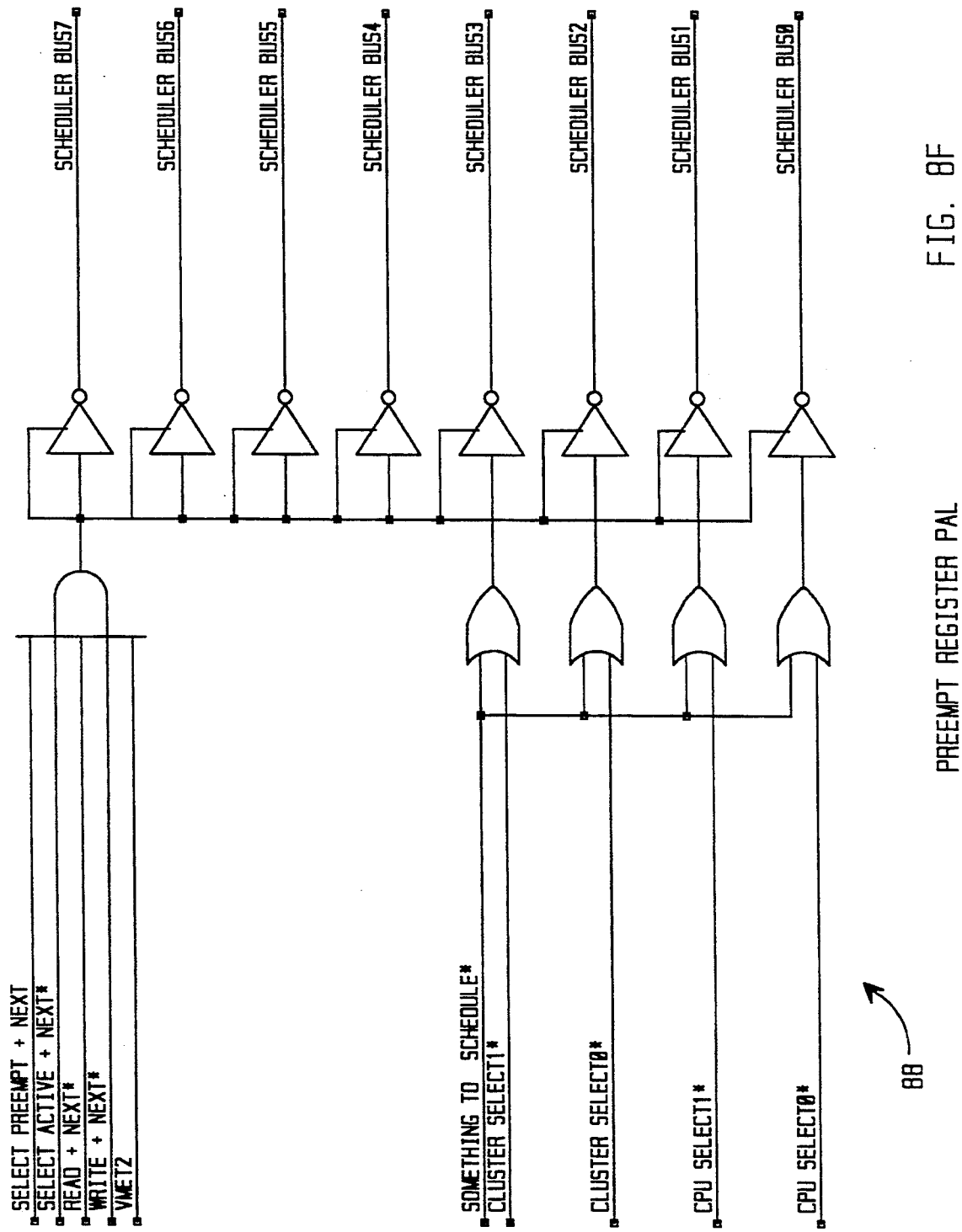

PREEMPTER CONTROL PAL

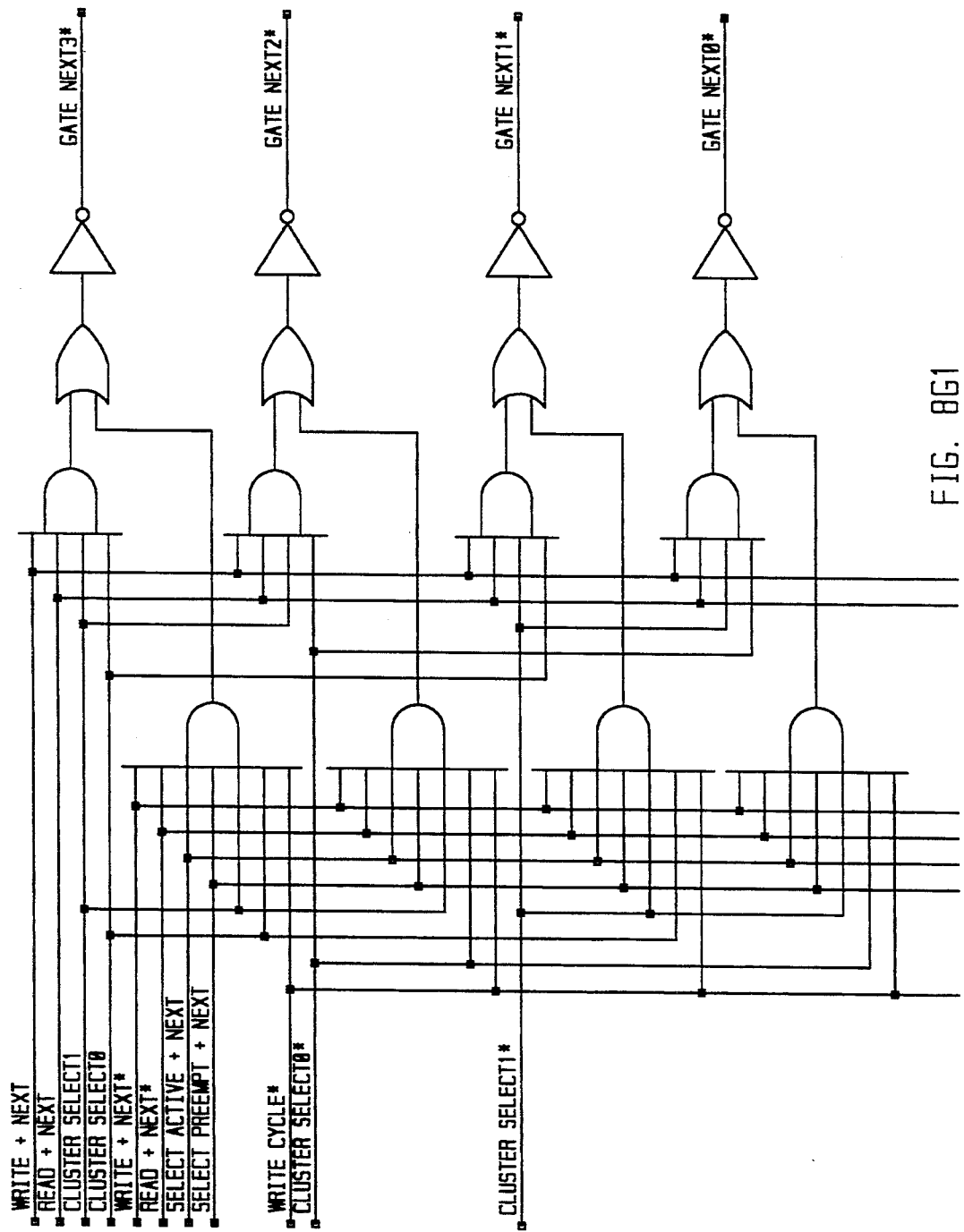
FIG. 8G1

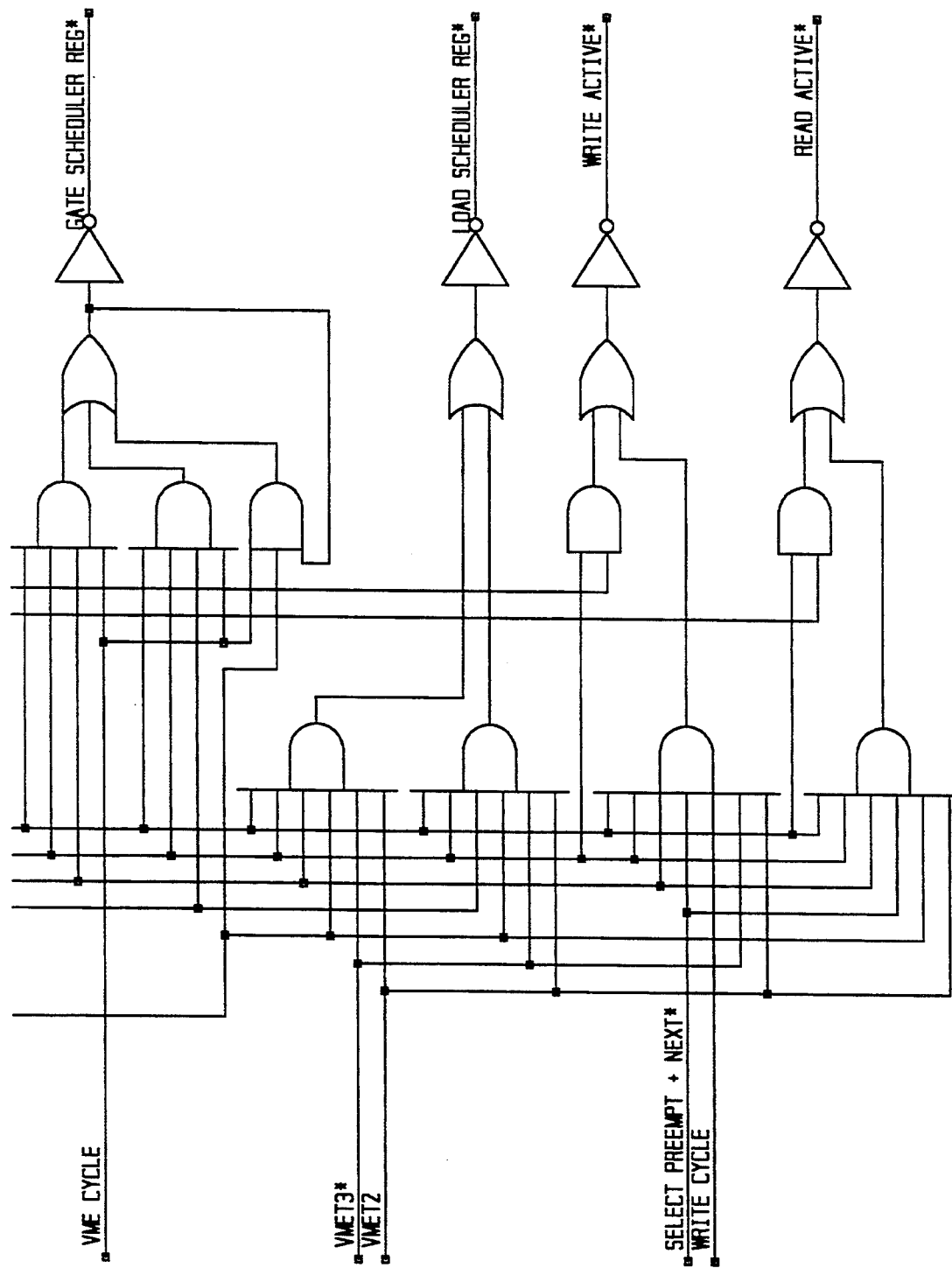
FIG. 8G2

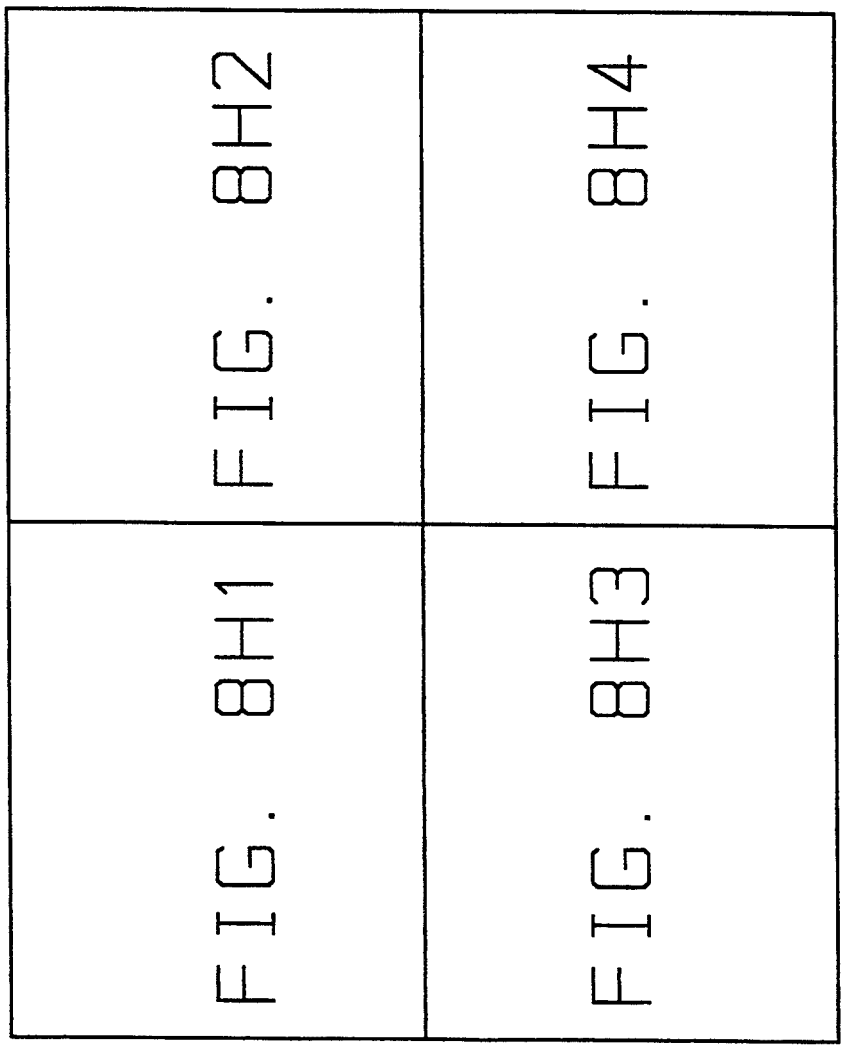

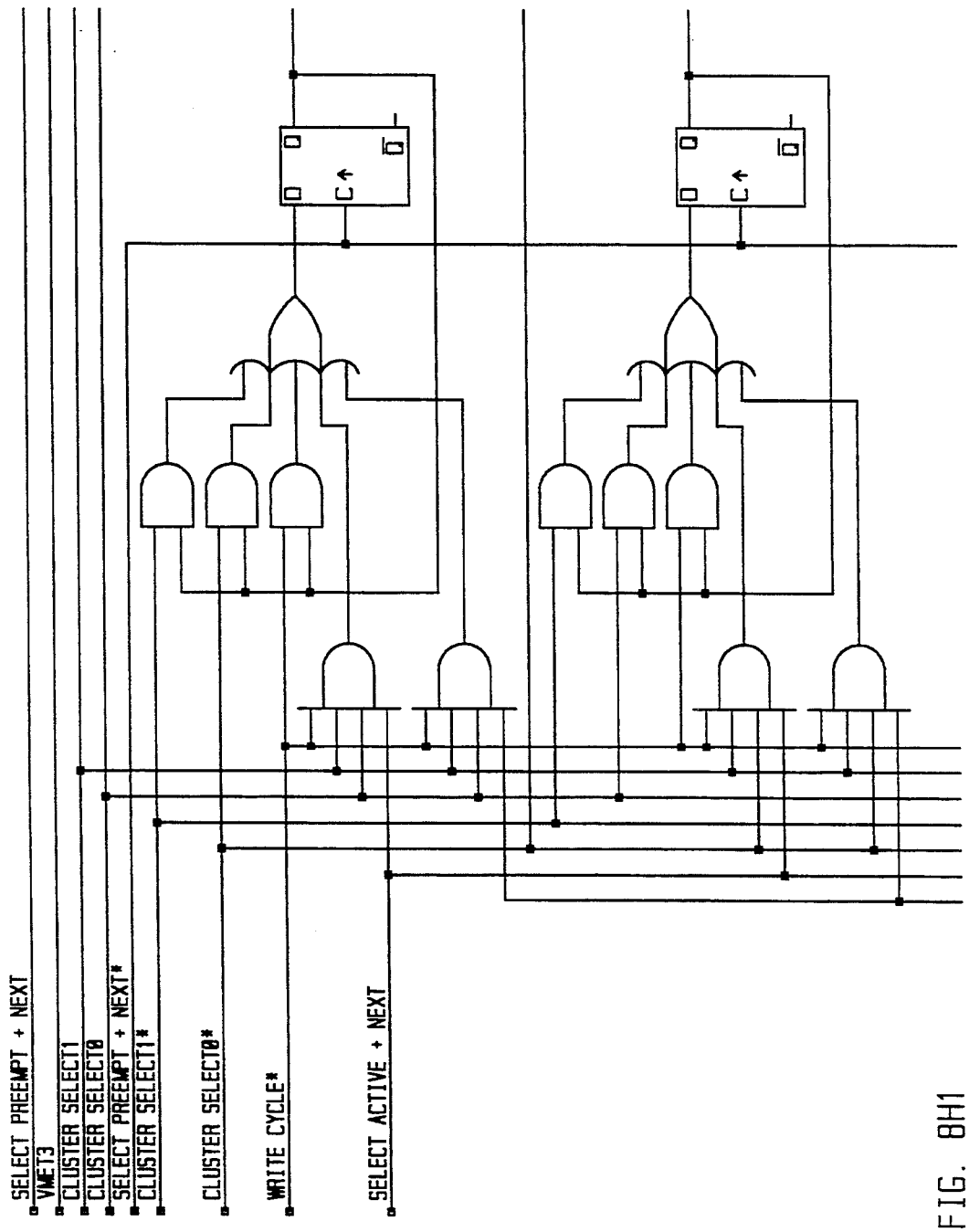
FIG. 8H1

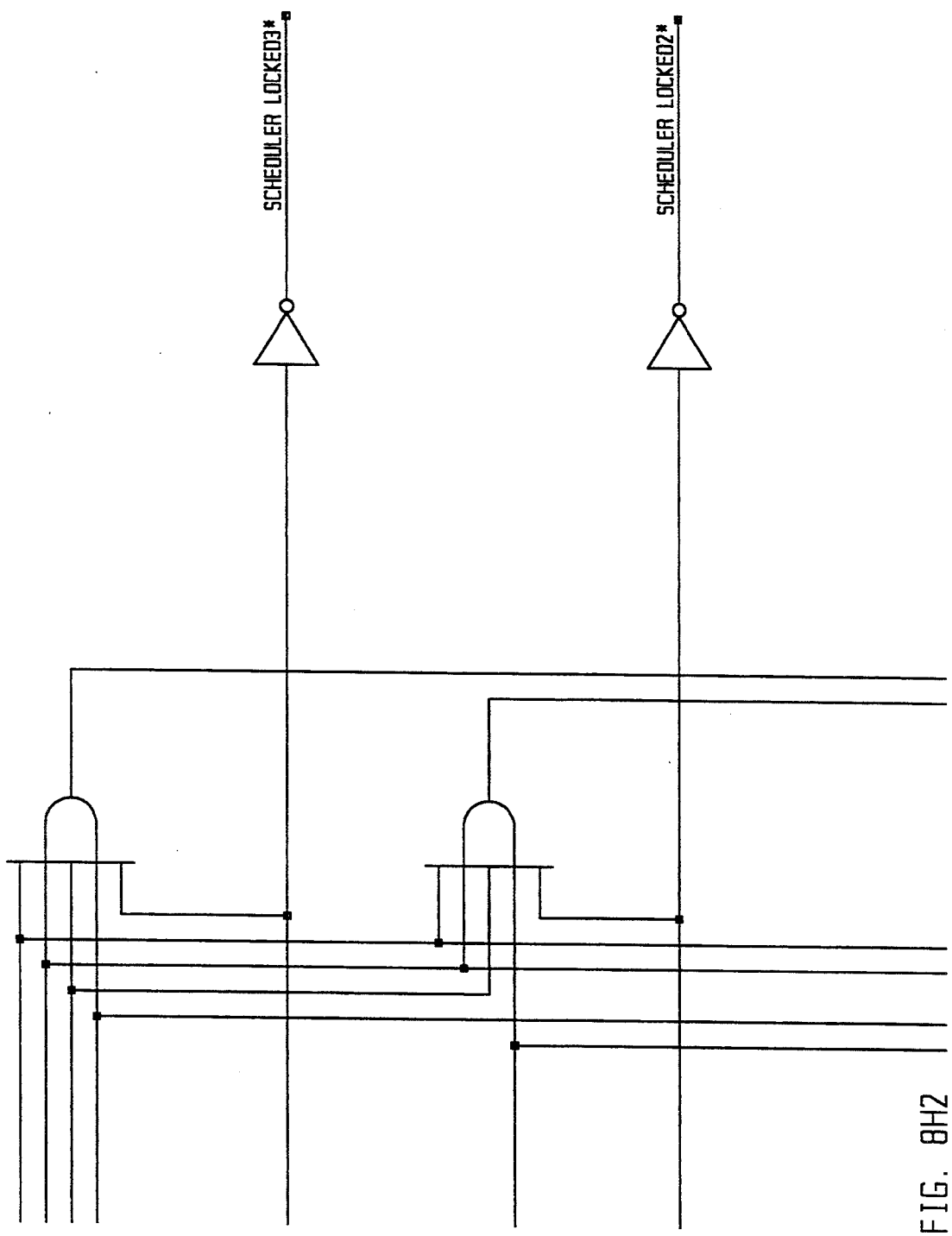
FIG. 8H2

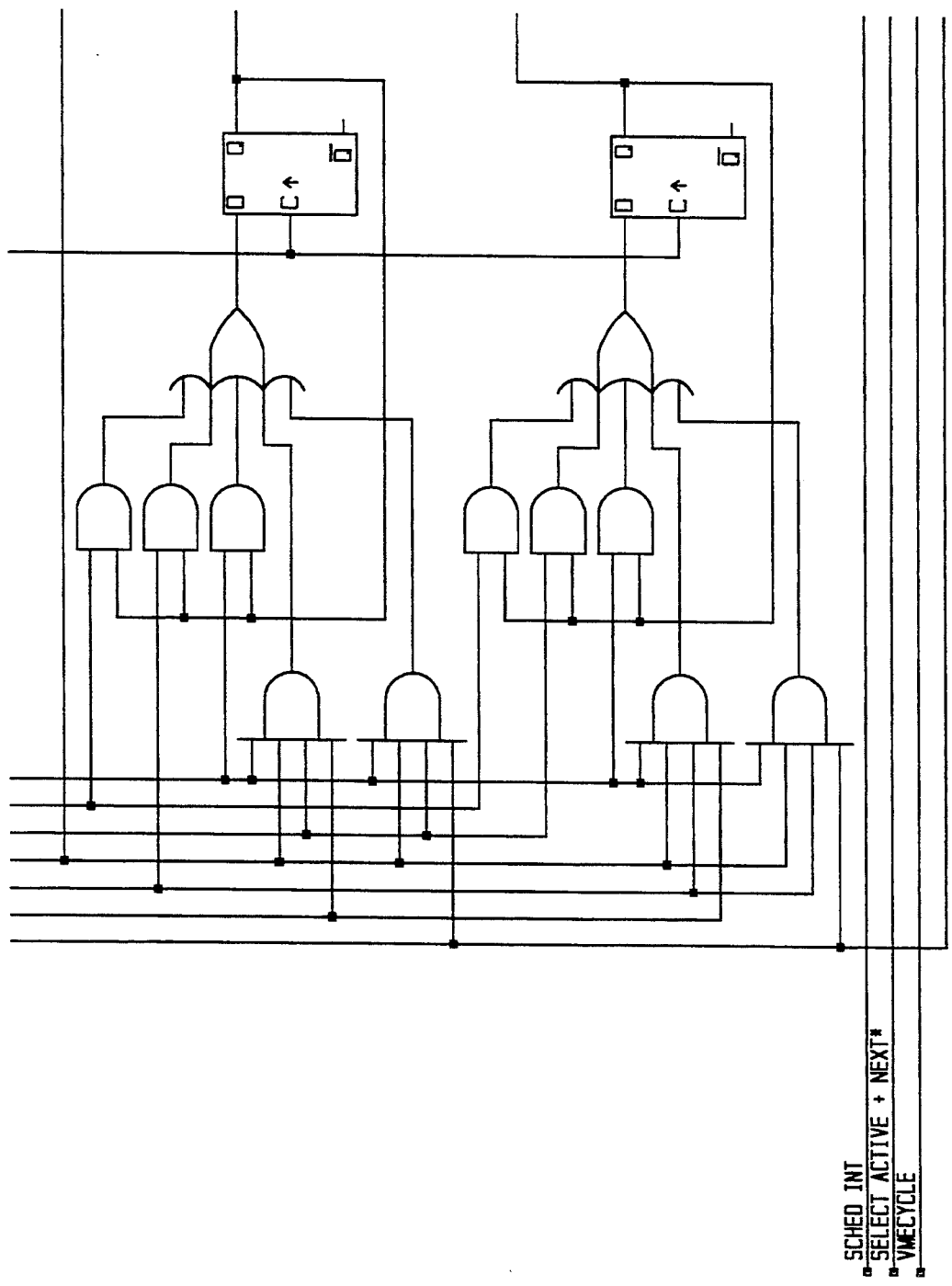
FIG. 8H3

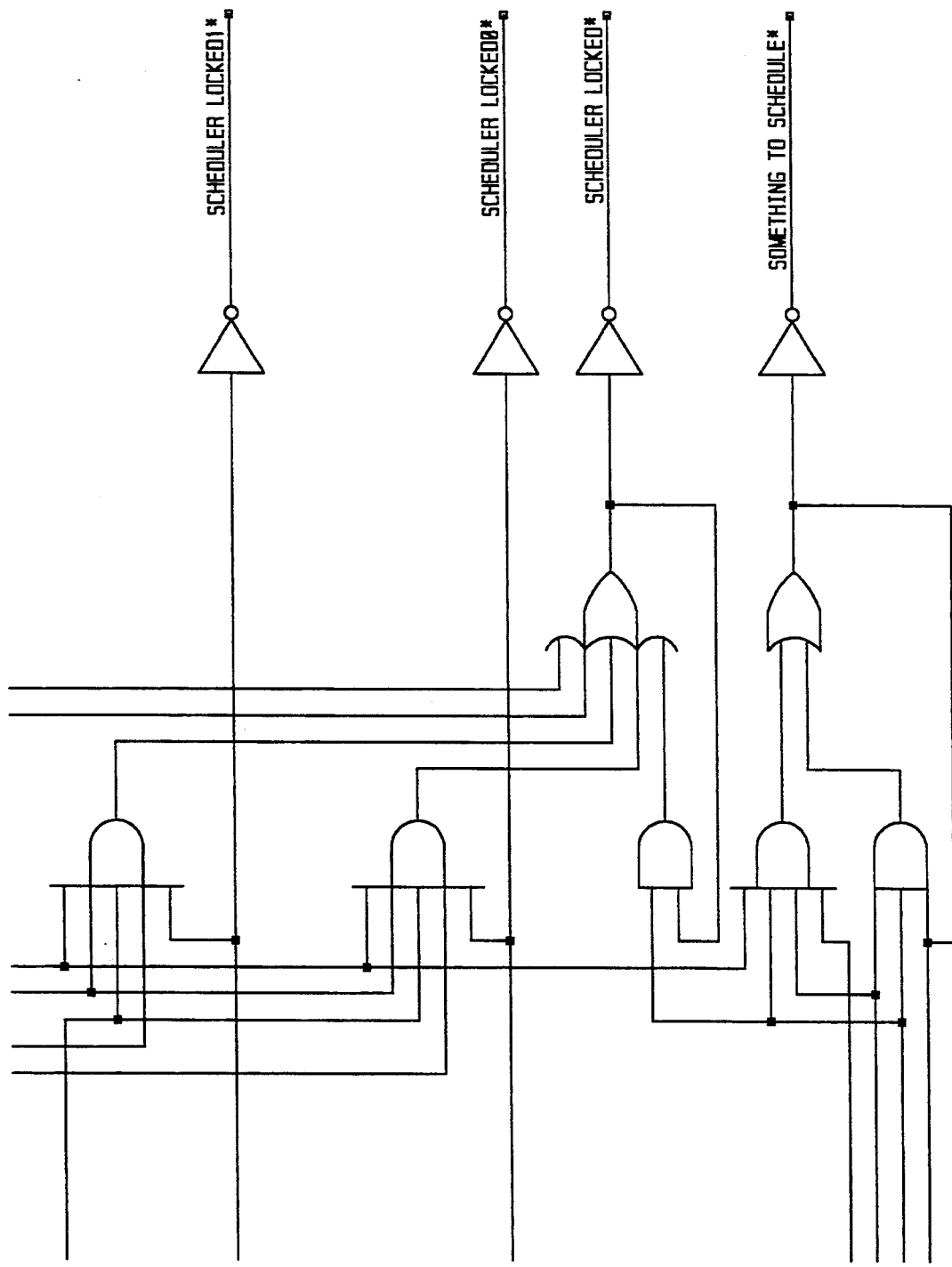
FIG. 8H4

HARDWARE PROCESS SCHEDULER AND PROCESSOR INTERRUPTER FOR PARALLEL PROCESSING COMPUTER SYSTEMS

BACKGROUND OF THE INVENTION

1. Field of the Invention

The present invention relates, in general, to data processing systems and, more particularly, to the scheduling and dispatching of processes in parallel processing computer systems.

2. Description of the Related Technology

Parallel processing systems are able to execute two or more computer programs or processes simultaneously. In a parallel processing architecture, general-purpose multiprocessors are organized to cooperatively work together to execute multiple processes simultaneously. Although a variety of types of parallel processing architectures exist, it is traditional to classify parallel processing architectures into two broad categories: Single Instruction Multiple Data (SIMD) and Multiple Instruction Multiple Data (MIMD).

SIMD computers execute the same instruction on multiple data values simultaneously. It is well known in the art to implement SIMD computers using an array processor capable of operating on large two-dimensional matrices of data values in parallel by simultaneously applying the same operation to every element. SIMI) machines are well suited for performing matrix calculations necessary in finite-element analysis. SIMD machines have been used to perform seismic modeling, atmospheric modeling, and image processing calculations.

In contrast, MIMD computers use multiple processors executing different processes or sub-processes on different sets of data. For the following reasons, communication between multiple processors in a MIMD machine is crucial. First, if two or more processors execute sub-processes of the same process, facilities must be provided for coordinating the results obtained by the different processors. Second, the MIMD machine must be capable of assigning processes awaiting execution to available processors. Third, in systems using a process hierarchy, where some processes have higher processing priority than others, a facility must be provided to ensure that processors execute only the highest priority processes awaiting execution.

For example, some processes may require "real-time" processing, while others may not. In such a system, a process hierarchy may be established whereby real-time processes are assigned higher priority numbers than processes not requiring real-time execution. MIMD machines using a process hierarchy must have a facility for assigning the highest priority processes awaiting execution to either the next available processor, or, if there are no processors available, to a processor executing a lower priority process. Accordingly, MIMD machines using a process hierarchy must be capable of scheduling processes for execution, and interrupting processors executing lower priority processes than the processes scheduled for execution.

In parallel processing machines of the prior art, process scheduling is a complicated and processing intensive task. The more processors or processing systems used, the more complicated scheduling becomes. The goal of process scheduling, in general, is to ensure that the most important processes are always executed first. Accordingly, if a processor is executing a process of lower priority or significance than other processes awaiting execution, the process scheduler should interrupt that processor and cause it to execute the more important process.

It is well known in the art to implement schedulers in software. Software schedulers interrupt processors to determine whether those processors are performing the highest priority process possible. Software schedulers are used in systems having a central control unit; typically the software scheduler is stored in a central memory and executes on a central processing unit. Software implemented schedulers are exemplified by U.S. Pat. Nos. 3,496,551 and 3,348,210. Software schedulers of the prior art suffer from several disadvantages. First, software schedulers of the prior art perform poorly in multiprocessing systems that process a number of asynchronous events. A common example of an application requiring processing of many asynchronous events is a flight tester. Software schedulers are inadequate for scheduling processes in this environment because too many asynchronous events cause continuous processor interruption, which in turn causes the processors to spend more time scheduling and less time executing useful programs.

A second disadvantage of software schedulers of the prior art occurs when the schedulers enter a "thrash mode". "Thrashing" occurs when the software scheduler fails to take into account higher priority processes needing to be scheduled during the course of scheduling a previous process awaiting execution. In these thrashing situations, the scheduling time can exceed 50% of the process execution time (the time a processor is actually executing a process). A third disadvantage of software schedulers of the prior art is system processing speed. Because software schedulers of the prior art are programs having instructions which must be executed sequentially, the prior art schedulers execute slowly. Slow scheduler execution time adversely affects systems which must process instructions in real-time. Another disadvantage of software schedulers of the prior art is development cost. Software schedulers suffer from the high costs of control programming necessary to support scheduler operation. Complicated process scheduling programs are necessary to perform complex multiprocessing operations. Therefore, the development costs associated with software process schedulers of the prior art are significant. Furthermore, as the software process scheduler becomes more complex, the more difficult it is to maintain, and the more unreliable the multiprocessing system becomes. Finally, software schedulers do not take advantage of the improvements made in very large-scale integrated (VLSI) circuit technology.

It is also well known in the prior art to implement process schedulers in firmware. Firmware process schedulers use special-purpose micro-programmed controllers to perform scheduling and dispatching operations. Firmware process schedulers are exemplified by U.S. Pat. Nos. 4,011,545, 3,959,775, and 3,896,418. The disadvantage of the firmware implemented process schedulers of the prior art is a lack of flexibility. Firmware process schedulers also lack general purpose application because they are typically designed to execute special-purpose tasks. Another disadvantage of firmware schedulers is that they do not allow for execution of "multi-threaded" processes; i.e. processes which run on several processors simultaneously.

Process schedulers have also been implemented in hardware. Hardware process schedulers are exemplified by U.S. Pat. No. 4,387,427. Hardware schedulers suffer from various disadvantages. First, as with firmware solutions, hardware schedulers also lack flexibility. For example, in the referenced patent, processes must first be assigned complex access descriptors in order to gain access to available processors. Second, hardware schedulers are typically only able to schedule synchronous events because they lack the necessary mechanisms for effectively communicating between asynchronous operations. Another disadvantage of hardware schedulers is that they do not allow for flexible process hierarchies.

Therefore, the need has arisen for a hardware process scheduler that eliminates the use of scheduling software, provides for flexible process scheduling, ensures that all processors always execute the most important processes first, dispatches processes to processors quickly and efficiently, accommodates multiprocessing systems using process hierarchies, accommodates asynchronous processing, operates on real-time processes, takes advantage of advances in VLSI technology, permits multi-threaded process execution, and is easily and inexpensively implemented.

SUMMARY OF THE INVENTION

The above-mentioned needs are satisfied by the present invention which includes a hardware process scheduler and processor interrupter. The present invention provides a novel hardware scheduler that performs process scheduling without processor intervention. The present invention allows scheduling of software processes independent of application program execution. Briefly, in a system using the present invention, processes are assigned priority numbers by a system architect in accordance with system requirements. Processes of higher significance or importance are given higher priority numbers. For example, processes which require real-time execution may be assigned a high priority number, while "background" or "batch" processes may be assigned low priority numbers. The priority number associated with a process will determine how often a process is executed when processors become unavailable. Processes that are awaiting execution by a processor are hereinafter referred to as "waiting processes." Processes that are currently being executed by a processor are hereinafter referred to as "active processes."

Before a process is executed by a processor, the priority number associated with that process is input to an insert queue, or insert register, in the hardware scheduler. The insert register queues the priority numbers of all waiting processes. After a short time interval (in one preferred embodiment within one microsecond), the highest priority number of all the waiting process priority numbers in the insert register is produced by the hardware scheduler of the present invention. The hardware scheduler then signals the hardware interrupter to initiate. The hardware scheduler is accessible by all processors in the parallel processing system. When a processor becomes available to execute a process, it can then access the hardware scheduler to determine the next process to execute.

The hardware interrupter of the present invention maintains a record of the priority numbers of all the active processes currently executing on processors in the system. When initiated by the hardware scheduler, and without processor intervention, the hardware interrupter of the present invention compares the highest priority number of all the waiting processes with the lowest priority number of all the active processes that are currently executing on the group of requested processors. If the highest priority number of all the waiting processes is greater than the lowest priority number of all the active processes, the processor currently executing the lowest priority active process is interrupted.

Interrupting the processor causes the lowest priority active process, before suspending execution, to insert its priority number into the scheduler insert register for further scheduling. The highest priority waiting process is then executed on the interrupted processor. The highest priority process number is then written into the record of active process priority numbers maintained by the hardware interrupter. The interrupting process, now executing on the interrupted processor, then withdraws its priority number from the scheduler insert register. Withdrawing the priority number from the scheduler insert register causes the scheduler to schedule the waiting process having the highest priority number in the scheduler insert register. As before, this number is accessible by any processor in the system. This number informs all the processors in the system what the next highest priority waiting process is.

More specifically, the above needs are met by the present invention by using multiple hardware "cluster" schedulers and processor interrupters which schedule x number of processes across n number of processors grouped into y number of clusters, In one preferred embodiment of the present invention, there are one to four independent cluster schedulers serving one to four processor clusters, each cluster having one to four processors. Each cluster scheduler independently schedules processes for the processors in the cluster it serves. Therefore, cluster schedulers may be optionally installed in this embodiment of the present invention as the number of processors and processor clusters vary.

For example, in one preferred embodiment, there are four cluster schedulers serving four processor clusters, each having four processors. In this embodiment, the cluster schedulers each schedule up to 255 processes per cluster. Each process is capable of having priority numbers from 1 to 255 (1 is the lowest priority process, and 255 is the highest priority waiting process). Therefore, this preferred embodiment of the present invention is capable of scheduling 1020 processes across 16 processors.

In accordance with an aspect of the invention, one preferred embodiment, of the present invention uses a cluster scheduler having an insert register and a priority encoder. The insert register contains the priority numbers of all waiting processes awaiting execution on the processor cluster served by the cluster scheduler. When a process in the system requires execution, its priority number is inserted into the cluster scheduler insert register.

In one embodiment of the present invention, the cluster scheduler insert register is 255 bits long by 1 bit wide. Therefore, when a process requires execution on one of the processors served by a cluster scheduler, it writes the cluster scheduler and sets a bit in the insert register. The set bit in the insert register represents the priority number of the waiting process. A short interval of time thereafter, a binary representation of the highest process priority number awaiting execution will be produced at the output of the cluster scheduler. This number is provided by the priority encoder. At the same time, the cluster scheduler generates a signal to the processor interrupter. The signal is generated anytime a process inserts or withdraws a process priority number to/from the insert register. This causes the highest waiting process priority number to be latched into a register in the processor interrupter (described hereinafter as the "next register"). The next register is accessible by any processor in the parallel processing system. The next register indicates the process that should next be executed on an available processor.

The value in the next register is guaranteed to have the highest waiting process priority number. The operation of the cluster scheduler guarantees that a next register will not be read while the cluster scheduler is determining the next highest waiting process priority. In other words, the cluster scheduler prevents reading from the next register immediately after a new waiting process priority number is inserted into the insert register queue. Therefore, the hardware scheduler of the present invention prevents a processor from initiating a process while the cluster scheduler is scheduling. The processor must first wait until the scheduler has finished and loaded a next register.

The processor interrupter then compares the value just latched into the next register to the priority numbers of all the active processes currently being executed by the processors served by that cluster scheduler. In one preferred embodiment, the processor interrupter performs this comparison by first finding the lowest priority number of all the active processes executing on the processor cluster served by the requesting cluster scheduler. The processor interrupter then compares the highest waiting process priority number (latched into the next register) to the lowest active process priority number. If the highest waiting process priority number in the next register is equal to or lower than the priority numbers of all active processes currently executing on the processors in the cluster, no processor is interrupted. The waiting processes must continue to wait until a processor becomes available.

However, if the highest waiting process priority number in the next register is greater than the lowest active process priority number, the processor executing the lowest priority active process is interrupted, and the highest priority waiting process is dispatched to the interrupted processor for execution. The highest waiting process priority number is then withdrawn from the insert register in the cluster scheduler and written into the active process list maintained by the processor interrupter. The priority number of the interrupted process (the lowest active process priority number) is inserted into the insert register for future scheduling. Withdrawing a priority number from the insert register causes the cluster scheduler to once again produce the highest waiting process priority number, and latch it into the next register. The scheduling and interrupting process then cycles as discussed above.

In accordance with a further aspect of the invention, a cluster scheduler is activated by writing or withdrawing any valid process priority number into its insert register. To initiate process scheduling, a process therefore writes its priority number into the insert register of the cluster scheduler that schedules processes for the processor cluster requested. Typically, any processor may request that processes be executed on any processor in any cluster. Alternatively, multiprocessing systems using the present invention may be designed so that processes are designated to execute only on certain processor clusters. In such systems, a process writes its process priority number into the insert register of the cluster scheduler that serves the cluster designated to execute the process.

Soon thereafter, the cluster scheduler latches the highest waiting priority number of all the priorities queued by the insert register into the next register, where it can be accessed by any processor in the system. Therefore, scheduling is a one step procedure. Furthermore, scheduling is transparent to the application software. The present invention has the advantage of eliminating complex and costly scheduling software and associated processing overhead. The need for a process scheduler program is eliminated by the hardware scheduler and processor interrupter of the present invention which allows application processes to perform self-scheduling by simply writing their priority numbers into the hardware scheduler.

An object of the present invention is to provide a hardware process scheduler and processor interrupter that eliminates the need for scheduling software. It is a further object of the present invention to provide a process scheduler that accommodates a process hierarchy by scheduling processes based on priority. It is a further object of the present invention to provide a process scheduler that ensures that all processors in a parallel processing system only execute the highest priority processes first. It is a further object of the invention to make the highest waiting process priority number accessible to all the processors in the system.

It is a further object of the present invention to provide a process scheduler which can easily utilize advances in very large-scale integrated (VLSI) circuit technology. Another object of the present invention is to provide a process scheduler which is easily implemented at low cost, performs scheduling tasks quickly, and has general purpose application. It is a further object of the present invention to easily accommodate parallel processing systems requiring real-time execution of asynchronous events. It is a further object of the present invention to provide a process scheduler that accommodates multi-threaded processes executing on several processors simultaneously.

These and other objects and features of the present invention will become more fully apparent from the following description and appended claims taken in conjunction with the accompanying drawings.

BRIEF DESCRIPTION OF THE DRAWINGS

FIGS. 7a–7d are logic diagrams of a VME bus implementation of the cluster scheduler of FIG. 5.

FIGS. 8a-8h are logic diagrams of a VME bus implementation of the processor interrupter of FIG. 6.

FIGS. 8i-8j are the flow-diagrams of a preemptor sequencer implemented on the VME bus.

DETAILED DESCRIPTION OF THE PREFERRED EMBODIMENTS

Figure 1:
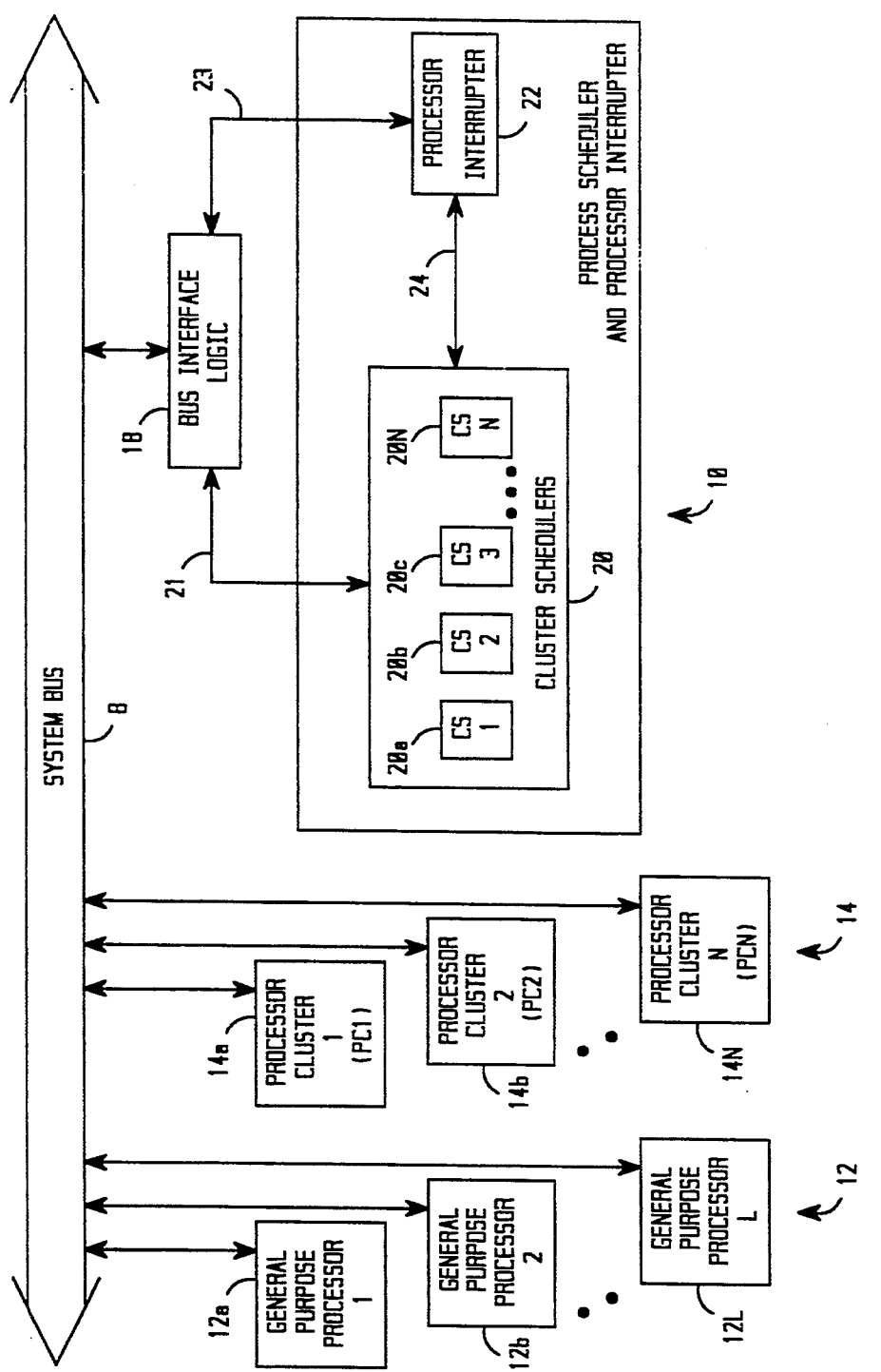
FIG. 1 is a block diagram of one presently preferred embodiment of the process scheduler and processor interrupter of the present invention.

Reference is now made to the drawings wherein like numerals refer to like parts throughout. Referring to FIG. 1, the process scheduler and processor interrupter (hereinafter referred to as PSI) of the present invention is illustrated in block diagram format, and is referred to by general reference character 10.

As shown in FIG. 1, PSI 10 is typically used in a parallel processing system comprising any combination of a plurality of general purpose processors 12, and a plurality of processor clusters 14. The plurality of general purpose processors 12 comprises one to L number of processors. The plurality of processor clusters 14 comprises one to N number of processor clusters, each processor cluster having one to M number of processors. The total number of processors L, processor clusters N, and processors per cluster M, are limited only by cost and size constraints. Theoretically, L, M and N may have any integer value greater than zero. The plurality of general purpose processors 12, the plurality of processor clusters 14, and PSI 10 communicate by means of a system bus 8. System bus 8 is the conduit for all control, data and address information communicated between the processors 12, the clusters 14 and the PSI 10. System bus 8 may be implemented using any conventional computer system bus well known in the art.

The PSI 10 communicates with the processors 12 and processor clusters 14 over the system bus 8 through a bus interface 18. The bus interface 18 is a conventional interface circuit that performs the interface and "handshake" functions necessary to allow PSI 10 to communicate over system bus 8. The bus interface 18 comprises all of the address decoding, timing, and control logic necessary to interface the PSI 10 to the system bus 8. One skilled in the art will appreciate that the design and configuration of bus interface 18 is therefore necessarily dependent upon the design and protocol requirements of system bus 8. The bus interface 18 transmits the address, data and control signals between the bus 8 and the PSI 10.

As shown in FIG. 1, PSI 10 comprises a plurality of cluster schedulers 20 and a processor interrupter 22. The plurality of cluster schedulers 20 comprises one to N number of cluster schedulers (one cluster scheduler per processor cluster). The plurality of cluster schedulers 20 communicate with processor interrupter 22 using PSI internal bus 24. The plurality of cluster schedulers 20 communicate with the system bus 8 via the bus interface 18 using a communication bus 21. The processor interrupter 22 communicates with the system bus 8 via the bus interface 18 using a communication bus 23.

The function and purpose of PSI 10 may be understood by examining the operation of PSI 10 when used to schedule processes in a typical parallel processing system. A typical parallel processing system, as shown in FIG. 1, has one or more general purpose processors 12 having software programs or processes requiring parallel execution on one or more processors in one or more processor clusters 14. In order to successfully implement a desired function or software application, processes must be scheduled and dispatched to the various available processors. The highest priority waiting processes should be executed by available processors. If no processors are available, processes with the highest priority numbers should interrupt the processors executing processes having lower priority numbers. The process scheduler and processor interrupter of the present invention PSI 10 accomplishes process scheduling in the following manner.

When a process requires execution, one of the plurality of general purpose processors 12 initiates a request over system bus 8, signalling PSI 10 that it has a process requiring execution by one of the plurality of processors contained in a processor cluster 14. Alternatively, one of the processors in a processor cluster 14 can initiate a scheduling request to the PSI 10.

A scheduling request is initiated over system bus 8 by addressing and writing to the appropriate cluster scheduler responsible for scheduling processes on the requested processor cluster. The bus interface logic 18 then decodes the address from system bus 8 and routes the incoming request to the addressed cluster scheduler via communication bus 21. As described in more detail hereinafter, each cluster scheduler has an "insert queue" or "insert" register (not shown) that queues waiting process priority numbers. The insert register (not shown) of each cluster scheduler 20a-20n is addressable (via communication bus 21) by any processor connected to the system bus 8. Therefore, when a process requires scheduling, the process first writes its process priority number into the insert register of the cluster scheduler that serves the desired processor.

For this example, assume that the process awaiting execution requires processing by one of the processors located in processor cluster 1 (PC1) referred to by designator 14a. When the process scheduling request is initiated, the priority number of the requesting process is written to cluster scheduler 1 (CS1) referred to by designator 20a. CS1 20a performs process scheduling for all processors contained in PC1 14a. If there is an available processor in PC1 14a, the process is immediately dispatched to that processor and CS1 20a awaits another scheduling request. However, if there are no available processors on the desired processor cluster, in this example PC1 14a, then the process must be scheduled by the cluster scheduler, in this example CS1 20a.

Cluster schedulers accomplish scheduling in the following manner. Each cluster scheduler 20 has an insert register. The insert register is a queue of all processes awaiting execution by processors contained in the processor cluster served by the cluster scheduler. For example, CS1 20a has an insert register (not shown) or queue for all processes awaiting execution by processors contained in PC1 14a. The queue of processes awaiting execution is maintained in an insert register (not shown) in such a manner that CS1 20a constantly produces the highest priority process awaiting execution by a processor on PC1 14a. If the incoming process has a higher priority number than the highest process priority number in the queue (insert register), it then becomes the highest priority number in the queue. If not, then the incoming process is stored in the queue.

If the incoming process has a higher priority number than any waiting process in the insert register, then the higher priority number is loaded into a next register (not shown), linked with a cluster scheduler, located in processor interrupter 22. The next register may be read by any processor in the system. It indicates the next process that should be executed on the processor cluster served by the cluster scheduler.

Processor interrupter 22 then determines whether the next register has a higher priority number than one of the active processes. If it does, processor interrupter 22 determines the lowest priority active process, interrupts the processor executing that process, dispatches the incoming process for execution on the interrupted processor, initiates execution, and places the priority number of the interrupted process into the cluster scheduler insert register queue for further scheduling. The interrupting process, now executing on the interrupted processor, then withdraws its priority number from the insert register (not shown) and inserts its priority number into the record of active processes maintained by the processor interrupter 22. Withdrawing the priority number from the insert register causes the cluster scheduler to find the highest priority number in the register and latch it into the next register.

There is one exception to the cycle described above. If the interrupting process is a "multi-threaded" process, it will not automatically withdraw its priority number from the insert register. Rather, it will first determine whether it has sub-processes requiring execution. If not, it then withdraws its priority number from the insert register. If it does have sub-processes to initiate, it will then determine the number of processors allocated to the process. If the number is greater than one, the process will then keep its priority number in the insert register queue. This allows sub-processes to execute on available processors or processors having lower priority numbers than the multi-threaded process. In this way, the PSI 10 supports software structures that allow the scheduling of multi-threaded processes.

In the present example, and referring again to FIG. 1, if the incoming process has the highest priority process number in the insert register queue maintained by CS1 20a, that priority number is loaded into the "next register" (in this example, next register "one", not shown) associated with CS1 20a located in processor interrupter 22. Each cluster scheduler 20 has associated with it a "next register" located in processor interrupter 22. For example, cluster scheduler 2 (CS2), referred to in FIG. 1 by numeral 20b, has associated with it next register 2 (not shown), located in processor interrupter 22, cluster scheduler 3 (CS3), referred to by numeral 20c, has next register 3 (not shown), located in processor interrupter 22, etc., cluster scheduler N (CSN), referred to as 20N has next register N (not shown) located in processor interrupter 22. Once CS1 20a loads the incoming priority number into next register 1 (not shown) located in processor interrupter 22, processor interrupter 22 then determines whether to interrupt a processor in PC1 14a. As before, any processors may read the next registers to determine what process they should execute next.

Processor interrupter 22 then compares the incoming process priority number loaded into next register 1 (not shown) with the priority numbers of all active processes executing on the processors in PC1 14a. If none of the active processes have a lower priority than the value in the next register, processor interrupter 22 takes no action. However, if any of the active processes executing on the processors in PC1 14a have a lower priority than that of the incoming process, then processor interrupter 22 finds the lowest active process in PC1 14a, and interrupts the processor executing that process. The incoming process priority number is withdrawn from the insert register in CS1 20a and recorded as an active process in processor interrupter 22. The interrupted process writes its priority number into the insert register (not shown) queue in CS1 20a. Processor interrupter 22 then determines whether the next register value is greater than the lowest active process in PC1 14a. If it is, the process is dispatched as described hereinabove.

The process scheduler and processor interrupter 10 of the present invention therefore performs process scheduling in a manner that is transparent to application processes. The process scheduler and processor interrupter 10 of the present invention eliminates the need for complicated process scheduling software. Furthermore, the present invention provides increased flexibility because it easily interfaces with parallel processing system bus 8. To the other processors on system bus 8, the process scheduler and processor interrupter 10 of the present invention appears simply as another processor or peripheral. Moreover, the process scheduler and processor interrupter 10 of the present invention can easily take advantage of improvements in very large scale integrated (VLSI) circuit technology.

In fact, it is anticipated that the present invention will be implemented in the future with one VLSI device. is anticipated that, with improvements in VLSI technology will come reduced costs. However, due to cost and development time constraints, the process scheduler and processor interrupter 10 of the present invention has presently been reduced to practice using a combination of small-scale integrated (SSI) circuits, medium-scale integrated (MSI) circuits, and large-scale integrated (LSI) circuits.

Figure 2:
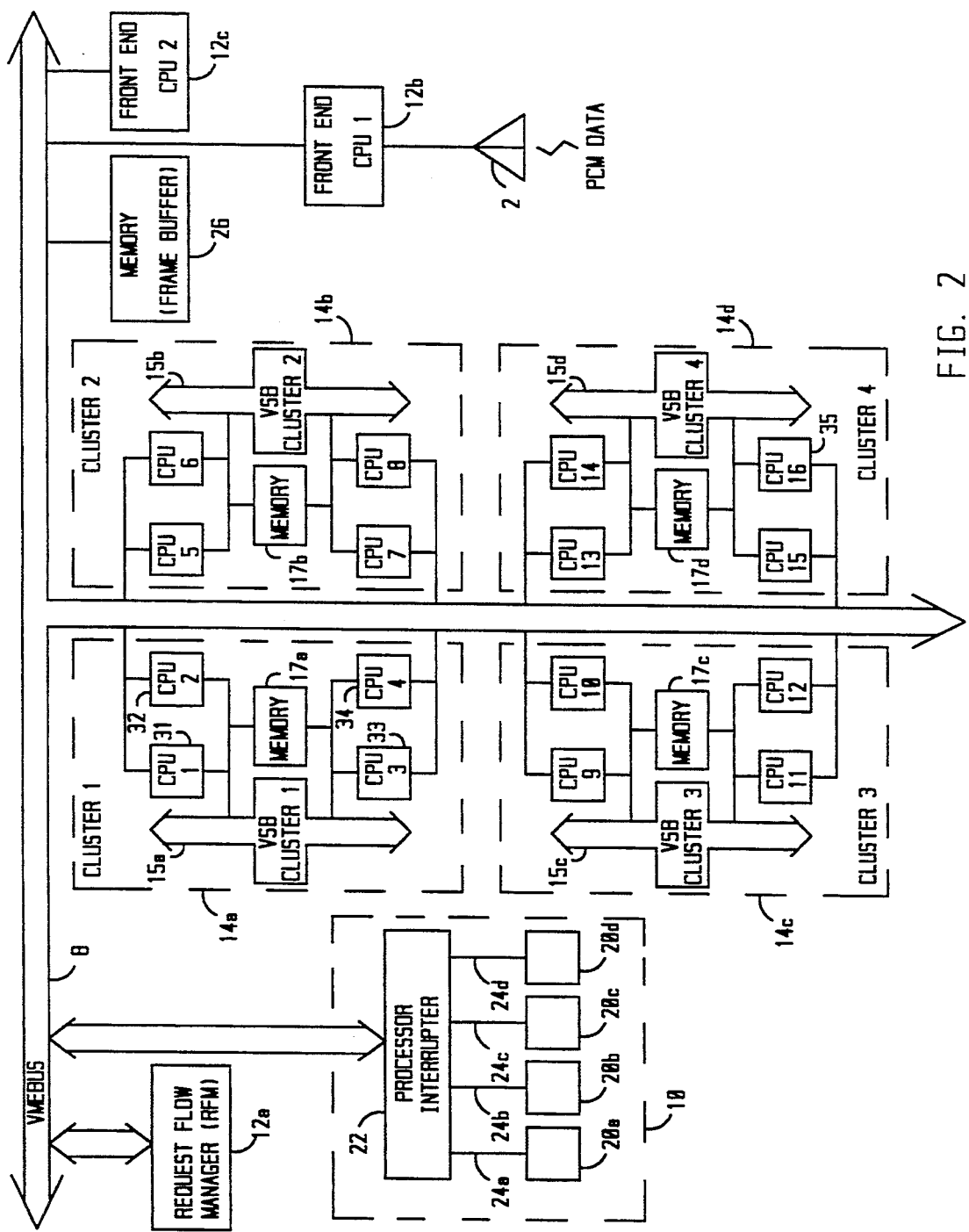
FIG. 2 is a block diagram of a parallel processing system using one preferred embodiment of the present invention.

FIG. 2 shows a block diagram of a parallel processing system using one preferred embodiment of the hardware scheduler and processor interrupter of the present invention. Referring simultaneously to FIGS. 1 and 2, the system bus 8 is implemented with the well known VME bus. Process scheduler and processor interrupter (PSI) 10 interfaces with the VME system bus 8 via the bus interface 18 (shown in FIG. 1). In one preferred embodiment of the present invention, PSI 10 can schedule processes for one to four processor clusters (14a-14d). In one preferred embodiment, PSI 10 is optionally configurable to comprise one to four cluster schedulers 20a, 20b, 20c, and 20d, and one processor interrupter 22. Each cluster scheduler 20 independently schedules processes for each associated processor cluster 14 (e.g. cluster scheduler 20c independently schedules processes for cluster 14c). By simply adding more cluster schedulers 20a-20d, PSI 10 can schedule additional processor clusters. Cluster schedulers 20a-20d communicate with processor interrupter 22 via internal communication busses 24a, 24b, 24c and 24d.

Using conventional address decoding techniques, the bus interface 18 (shown in FIG. 1) allows the cluster schedulers 20 and the processor interrupter 22 to appear as addressable registers to all processors connected to the VME bus 8. Therefore, process priority numbers may be inserted into or withdrawn from each cluster scheduler by writing the appropriate address on the VME bus 8. Active process priority numbers contained in the processor interrupter 22 may similarly be written by processors using bus 8. This allows for improved process scheduling flexibility.

For example, active processes can dynamically change their priority numbers by writing a new active process priority number to the processor interrupter 22 during process execution. This feature of the PSI 10 allows for software processes having sub-processes of varying priority. Some sub-processes can be made non-preemptable simply by writing the highest priority number (decimal "255") to the processor interrupter 22 during process execution. This flexibility provides tremendous advantages over the hardware schedulers of the prior art.

FIG. 2 shows a parallel processing system using one preferred embodiment of the present invention PSI 10. As described hereinabove, the preferred embodiment of the present invention can optionally be configured to schedule processes for one to four processor clusters having one to four processors. The system shown in FIG. 2 has four processor clusters 14, each cluster having four processors (referred to as CPU in FIG. 2). Accordingly, the embodiment of the present invention PSI 10 shown in FIG. 2 schedules processes for 16 processors organized into four clusters, 14a, 14b, 14c and 14d, each having four processors. Each processor cluster 14a-14d has an internal memory 17a-17d and an internal communication bus 15a-15d that allows for intra-cluster processor communication.

In the preferred embodiment of the present invention shown in FIG. 2, PSI 10 performs process scheduling for all four processor clusters 14a-14d, and for each processor within a cluster. Each cluster scheduler, 20a, 20b, 20c and 20d of PSI 10 independently schedules processes for the four processors located in their associated processor clusters, 14a, 14b, 14c and 14d, respectively. Accordingly, cluster scheduler 20a schedules processes for the four processors located in processor cluster 14a, cluster scheduler 20b schedules processes for the four processors located in processor cluster 14b, cluster scheduler 20c schedules processes for the four processors located in processor cluster 14c, and cluster scheduler 20d schedules processes for the four processors located in processor cluster 14d. Each cluster scheduler 20 can schedule up to 255 processes of varying priorities across four processors. Processor interrupter 22 of PSI 10 performs the priority comparison function described hereinabove and interrupts one of the sixteen processors when it is appropriate to do so. As a result, in the embodiment of the present invention shown in FIG. 2, PSI 10 can schedule up to 1020 processes across 16 processors.

The parallel processing system shown in FIG. 2 also has two special purpose processors referred to as Front End CPU 1 12b, Front End CPU 2 12c, a Frame Buffer Memory 26 and a general purpose processor referred to as the Request Flow Manager 12a. The operation of the special purpose processors is described in more detail hereinbelow.

To better understand the operation and utility of the hardware process scheduler and processor interrupter of the present invention 10, it is helpful to describe how a typical parallel processing application utilizes the present invention. However, this example is presented for explanation purposes and should not be taken to limit either the function or the implementation of the present invention. The present invention may be utilized in systems having a variety of configurations, system interfaces, system busses and operational characteristics. The following presents an example of a typical parallel processing application using the system shown in FIG. 2.

A typical application for the present invention is a flight tester capable of processing incoming data from an airplane. In this application, a flight tester sends a stream of telemetry data from an airplane to a receiver which is operatively connected to the present invention. The flight tester requires that incoming data be sampled, processed and displayed at different rates. Different parameters require sampling at varying rates, similarly, data needs to be displayed at varying rates. For example, "strip charts" need to be displayed at 64 samples per second. Additionally, there are some numerical displays which need to be updated 16 times per second. Furthermore, there are visual displays indicating the attitude, altitude, cockpit displays, etc. These visual displays need to be updated between 4 and 8 times per second.

The various displays are generated using the parallel processing system of FIG. 2. To better understand the utility of the present invention, the performance of the flight tester application is first described assuming a system configured with only one processor on one processor cluster. The utility of the present invention is then demonstrated by describing the performance of the flight tester application in the system of FIG. 2 (having four processor clusters and four processors).

Pulse-code Modulated (PCM) data generated by an airplane (not shown) is presented continuously to an antenna 2 operatively connected to Front End CPU 12b. As PCM data is continuously received by antenna 2, CPU 12b collects the data and stores it into frames in frame buffer memory 26. When frame buffer memory 26 is full of data, CPU 12b generates an interrupt over VME pus 8. The interrupt causes Request Flow Manager 12a to initialize the first process, the process with the highest priority number, in this case called the "acquisition" process (ACQ).

Table 1 presents a list of processes as they would be assigned by a system designer of the flight tester application. As shown below in Table 1, processes are given priority numbers; the higher the priority number the more significant the process. The software is designed, using the PSI 10, to enable processors to always execute the processes having the highest priority. Therefore, before a process terminates, it first reads the processor interrupter next register to determine whether there is another process for the processor to execute. If there is, the process is dispatched to that processor. If the next register has a zero priority (no process in the insert register), then the process terminates and the processor becomes idle.

TABLE 1

| FLIGHT TESTER APPLICATION | | |
|---|---|---|
| Process | Process Function | Priority Number |
| ACQ | Acquires and Determines validity of incoming raw data. Assembles data into "frames." | 200 |
| TP | Builds well-structured display blocking buffer. | 199 |
| Rate 1 | Builds display buffers at rate of 64 buffers per second. | 198 |
| Rate 2 | Builds display buffers at rate of 32 buffers per second. | 197 |
| Rate 3 | Builds display buffers at rate of 16 buffers per second. | 196 |
| Rate 4 | Builds display | 195 |

TABLE 1-continued

| FLIGHT TESTER APPLICATION | | |
|---|---|---|
| Process | Process Function | Priority Number |
| | buffers at rate of 8 buffers per second. | |
| Rate 5 | Builds display buffers at rate of 4 buffers per second. | 194 |
| Rate 6 | Builds display buffers at rate of 1 buffer per second. | 193 |

In this example, the process labeled ACQ is assigned the highest priority number. When a frame is deposited in the frame buffer memory on the VME bus, an interrupt is generated over the VME bus which triggers the ACQ process. Request Flow Manager (RFM) 12a then places a request over VME bus 8 for processor execution to the only cluster scheduler 20a (only one cluster scheduler 20a is employed because the system shown in FIG. 2 is configured for only one processor). RFM 12a places a request to cluster scheduler 20a by inserting the priority number of the ACQ process into the insert register (not shown) of cluster scheduler 20a.

Because there are no other processes now executing on the only processor located on cluster 14a, the priority number of ACQ is the highest number in the queue, and is loaded into the next register (not shown) associated with cluster scheduler 20a located in processor interrupter 22. Again, because there are no other processes executing, processor interrupter 22 immediately dispatches the ACQ process to execute on the processor (e.g. CPU1 referred to in FIG. 2 by numeral 31) located in cluster 14a. The ACQ process determines the validity of an incoming frame. When a frame is determined to be valid, the ACQ process begins its termination sequence. The ACQ process triggers the TP process to execute on CPU1.

The TP process sifts through incoming frames in order to build a "display blocking buffer". The display blocking buffer has a well structured description of the incoming telemetry data from the airplane and has parameters in order $p_1$ to $P_n$. All other processes in this flight tester application manipulate data in the display blocking buffer. The display blocking buffer is stored in cluster memory 17a–17d. The TP process executes in a relatively short period of time. The TP process has several sub-processes shown in Table 1. As shown in Table 1, these sub-processes are labeled RATE 1 through RATE 6. The lower numbered rates use higher process priority numbers and require executions more frequently than higher numbered rates. For example, RATE 1 has a priority number of 198 and operates on data that needs to be updated 64 times per second. RATE 2 has a priority number of 197, and operates on data that needs to updated 32 times per second. RATE 3 has a priority number of 196, and needs to operate on data 16 times per second. RATE 4 has a priority number of 195 and needs to operate on data 8 times per second. RATE 5 has a priority number of 194 and needs to operate on data 4 times per second. Finally, RATE 6 has a priority number of 193, and needs to operate on data once a second.

When the TP process concludes, it requests that two of its subordinate processes (RATE processes) be executed. However, because there is only one processor in the system CPU1 31, only one RATE process can be executed. The other RATE process must be queued. The TP process writes the priority number of both RATE processes into the insert register (not shown) of cluster scheduler 20a. Assume that TP requested that RATE 2 and RATE 4 be executed. In that case, the priority number of RATE 2 (decimal 197) and the priority number of RATE 4 (decimal 195) is written to the cluster scheduler 20a. Cluster scheduler 20a then determines the highest priority number (197) in its insert register. Cluster scheduler 20a writes this number into the processor interrupter 22 next register (described hereinbelow). At this point, the decimal value 197, in the processor interrupter 22, may be read by any processor in the system (in this example, only processor CPU1 31).

When the TP process begins its termination sequence, it reads the processor interrupter next register to determine the process to execute on CPU1 31. TP then triggers RATE 2 to execute on CPU1 31. If RATE 2 is not a multi-threaded process, its priority number is withdrawn from the cluster scheduler insert register (not shown), which causes the priority number of RATE 4 (195) to be loaded into the next register of the processor interrupter 22 (as it is the highest priority in the queue). Processor interrupter 22 then compares the value of the highest priority waiting process (195) with the lowest priority active process (197). Because CPU1 31 is currently executing the highest possible priority process, processor interrupter does nothing. However, when RATE 2 begins its termination sequence, it first reads the next register in the processor interrupter. Because the next register has the priority number of RATE 4, RATE 4 is executed on CPU1 31.

As processing requests increase in number and frequency, the number of waiting processes also increases, eventually degrading system performance. At some point, the demand for processing power will surpass the ability of the single CPU1 31. However, by using the preferred embodiment of the present invention PSI 10 shown in FIG. 2, processing power is increased simply by adding more parallel processing CPUs and more cluster schedulers. The utility of the present invention is that PSI 10 permits design of software application programming without consideration for scheduling needs. The system shown in FIG. 2, using the hardware scheduler of the present invention PSI 10, does not need to accommodate scheduling algorithms in software. Parallel processing tasks are accomplished simply by adding more CPUs. There is no need to change existing application software.

For example, in the system using processes with the priority numbers given in table 1, and designed with the 16 parallel processors and PSI 10 shown in FIG. 2, assume that CPU1 31 executes the ACQ process. When ACQ, with priority number 200 finishes, the TP process is executed on CPU2 32. At the conclusion of the TP process, two of the RATE processes are initiated. Assume that process RATE 3 and RATE 5 are triggered by TP.

RATE 3 is initiated on CPU1 31 in cluster 14a. RATE 5 is initiated on CPU2 32. RATE 3 has a priority number of 196. At some point during the execution of RATES 3 and 5 the acquisition process (ACQ) will be initiated.

At that time, the priority number 200 is presented to PSI 10. PSI 10 determines the lowest priority active process executing on a cluster 14a. If the lowest priority active process has a lower priority than the highest priority of the processes awaiting execution, that active process is interrupted by processor interrupter 22. In this example, CPU1 31 is executing process RATE 3 having a priority number of 196 and CPU2 32 is executing process RATE 5 having a priority number of 194. CPUs 33 and 34 are idle and therefore have active process priority numbers of 0. Therefore the lowest priority active process in CS1 20a for cluster 14a is 0.

Process ACQ, with a priority number of 200, is greater than active process priority number 0 of CPU3 33. Therefore, process ACQ will be dispatched by PSI 10 to execute on CPU3 33. At the same time, the cluster scheduler associated with cluster 14a, i.e. cluster scheduler 20a, has priority number 200 withdrawn from its queue of waiting processes. Furthermore, processor interrupter 22 adds priority number 200 to its list of active process priority numbers associated with cluster 14a.

Eventually there will be several RATE processes executing on all four CPUs, CPU1 31, CPU2 32, CPU3 33 and CPU4 34, in cluster 14a. For this example, assume that CPU1 31 is executing process RATE 2, CPU2 32 is executing process RATE 3, CPU3 33 is executing process RATE 4, and CPU4 34 is executing process RATE 5. At some point, an interrupt is generated from Front End CPU 12b and priority number "200" assigned to process ACQ is inserted via system bus 8 into cluster scheduler 20a in PSI 10. Cluster scheduler 20a then produces the highest waiting process priority number of processes awaiting execution on processors located in cluster 14a. In this case, process priority number "200" is the highest waiting process priority number, and therefore, cluster scheduler 20a will transmit priority number 200 to processor interrupter 22 via bus 24a. Cluster scheduler 20a will also generate a signal over bus 24a that loads the next register (not shown) in processor interrupter 22 with the priority number "200."

Loading the next register causes processor interrupter 22 to compare the four active process priority numbers of processes executing on cluster 14a to the priority number just loaded into the next register. Because the lowest active process priority number is 194, executing on CPU4 34, CPU4 34 must be interrupted by processor interrupter 22. Process RATE 5 is then preempted and priority number 194, associated with RATE 5, is written into the waiting process insert register (not shown) in cluster scheduler 20a. The priority number of "200" is then withdrawn from the insert register (not shown) of the cluster scheduler 20a. Withdrawing the priority number causes the next register of the processor interrupter 22 to be loaded with the highest waiting process number in the insert register of cluster scheduler 20a, i.e. the value of "194." The number "200" is written to the processor interrupter 22 and recorded as an active process. Process ACQ will then execute on CPU4 34 until it concludes.

As is shown by this example, the preferred embodiment of the present invention provides for flexible and easily upgraded parallel processing system design. Processing power is increased simply by adding more processors and more cluster schedulers. Changes in system hardware are transparent to application programming. Process scheduling is also transparent to application programming.

Figure 3:
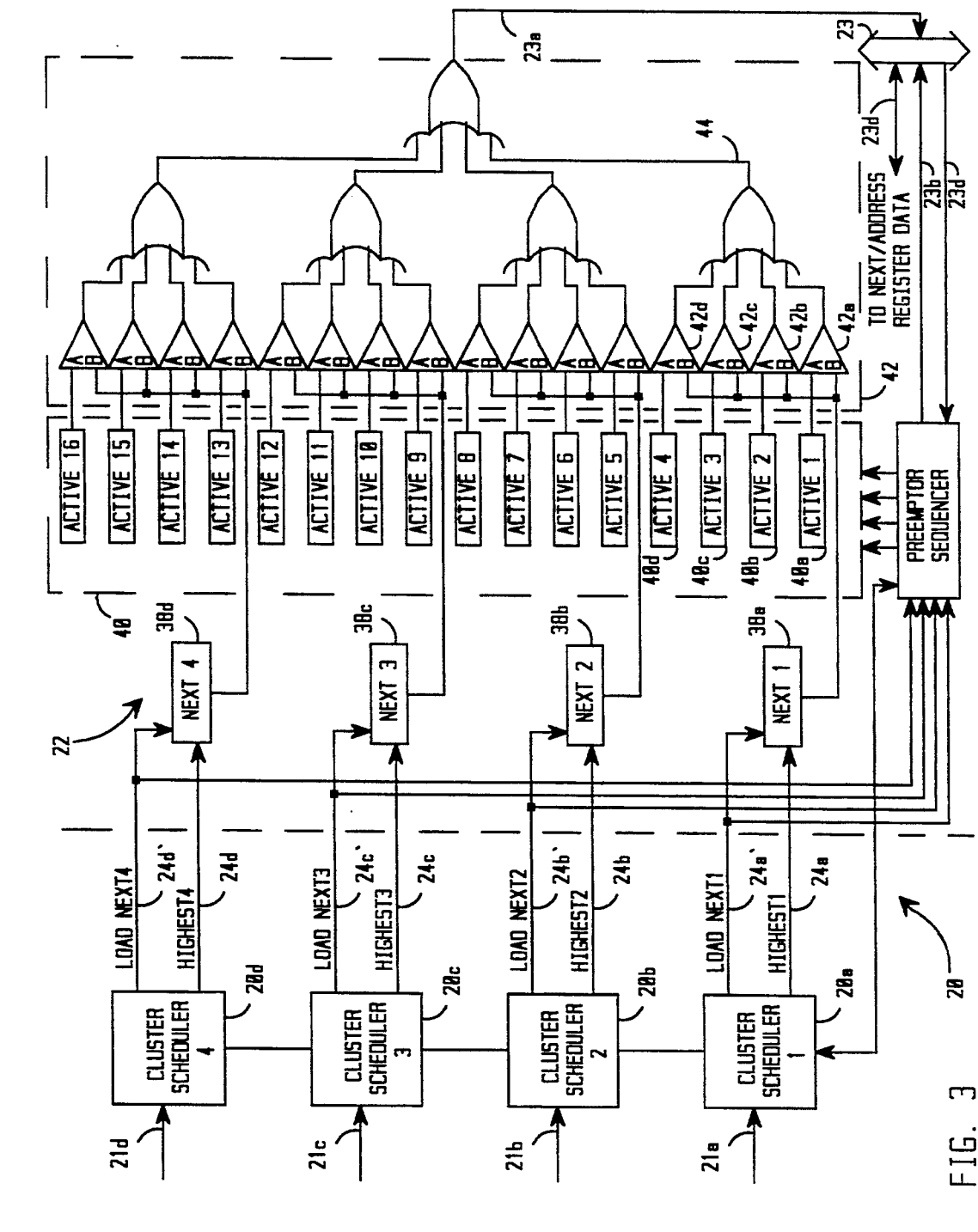
FIG. 3 is a Logic diagram of one preferred embodiment of the cluster scheduler and processor interrupter of the present invention.

The embodiment of the present invention used by the parallel processing system of FIG. 2 is now further described with respect to FIG. 3. As shown in FIG. 3, cluster schedulers 20 comprise four independent cluster schedulers: cluster schedulers 20a, 20b, 20c, and 20d. As described hereinabove in reference to FIG. 2, each cluster scheduler 20a-20d independently schedules processes for its respective processor cluster 14a-14d (shown in FIG. 2).

Referring now to FIG. 3, priority numbers for processes requesting execution are input over communication busses 21a, 21b, 21c and 21d. Communication busses 21a-21d are connected to bus interface logic 18 (shown in FIG. 1). Processes requiring execution input their priority numbers into the cluster scheduler that serves the desired processor. For example, a process requesting execution on a processor in cluster 14a (shown in FIG. 2) inputs the priority number of the process into cluster scheduler 20a via communication bus 21a. That process also presents a signal via communication bus 21a that indicates that a process priority number must be inserted into the insert register (not shown) of cluster scheduler 20a. Cluster scheduler 20a is described in more detail hereinbelow with reference to FIG. 4. The four cluster schedulers 20a-20d communicate with processor interrupter 22 over PSI internal bus 24 (shown in FIG. 1), shown in FIG. 3 as communication busses 24a-24d, and lines 24a'-24d'.

Figure 4:
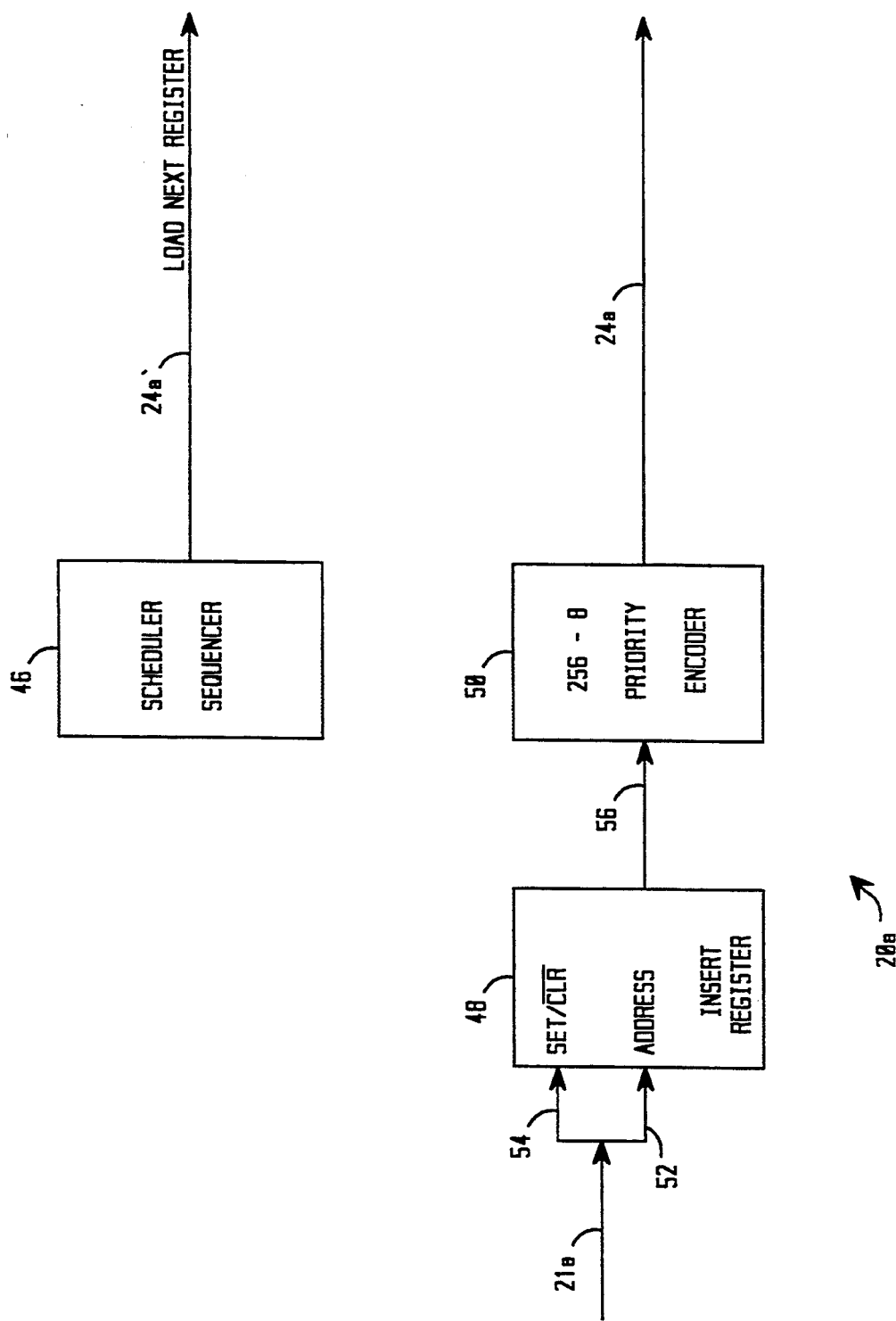
FIG. 4 is a block diagram of a preferred embodiment of the cluster scheduler of the present invention.

The plurality of cluster schedulers 20 are designed to continuously provide at their output the highest process priority number awaiting execution. For example, cluster scheduler 20a, described more fully in reference to FIG. 4, is designed to constantly provide, at communication bus 24a, the highest process priority number awaiting execution on a processor in processor cluster 14a (shown in FIG. 2). Similarly, cluster scheduler 20b produces upon bus 24b the priority number of the highest priority process awaiting execution by a processor located in processor cluster 14b (shown in FIG. 2). Cluster schedulers 20c and 20d perform identical functions in order to schedule processes for their associated processor clusters 14c and 14d (shown in FIG. 2). In addition to providing the highest process priority number awaiting execution, the cluster schedulers 20a-20d also provide signals 24a', 24b', 24c' and 24d', that indicate that a new highest process number is ready for execution.

For example, when a process requires execution on processor cluster 14a (shown in FIG. 2) the priority number of that process is inserted, via line 21a, into the insert register (not shown) of cluster scheduler 20a. Cluster scheduler 20a then determines whether the new incoming process has a higher priority number than any other process priority numbers already awaiting execution and stored in the insert register (not shown) contained in cluster scheduler 20a. If the new incoming process priority number is greater than all other process priority numbers stored in the insert register (not shown), then cluster scheduler 20a produces that process priority number on communication bus 24a. In this way, cluster scheduler 20a constantly provides the highest priority number of waiting processes to processor interrupter 22 via communication bus 24a. In addition, cluster scheduler 20a also provides a signal via control line 24a' to indicate to processor interrupter 22 that there is a new highest process priority number in the insert register (not shown) of cluster scheduler 20a. Cluster schedulers 20b-20d similarly have control lines 24b'-24d' which provide similar signals to processor interrupter 22.

As shown in FIG. 3, the processor interrupter 22 comprises a preemptor sequencer 80, a group of four "next" registers 38a-38d, a bank of 16 active registers 40, and a comparison circuit 42. Preemptor sequencer 80 monitors lines 24a'-24d' to determine whether processor interrupter 22 is initiated. The group of four next registers 38a-38d are loaded with the value of the highest process priority number awaiting execution. For example, next register 38a is loaded by cluster scheduler 20a via bus 24a (which carries the highest priority number of waiting processes) and line 24a' (the load next signal) with the highest priority process number stored in the insert register (not shown) located in cluster scheduler 20a. Similarly, next register 38b is loaded by cluster scheduler 20b, next register 38c is loaded by cluster scheduler 20c and next register 38d is loaded by cluster scheduler 20d.

As described hereinabove, the next registers may be read by any processor in the parallel processing system. As is described below in more detail with reference to FIG. 6, the next registers may be read using communication bus 23. Any processor on the system may address the next registers by communicating with the preemptor sequencer 80 over bus 23. Preemptor 80 then will enable the tri-state outputs of the next registers (shown in FIG. 6) and gate the appropriate output data onto bus 23, to be read by the addressing processor. This process is described in more detail below with reference to FIG. 6.

Anytime one of the next registers 38a-38d is loaded with a process priority number, one of the lines 24a'-24d' is asserted, and the preemptor sequencer 80 is initiated. The preemptor sequencer 80 controls the operation of the processor interrupter 22. Whenever a next register 38a-38d is loaded by a cluster scheduler, preemptor sequencer causes the next register value associated with that cluster scheduler to be compared with the priority numbers of active processes executing on processors located in the processor cluster associated with that cluster scheduler. If the value of the next register is greater than the value of any active process priority number, comparison circuit 42 will produce a signal on communication bus 23 to interrupt the processor that is executing the lowest active priority process.

For example, cluster scheduler 20a produces the highest waiting process priority number on bus 24a and triggers the loading of that priority number into next register 38a by asserting a signal on line 24a'. Therefore, next register 38a is loaded with the highest process priority number awaiting execution on a processor associated with cluster scheduler 20a, in this case, processor cluster 14a (shown in FIG. 2). Soon after loading next register 38a with the process priority number, preemptor sequencer 80 initiates operation. The process priority number in next register 38a is compared with the priority number of all four active processes executing on the four processors in processor cluster 14a (shown in FIG. 2). The priority number of the active processes executing on processor cluster 14a (shown in FIG. 2) are contained in the bank of 16 active process registers 40, and are referred to in FIG. 3 as 40a, 40b, 40c and 40d. The value of the priority number stored in active register 40a is compared with the value stored in next register 38a by eight-bit comparator 42a located in comparison circuit 42. Similarly, the values stored in active process registers 40b-40d are compared with the value of the priority numbers stored in next register 38a using eight-bit comparators 42b-42d. If any active process number stored in active process registers 40a-40d have a value less than the priority number stored in next register 38a, a logic high is produced at logic line 44, which causes an interrupt signal to be generated at communication line 23a.

The value of next registers 38b-38d, when loaded by their respective cluster schedulers 20b-20d, are similarly compared with the other twelve active process registers contained in the bank of active process registers 40. In this manner, whenever one of the cluster schedulers 20a-20d produces a next highest priority process for scheduling, processor interrupter 22 compares the next register value with the active process priority numbers currently executing. If the incoming process has a priority number that is higher than the lowest active process currently executing, processor interrupter 22 initiates an interrupt causing the processor executing the lowest priority active process to be interrupted. Preemptor sequencer 80 indicates which processor in which cluster to interrupt using communication bus 23b.

Referring now to FIG. 4, the preferred embodiment of the cluster scheduler of the present invention is shown in block diagram format. In the embodiment of the present invention shown in FIG. 2, all cluster schedulers 20a, 20b, 20c, 20c, are identical and are implemented as shown in FIG. 4. Cluster scheduler 20a comprises a scheduler sequencer 46, an insert register 48, and a priority encoder 50. Scheduler sequencer 46 controls the operation of cluster scheduler 20a. Insert register 48 is a 256 bit long by one bit wide register. Insert register 48 is designed so that any one bit within insert register 48 is accessible to any processor in the system, and any one bit within insert register 48 may be set or cleared without affecting any other bit within insert register 48.

Communication bus 21a carries the process priority number for the process requesting scheduling by cluster scheduler 20a. In the embodiment of the present invention shown in FIG. 4, the priority number for the process requesting scheduling is presented to the address lines of insert register 48 on bus 52. Insert register 48 decodes the address presented via line 52 to select one of the 256 bits in insert register 48. The signal on line 54 indicates whether the bit selected by address lines presented by bus 52 should be set or cleared. If input line 54 is at a logical low value, the bit selected by the value presented on address line 52 is cleared; alternatively, if line 54 is at a logical high value the selected bit is set within insert register 48.

Insert register 48 is arranged so that the lowest addressable bit represents the lowest process priority number, the highest addressable bit represents the highest process priority number. The lowest possible priority number is one (or hexadecimal 01, hereinafter represented as x01); the highest is 255 (or xff). When the address value of x01 is presented to the address lines of insert register 48 on bus 52, the least significant bit in insert register 48, representing the lowest process priority number, is either set or cleared, depending upon the status of line 54. Similarly, when the value of xff is presented on the address lines of insert register 48 via bus 52, the most significant bit in insert register 48, representing the highest priority process number 255, is either set or cleared depending on the status of line 54.

Accordingly, insert register 48 produces a 255 bit-wide value on bus 56. The least significant bit in insert register 48, and thus the least significant bit on bus 56, represents the least significant priority process number. The most significant bit represents the most significant priority process number. This 255 bit-wide number is input to priority encoder 50. Priority encoder 50 provides an eight-bit binary representation of the most significant bit that is set in insert register 48. For example, if bin one is the only bit set in register 48 priority encoder 50 will produce a x01 on its output and transmit it over 24a. If the highest bit set in insert register 48 is the most significant bit 255, then priority encoder 50 will transmit the binary representation of 255, or xff, over bus 24a to the processor interrupter 22.

Scheduler sequencer 46 controls the operation of insert register 48 and priority encoder 50 via control lines (not shown). Any time a bit is set or cleared in the insert register, scheduler sequencer 46, using signal line 24a', then signals processor interrupter 22 to load the highest process number provided on bus 24a into the next register 38a (shown in FIG. 3) located within processor interrupter 22.

Figure 5:
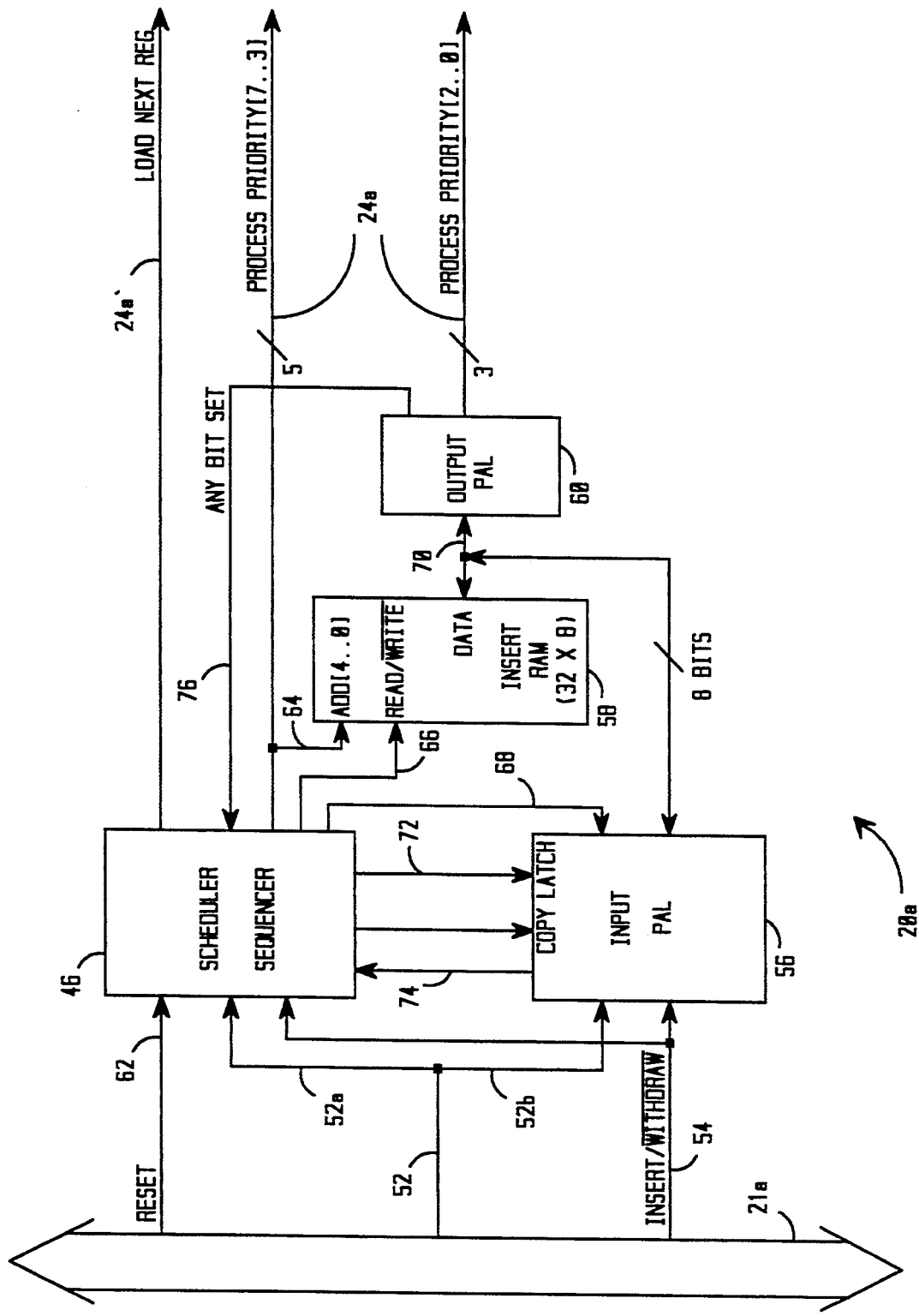
FIG. 5 is a logic diagram of the cluster scheduler shown in FIG. 4.

Cluster scheduler 20a of FIGS. 1-4 is now described in more detail with reference to FIG. 5. As shown in FIG. 5, cluster scheduler 20a comprises a scheduler sequencer 46, an input PAL 56, an insert random access memory (RAM) 58, and an output PAL 60. FIG. 5 demonstrates how cluster scheduler 20a of FIG. 4 is easily and inexpensively implemented using only a few available SSI and MSI integrated circuits.

Communication bus 21a is the conduit for all system bus 8 (shown in FIG. 1) signals to cluster scheduler 20a. Line 54 is connected to input PAL 56. Bus 52, which transmits the priority number of the process requesting scheduling, is divided into bus lines 52a and 52b. Bus 52a is presented to the input of scheduler sequencer 46, and bus 52b is presented to the input of input PAL 56. Bus 52a is a five-bit wide bus which carries the five most significant bits of the priority number for the process requesting scheduling transmitted over bus 52. Bus 52b transmits the three least significant bits of the priority number for the process requesting scheduling. Scheduler sequencer 46 is initially reset by a system reset signal provided via bus 21a over reset line 62. Insert RAM 58, in conjunction with input PAL 56 and scheduler sequencer 46, implements the function of insert register 48 of FIG. 4. Insert RAM 58 has 32 separately addressable eight-bit memory locations (a larger RAM having more than 32 addressable words may be used so long as the unused address lines are tied to a logical low value) and is addressed by scheduler sequencer 46 via bus 64. Scheduler sequencer 46 may read from and write to any one of the 32 selected memory locations using control line 66 connected to the read and write control input of insert RAM 58.

The operation of cluster scheduler 20a now is described with reference to FIG. 5. When the reset signal 62 is asserted, the scheduler sequencer 46 clears all the bits in insert RAM 58 to zero. Scheduler sequencer 46 accomplishes this clearing function by starting at address x00 asserted on bus line 64 and continuing to write zeros in the addressed location using control lines 66 and 68. This initialization process ensures that all process priority numbers contained in the insert RAM 58 are initially set to zero. At the end of the initialization process, the scheduler sequencer 46 loads the next register 38a (shown in FIG. 3) with zero by asserting signal line 24a'. At this point the scheduler sequencer 46 enters an idle stage. Scheduler sequencer 46 remains in the idle state until a new process priority number is presented on bus 52.

When a process requires scheduling by cluster scheduler 20a, the process priority number is transmitted by the process over system bus 8 (shown in FIG. 2) to the cluster scheduler 20a via communication bus 21a. Line 54 is asserted high to indicate that the process priority number needs to be inserted into RAM 58. Line 54 going high causes scheduler sequencer 46 to transfer the five most significant process priority bits from bus 52a to bus 64. The five most significant bits of the process priority number presented on bus 64 are thus presented to the address lines of insert RAM 58. In this way, the scheduler sequencer 46 uses the five most significant bits of incoming process priority numbers to address one of 32 eight-bit words in insert RAM 58. The scheduler sequencer 46 then asserts line 66 high, which enables the selected data word addressed by the five most significant process priority number bits to be output onto bus 70. Scheduler sequencer 46 then latches the selected insert RAM 58 data word from bus 70 into the input PAL 56 by asserting control line 72. At this point, the input PAL 56 contains a copy of the selected one of the 32 eight-bit words in insert RAM 58. The eight-bit data word contained in input PAL 56 was selected by the five most significant bits of the priority process number that was inserted on bus 52.

The three least significant bits of the priority number inserted on bus 52 are input to input PAL 56 over bus 52b. The three least significant bits of the process priority number presented on bus 52b define an address that selects one of the eight previously latched into input PAL 56. The bit selected by the three least significant bits of the priority process number transmitted on bus 52b is either set or cleared depending on the status of control line 54.

Input PAL 56 then affects one of the eight bits previously latched from insert RAM 58 as determined by the status of control line 54 and the three least significant bits of priority process on bus 52b. Input PAL 56 sets a bit in the RAM 58 anytime a process priority number is inserted into cluster scheduler 20a; input PAL 56 clears a bit in the RAM 58 anytime a process priority number is withdrawn from cluster scheduler 20a. For example, if control line 54 is a logical high and bus: 52b is a binary 101, insert PAL 56 sets the fifth bit of the eight bits previously latched from insert RAM 58. Once input PAL 56 sets or clears one of the eight data bits as determined by the least significant process priority bits presented on bus 52b, the affected data word is ready to be reinserted into insert RAM 58. The input PAL 56 signals the scheduler sequencer 46 that it is has affected the selected bit by asserting status line 74. Scheduler sequencer 46 then causes insert RAM 58 to read the affected data word from input PAL 56 into the same address previously selected by the five most significant process priority bits on bus 64. Scheduler sequencer 46 accomplishes the write function by asserting line 66 to a logical low value (assuming that the RAM write control input is true when low). At this point, insert RAM 58 has one of its 256 bits set. The bit that is set is determined by the value of the priority process number inserted on bus 52.

In effect, the insert RAM 58 performs the function of the insert register 40a shown in FIG. 4. Essentially, the insert RAM 58 emulates a 256 by 1 bit register. By using scheduler sequencer 46 in conjunction with the input PAL 56, the insert RAM 58 emulates a 256 by 1 bit register, where any one of the 256 bits can be set or cleared without affecting any other bit in the register.

After sequencer 46 has written the affected data word into insert RAM 58, sequencer 46 then scans insert RAM 58, searching for the highest bit that is set. As discussed hereinabove with reference to insert register 48 (shown in FIG. 4), insert RAM 58 has data bits which represent process priority numbers. The least significant bit of the lowest addressable data word, i.e., bit 0 of data word x00, represents process priority number 0. The most significant bit of the most significant data word, i.e., bit 8 of data word 31 (address x1f), represents process priority number 255. Sequencer 46 scans insert RAM 58 for the most significant bit set in the most significant data word. Sequencer 46 therefore starts by asserting hexadecimal address x1f on bus 64 and keeps line 66 high in order to read the data word associated with the address selected on bus 64 onto bus 70.

Output PAL 60 scans the output thus produced by insert RAM 58 and generates a logical high signal on line 76 if any of the selected bits on bus 70 are set. The sequencer 46 continues to read the contents of RAM 58 until line 76 is asserted high indicating that the sequencer 46 has found a set bit in a data word of insert RAM 58. When sequencer 46 finds a set bit in insert RAM 58, sequencer 46 has found the most significant set bit representing the most significant process priority number awaiting execution (stored in insert RAM 58).

At this point, sequencer 46 must present an eight-bit binary representation of the highest process priority number awaiting execution onto communication bus 24a. The architecture shown in FIG. 5 easily allows for this function. The five most significant bits of the process priority numbers are readily available: these bits are simply the same as the bits used to address insert RAM 58 using bus 64. However, the 3 least significant bits of the process priority number to be communicated on communication bus 24a must be decoded from the eight-bit data word selected from the insert RAM 58 by sequencer 46. The output PAL 60 has an eight-bit to three-bit priority encoder (not shown) which outputs a three-bit binary representation of the highest set bit in the selected data word. The input of the encoder is the eight-bit output of RAM 58 over bus 70. The output of the eight-bit to three-bit priority encoder is provided to the three least significant bits of bus 24a.

Therefore, after the scheduler sequencer 46 has scanned the insert RAM 58 and found the most significant bit that is set, the eight-bit binary representation of that bit is asserted over the communication bus 24a. The sequencer 46 then signals processor interrupter 22 (shown in FIG. 3) using load next line 24a' to load next register 38a (shown in FIG. 3) with the value of the highest process priority number awaiting execution now presented on communication bus 24a. Therefore, as described hereinabove in reference to FIG. 5, cluster scheduler 20a maintains a queue for processes awaiting execution on processors in processor cluster 14a (shown in FIG. 2). Cluster scheduler 20a constantly provides the highest process priority number awaiting execution. Any processor in the parallel processing system of FIG. 2 may insert or withdraw process priority numbers into cluster scheduler 20a via bus 21a. The act of inserting or withdrawing a process priority number will cause cluster scheduler 20a to produce a "new" highest waiting process priority on bus 24a, and will also cause cluster scheduler 20a to load the next register in processor interrupter 22.

The operation of cluster scheduler 20a when withdrawing a process priority number from insert RAM 58 works identically to the operation described above when inserting a process priority number into insert RAM 58. The only difference is the status of line 54 when the input PAL affects the selected bit. If the process priority number is to be withdrawn, line 54 will be a logical low, and the affected bit will be cleared instead of set as described hereinabove.

Figure 6:
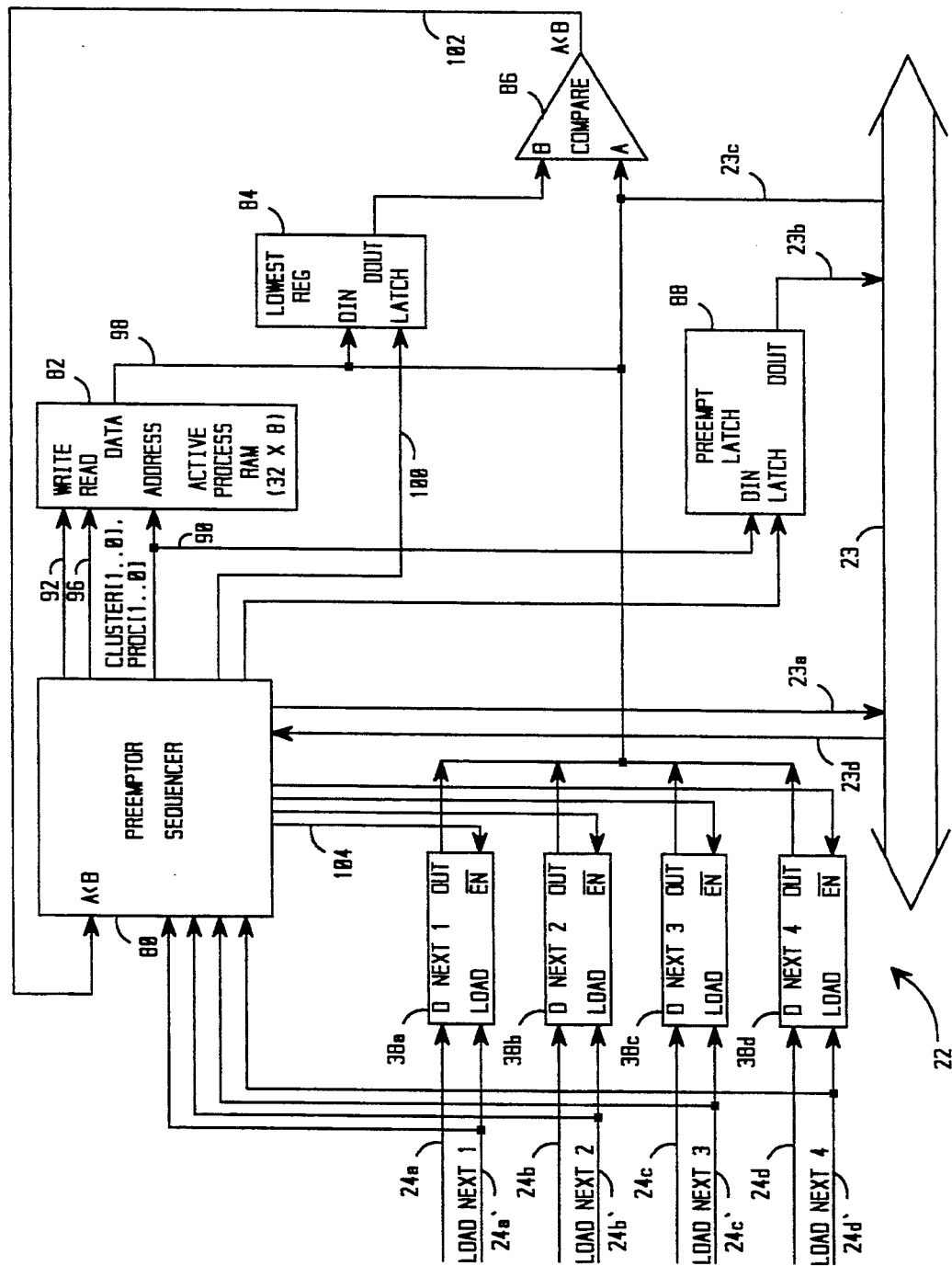
FIG. 6 is a logic diagram of one preferred embodiment of the processor interrupter of the present invention.

Referring to FIG. 6, the processor interrupter 22 is now described in detail. As shown in FIG. 6, one preferred embodiment of the present invention has the processor interrupter 22 which comprises four "tri-state" next registers 38a–38d, a preemptor sequencer 80, an active process RAM 82, an eight-bit register referred to as the lowest register 84, an eight-bit comparator circuit 86, and a four-bit preempt latch 88. The four next registers 38a–38d are loaded by the four cluster schedulers 20a–20d (shown in FIG. 3) with the highest priority number of all the waiting processes awaiting execution on the processor cluster served by each cluster scheduler. Referring simultaneously to FIGS. 3 and 6, next register 38a is loaded by cluster scheduler 20a, next register 38b is loaded by cluster scheduler 20b, next register 38c is loaded by cluster scheduler 20c and next register 38d is loaded by cluster scheduler 20d. The four load control lines 24a'–24d' are monitored by the preemptor sequencer 80. The preemptor sequencer 80 controls the operation of the processor interrupter 22 and is described in more detail hereinafter.

The outputs of any next register may be read by any processor on the VME bus 8 (shown in FIG. 2). Next register outputs may be read by processors on the system bus 8 by addressing the sequencer 80 using bus 23d. The next registers are implemented using conventional "tri-state" latches (e.g. Part No. 74LS374 available from Texas Instruments). The outputs of the next registers 38a–38d are bussed together with the active process RAM outputs on bus 98. Both the next register 38a–38d outputs and the RAM 82 outputs are tri-stated and connected to bus 23c. The outputs of each next register is separately enabled by sequencer 80 via separate control lines. For example, next register 38a is enabled via control line 104. The output of the RAM 82 is also enabled by the sequencer 80 using a control line 96 which controls the read line of RAM 82. When a next register is read by a processor on the bus, the preemptor sequencer will then enable tile next register addressed and generate control signals to bus 23. The next register selected then outputs its data over bus 23c to bus 23 and to the bus interface 18 (shown in FIG. 1). Bus interface 18 generates the necessary VME timing and control signals and transmits the next register data from processor interrupter 22 to the processor reading the next register.

Referring to FIG. 6, the active process RAM 82 implements the bank of 16 active process registers 40 (shown in FIG. 3). The active process RAM 82 is a 16-word by eight-bit random access memory (a memory having more than 16 addressable words can be used, so long as the unused address lines are tied to a logical low value) that is addressed by preemptor sequencer 80 using 4-bit bus 90. Each eight-bit word stored in the RAM 82 holds the priority number of the active process currently executing on the processor associated with that word. For example, the first addressable eight-bit word in RAM 82, word 0 (addressed by asserting a binary 0000 on 4-bit bus 90), holds the priority number of the active process currently executing on processor CPU1 31 (shown in FIG. 2). The second addressable word in RAM 82 (addressed by asserting a binary 0001 on 4-bit bus 90) holds the priority number of the active process currently executing on processor CPU2 32 (shown in FIG. 2). Similarly, the third through sixteenth addressable words (addressed with binary addresses 0002–1111) in RAM 82 respectively hold the priority numbers of the active processes currently executing on processors CPU3 33 through CPU16 35 (shown in FIG. 2).

A processor can write the priority number of the active process that it is currently executing into the eight-bit word in RAM 82 that is associated with that processor. For example, processor CPU1 31 (shown in FIG. 2) can write the priority number of the active process that it is currently executing into word 0 (addressed with a binary 0000 on 4-bit bus 90) of the RAM 82. Similarly, CPU16 35 can write the priority number of the active process that it is currently executing into word 15 (addressed with a binary 1111 on 4-bit bus 90) of the RAM 82.

Similarly to the access method discussed above with reference to accessing the next registers 38a–38d, processors gain access to the RAM 82 by addressing the preemptor sequencer 80 via communication busses 23c and 23d, which transmit (via bus 23) data, control and address signals from the bus interface 18 (shown in FIG. 1) to the components within the processor interrupter 22. Specifically, communication bus 23c transmits the eight-bit data from bus 23 to the data bus 98 connected to the data input/output lines of RAM 82. Communication bus 23d transmits a four-bit address and control signals from bus 23 to the sequencer 80. The sequencer 80 transmits the four-bit address from bus 23d to bus 90 whenever a processor writes its active process number (via bus 23c) into its associated word in RAM 82. As shown in FIG. 6, the write and read controls of active process RAM 82 are controlled by the preemptor sequencer 80 using a control line 92 for writing the RAM 82 and a control line 96 for reading the RAM 82.

The processor interrupter 22 may be best understood by describing its operation with reference to FIG. 6. Upon system start-up, preemptor sequencer 80 is initially reset. Sequencer 80 performs an initialization sequence which writes the decimal value of 255 (the highest possible priority number, hexadecimal xff) into each of the 16 eight-bit words of the active process RAM 82. The sequencer 80 disables the outputs of each next register and asserts write line 92 low (assuming that the conventional write control of RAM 82 is activated when low). Disabling the next register outputs causes the tri-state data bus 98 of the active process RAM 82 to be pulled to a logical high value by pull-up resistors (not shown).

Sequencer 80 then sequences through every address (starting from binary 0000 through binary 1111) of each of the 16 words of the RAM 82. When sequencer 80 has completed its initialization sequence, all of the bits in RAM 82 are set to a logical high value. Accordingly, all of the active process numbers are set to the highest possible priority number 255 (xff). The sequencer performs this initialization sequence to prevent the processor interrupter 22 from interrupting a processor until the processor is first initialized some time after system start-up. When a processor is initialized, it will write a priority number of zero (a zero priority number indicates that the processor is available) into the data word associated with that processor in RAM 82. By writing a zero to the data word associated with the processor, the processor is then released for scheduling. Processes may then be scheduled by the PSI 10 for execution by that processor.

For example, some interval of time after system start-up, processor CPU2 32 (shown in FIG. 2) is initialized. Upon initialization, CPU2 32 writes a x00 to the address of its associated data word in RAM 82, in this case word 1 (addressed with a binary 0001 on bus 90). The address is decoded by bus interface 18 (shown in FIG. 1), and transmitted via bus 23 to bus 23d. The four-bit address and control signals are then presented to the sequencer 80 via bus 23d. The sequencer, in turn, passes the same four bit address to the address control lines of RAM 82 via 4-bit bus 90. The data (x00) is presented to the data input/output port of RAM 82 via bus 23c which is bussed together with tristate bus 98. The sequencer then writes the word, thus clearing the active process priority number, and enabling the scheduling of processes for CPU2 32.

After the sequencer 80 has completed its initialization sequence, it then assumes an idle condition and waits until at least one of the next registers is loaded with a waiting process priority number by at least one of the cluster schedulers. When one of the cluster schedulers loads its next register, one of the load control lines 24a'–24d', will be asserted, and sequencer 80 will leave its idle state and begin sequencing. Sequencer 80 addresses RAM 82 over four-bit bus 90. The two most significant bits of the address contain a two-bit representation of the cluster scheduler which loaded its next register.

For example, if next register 38a is loaded by cluster scheduler 20a (shown in FIG. 3) the two most significant bits on 4-bit bus 90 will be 00. However, if next register 38c was loaded, the two most significant bits of the address presented to RAM 82 on 4-bit bus 90 will be 10. Therefore, depending upon which next register is loaded, sequencer 80 selects one of four groups of data words in RAM 82 which corresponds to the next register which was loaded. Sequencer 80, having set the two most significant bits on 4-bit bus 90 to select a group of four data words, then uses the two least significant bits on 4-bit bus 90 to sequence through the four data words associated with the next register that was loaded. Each group of four data words in RAM 82 contain the priority number of the processes currently executing on processors associated with each next register 38a–38d.

More specifically, the RAM 82 is arranged so that the four least significant data words (0–3) contain the priority process numbers of the four processes currently executing on the processors associated with next register 38a. The next four data words in RAM 82 (4–7) contain the active process priority numbers for the processes currently executing on the processors associated with next register 38b. The next four data words in RAM 82 contain the active process priority numbers for the processes executing on processors associated with next register 38c. Finally, the last four data words in RAM 82 (12–15) contain the active process priority numbers for the processes currently executing on processors associated with next register 38d.

Sequencer 80, after sensing that a next register is loaded, reads the four active process priority numbers associated with the next register that caused sequencer 80 to leave its idle state. Sequencer 80 reads the four values from RAM 82 and, in conjunction with register 84 and comparator 86, determines the lowest active process priority number of the four active process priority numbers selected. Once the lowest process priority number is selected, it is placed in register 84 and compared with the process priority number contained in the next register. The comparison function is performed by compare circuit 86. If the value in the next register is higher than the lowest active process priority number, the sequencer 80 interrupts the processor associated with the lowest process priority number.

For example, assume that cluster scheduler 20a (shown in FIG. 3) loads next register 38a with the value of the highest process priority number requiring scheduling. Sequencer 80 will detect that next register 38a was loaded by sensing line 24a' going high. Sequencer 80 then begins addressing RAM 82 by placing a 00 on the two most significant bits of 4-bit bus 90, and a 00 on the two least significant bits which represent the process or number. Therefore, sequencer 80 starts addressing RAM 82 at binary address 0000. Sequencer 80 then asserts line 96 high causing the active process priority number contained in data word 0 of RAM 82 to be asserted on bus 98. Using control line 100, the sequencer 80 latches the value of the read active process priority number into lowest register 84. Sequencer 80 then increments the address on 4-bit bus 90 to binary 0001 and reads the next active process priority number associated with the next processor onto bus 98. The two active processes are then compared using compare circuit 86. The output of compare circuit 86 is connected to the sequencer 80 with line 102.

If the output of RAM 82 is less than the output of the lowest register 84, the sequencer 80 loads the output of RAM 82 into the lowest register 84. If the output of the RAM 82 is less than or equal to the output of the lowest register 84, the sequencer 80 leaves the lowest register 84 unaffected. In either case, sequencer 80 increases the address on 4-bit bus 90 by 1, to a binary 0010. This action causes the next active process priority number to be asserted onto bus 98 and compared with the value of lowest register 84. This sequence repeats until all four process priority numbers for active processes in RAM 82 have been read and compared.

When sequencer 80 has sequenced through all four active process priority numbers, the value of the lowest active process priority number remains in the lowest register 84. Sequencer 80 then enables the output of next register 38a using enable line 104. The value of next register 38a is then compared to the lowest active process priority number by eight-bit comparator circuit 86.

If the value of next register 38a is less than the value of the lowest active process priority number, sequencer 80 takes no action and returns to an idle condition. However, if the value of next register 38a is greater than the value of the lowest active process priority number, sequencer 80 loads the four-bit address of the lowest active process priority number into the preempt latch 88. Therefore, the preempt latch 88 contains a four-bit nibble which indicates which of the 16 processors require interrupting. Sequencer 80 then raises interrupt flag 23a and causes the interrupt address to be asserted over communication bus 23. Raising signal line 23a causes the selected processor to be interrupted. In the parallel processing system of FIG. 2, processor interrupter 22 initiates an interrupt over system bus 8. The interrupt is handled by request flow manager 12a. Request flow manager 12a reads the value of preempt latch 88 (shown in FIG. 6) to determine which processor requires interruption. The interrupt line of the selected processor is driven causing the active process on that processor to suspend execution. The suspended process stores context information into cluster memory located in the cluster associated with that processor. This allows any other processor to resume processing where the suspended process terminated.

Whenever a process is suspended, it inserts its process priority number into a cluster scheduler. This causes the suspended process to be queued for scheduling. When the preempting process, which is not a multi-threaded process, begins execution on the interrupted processor, it withdraws its priority process number from the insert register of the cluster scheduler which scheduled that process. The preempting process also writes its priority number into its associated data word in the active process RAM 82 of the processor interrupter 22 (shown in FIG. 6). In this manner, processor interrupter 22 keeps a record of the priority numbers of all the active processes in the system.

As discussed above, any processor may dynamically change its priority number by writing a different priority number to the active process RAM in processor preemptor 22. Also, any processor may read any next register from processor preemptor 22 by addressing the register over system bus 8. The cluster schedulers ensure that the next registers always contain the highest priority waiting process. The next register may not be read while the cluster is scheduling. The scheduler sequencer prevents any processor from reading the next register for the short period of time after being initiated by a new insert register access. When the cluster scheduler sequencer finishes scheduling, the next register may be read. Therefore, any processor can determine which process to execute next by reading its next register. The process is guaranteed to be the next highest priority process to execute.

An alternative embodiment of the present invention has an individual processor interrupter 22 for each cluster scheduler 20. The preferred embodiment of the present invention shown in FIG. 2 uses a central processor interrupter 22 which services four cluster schedulers. The central processor interrupter 22 was implemented due to the cost and size constraints presented by having individual cluster scheduler processor interrupters. However, as discussed above, applicants expect that the cost of VLSI technology will decrease and that the present invention will in the future be implemented on a single VLSI device. At that time, each cluster scheduler will have a dedicated processor interrupter which works identically to the processor interrupter of the preferred embodiment, except that it services only one cluster scheduler instead of four.

As discussed above, the PSI 10 of the present invention also facilitates scheduling of "multi-threaded processes" The software application using the present invention maintains tables which indicate whether a process is multi-threaded. The software tables also indicate how many processors are to be allocated to this multi-threaded process. Multi-threaded processes require that one to n processors execute one to n sub-processes. The processors operate on separate data.

Typically, processes will not reschedule themselves during execution. An exception is made for multi-threaded processes. If a multi-threaded process executes on a processor, the process priority number associated with that process is left in the cluster scheduler until the multi-threaded process terminates. More specifically, when a process is dispatched to a processor, it usually withdraws its priority number from the cluster scheduler insert register as described above. However, if a process is multi-threaded, it does not withdraw its priority number from the cluster scheduler. The process is able to determine that it is multi-threaded by referring to software tables maintained by the software system.

After leaving its priority number in the cluster scheduler insert register, the multi-threaded process then determines how many processors it has allocated to it. It then can initiate its sub-processes to the available processors. When a processor no longer executes a higher priority process, the PSI dispatches sub-processes to available processors in the manner described hereinabove. As processors become available, or as the multi-threaded process becomes the highest priority process awaiting execution, the multi-threaded process will be dispatched to a processor for execution.

One preferred embodiment of the present invention has been implemented using the well known VME bus. The cluster scheduler and processor interrupter, as currently implemented, are now briefly discussed. However, the actual implementation of the PSI 10 of the present invention represents only one embodiment. The present invention may be implemented on several computer busses using the preferred embodiments discussed in detail above. Therefore, the following discussion is for explanation purposes and should not limit the scope of the invention.

Figure 7B:
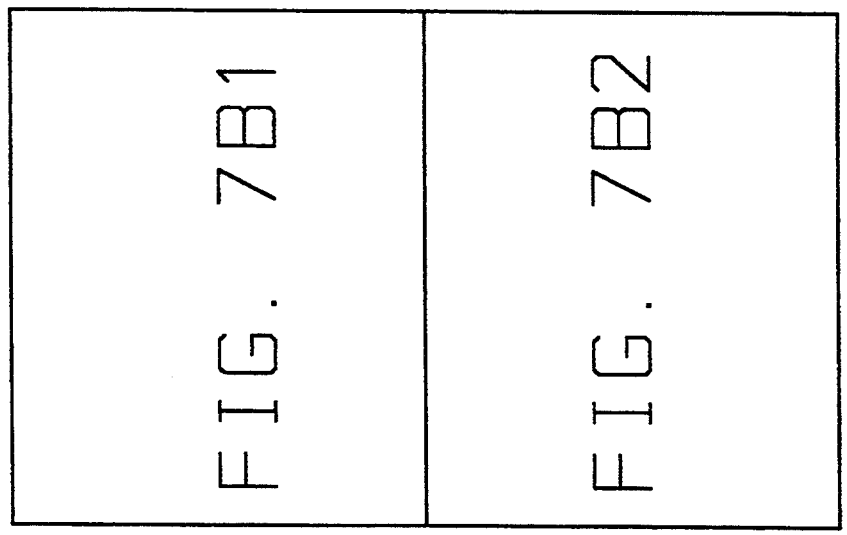
Figure 7C:
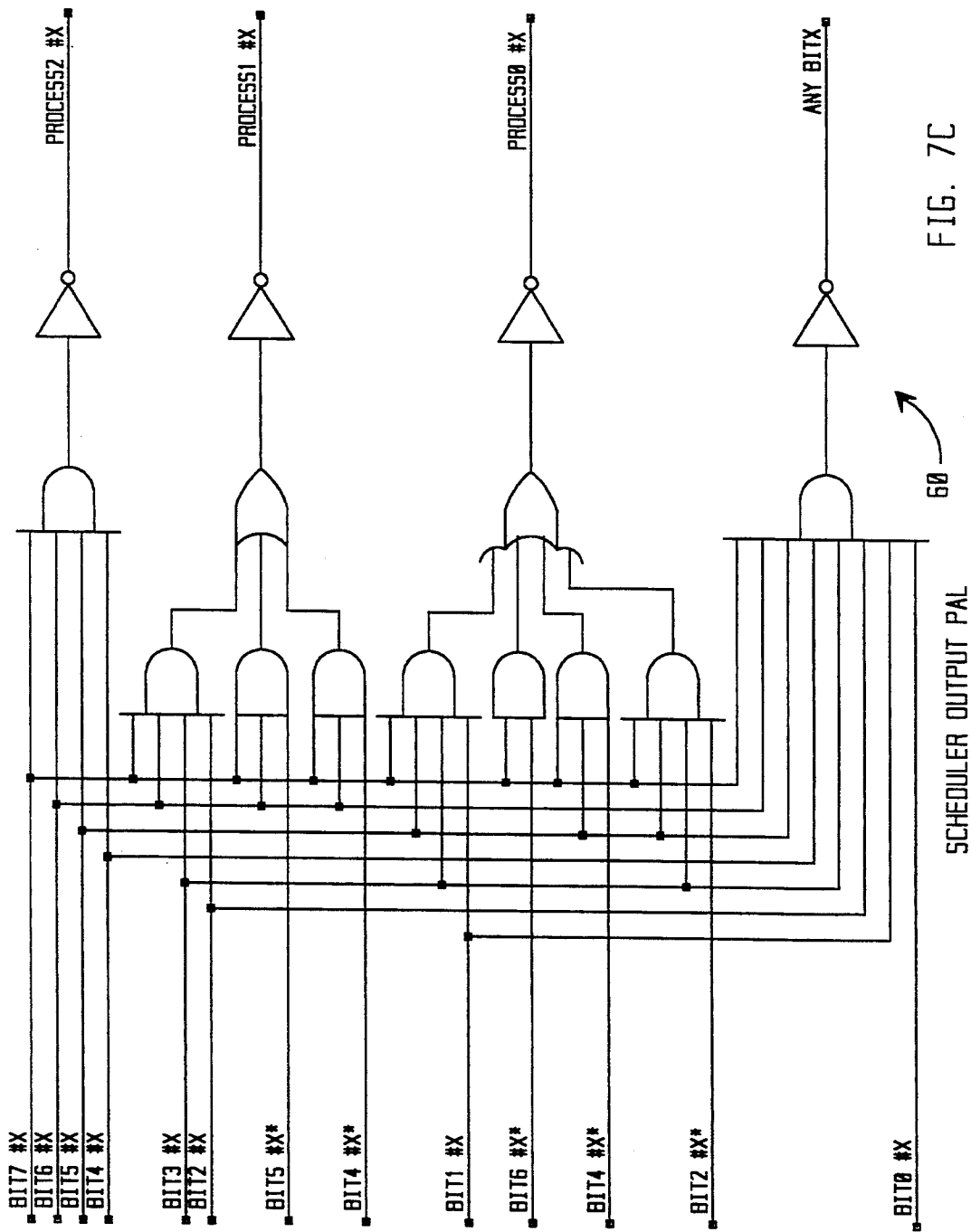
Figure 7D:
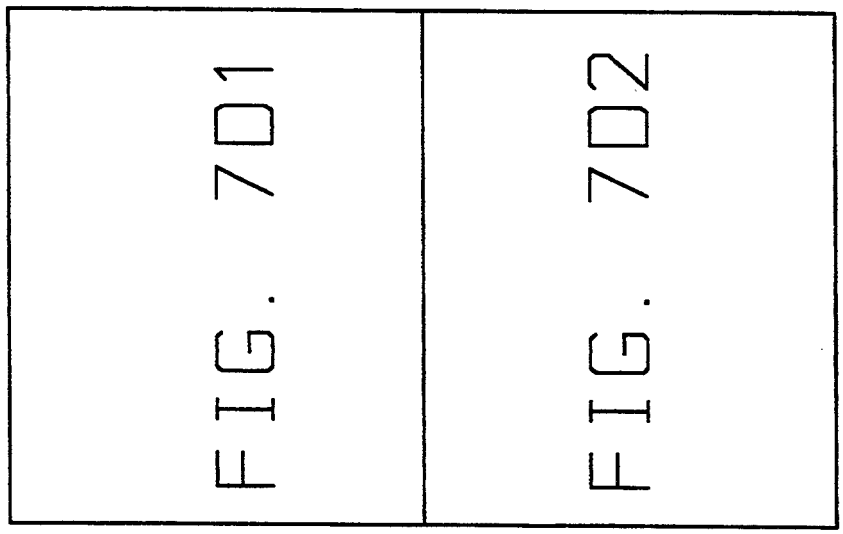
Figure 702:
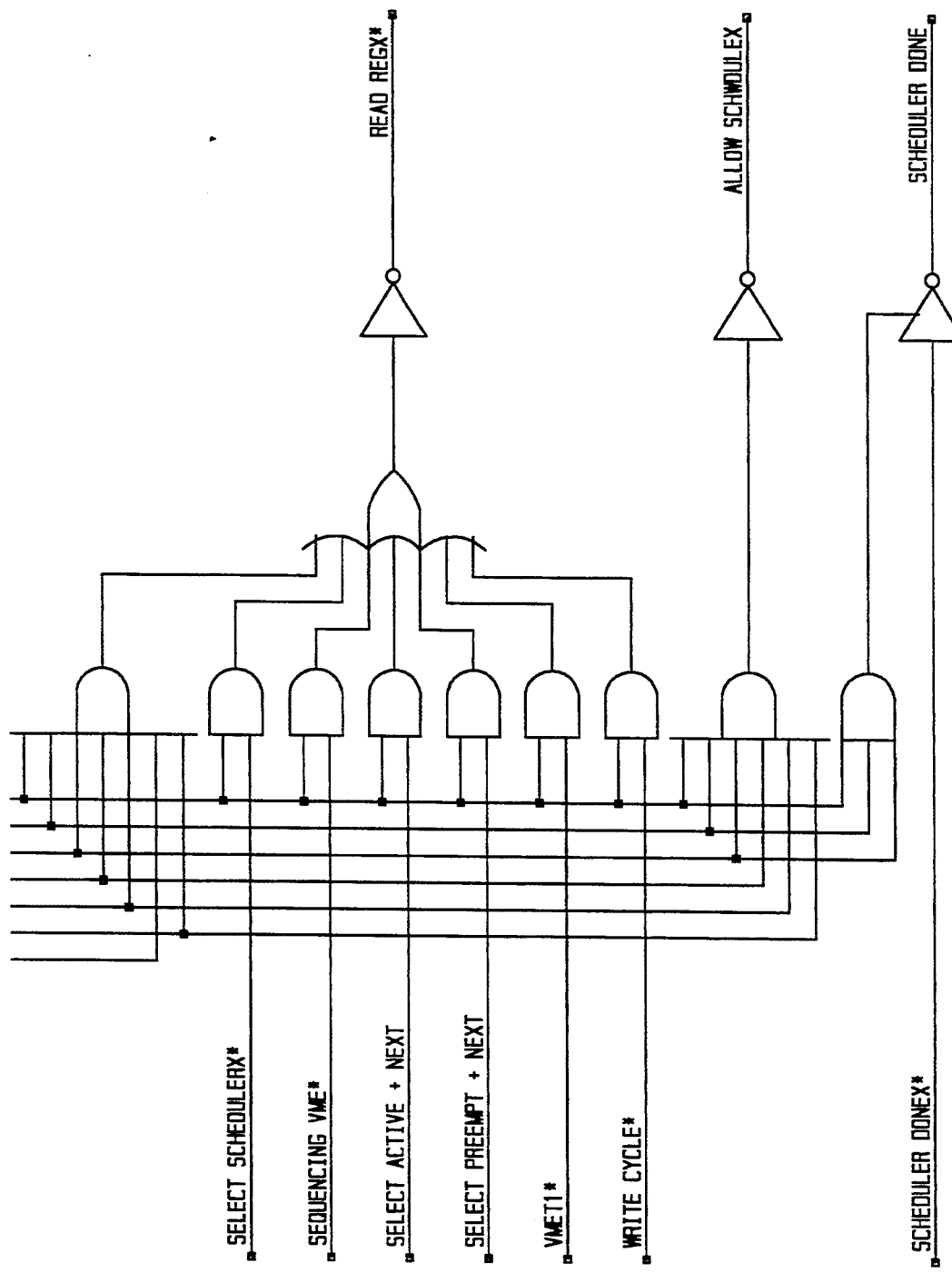
Figure 7E:
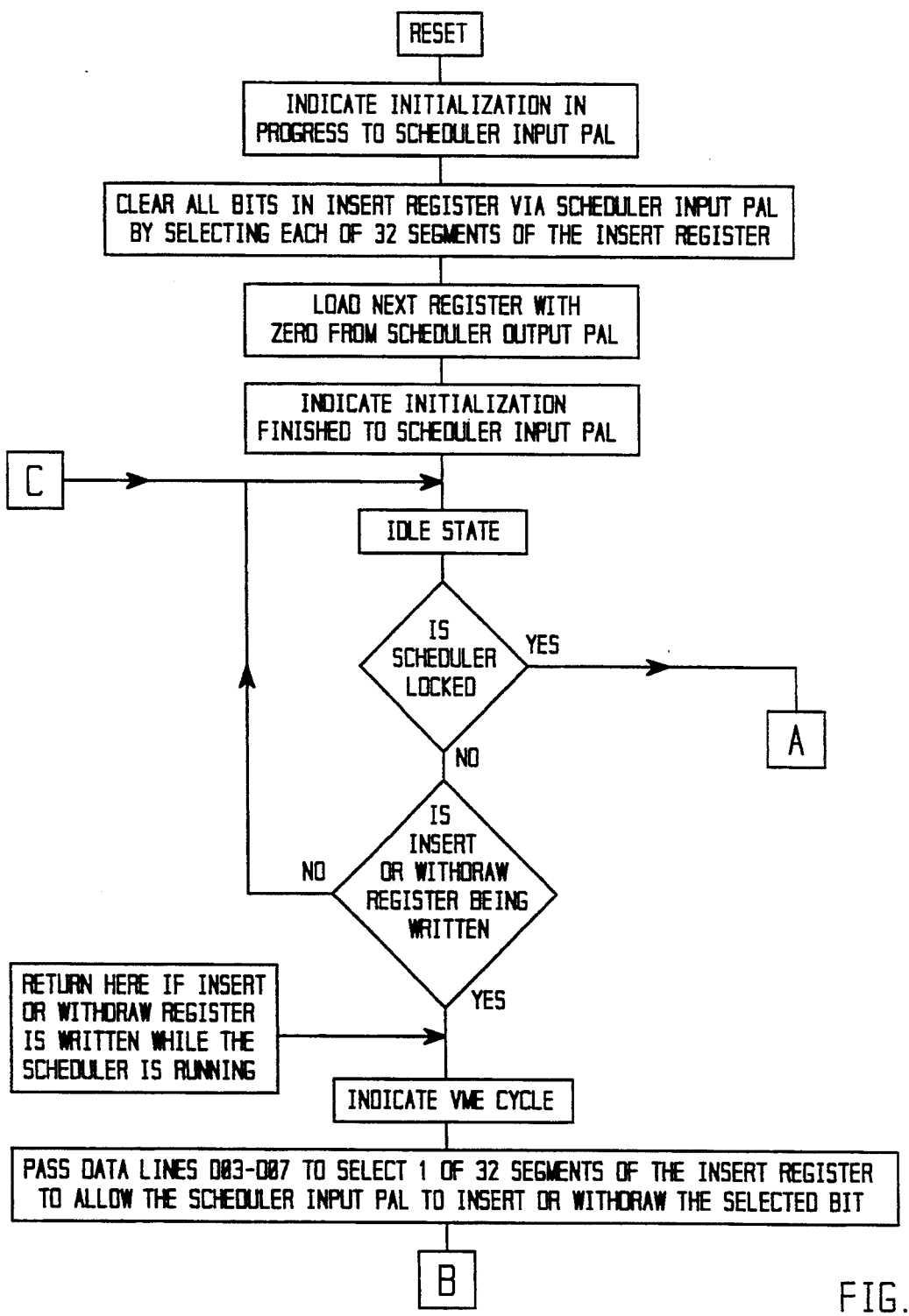
FIGS. 7e-7f are the flow-diagrams of a cluster scheduler sequencer implemented on the VME bus.
Figure 7F:
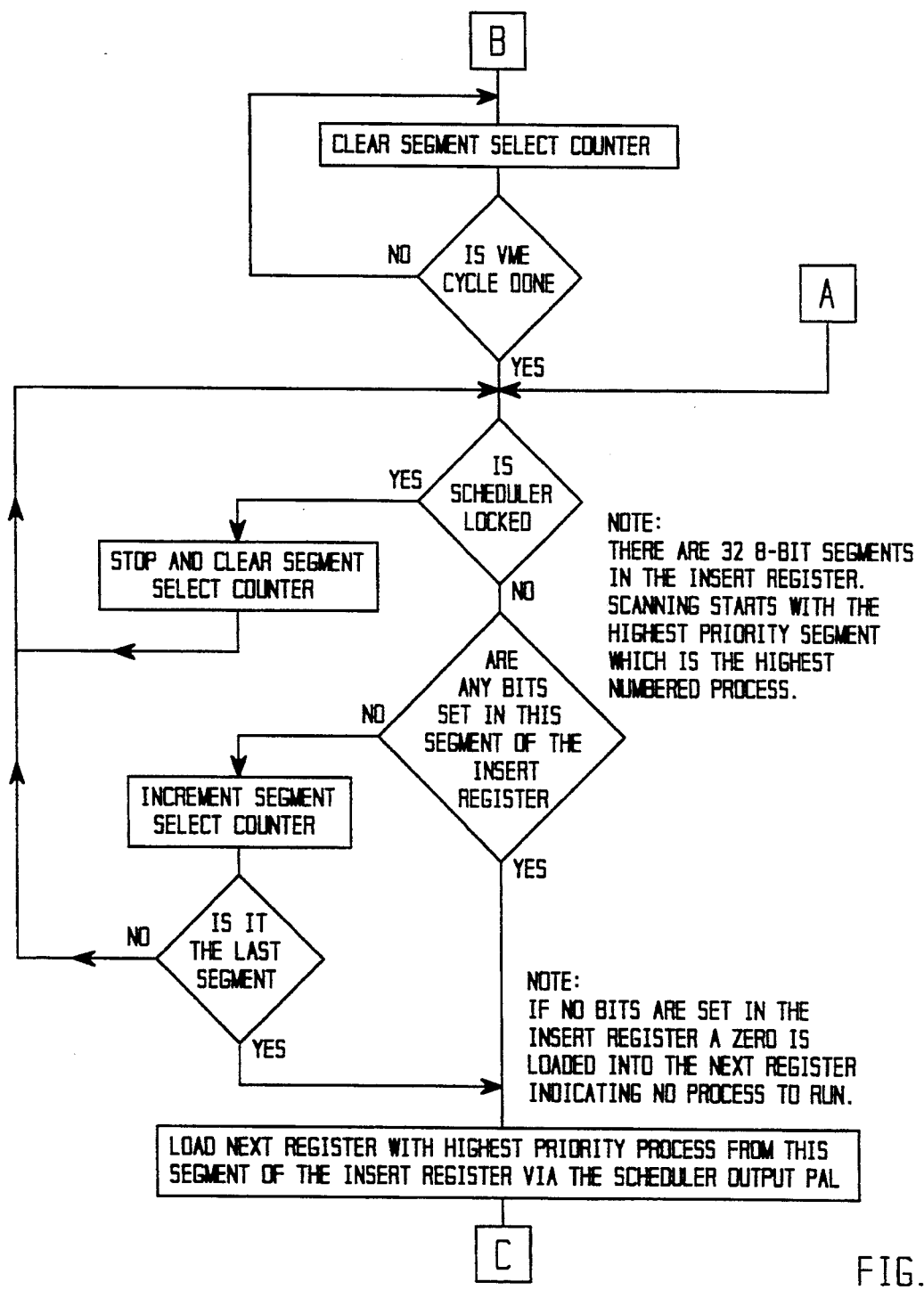

FIGS. 7a–7d, taken together with the scheduler sequencer flow-diagrams shown in FIGS. 7e–7f, in conjunction with the PAL programming equations attached in Appendix A, show the actual VME bus implementation of the cluster scheduler (of FIG. 5) of the present invention. Referring simultaneously to FIGS. 5 and 7a, the VME implementation of the cluster scheduler 20a shown in FIG. 5 is now described with reference to FIG. 7a. As shown in FIG. 7a, cluster scheduler 20a comprises a sequencer 46a, a PAL 46b, an input PAL 56, an insert random access memory (RAM) 58, and an output PAL 60. FIG. 7a demonstrates how cluster scheduler 20a of FIG. 5 is easily and inexpensively implemented using only a few available SSI and MSI integrated circuits. The scheduler sequencer 46 (shown as one device in FIG. 5) is actually implemented with two devices: the sequencer 46a and the PAL 46b. PAL 46b provides some of the interface functions to interface the cluster scheduler 20a with the VME bus. The other four devices, the sequencer 46a, the input pal 56, the insert RAM 58, and the output PAL 60, perform as described above with reference to FIG. 5.

Insert RAM 58 is implemented with a conventional 2048 word by 8-bit Static RAM (Part No. CY7C128, available from Cypress Semiconductor Corp.). As shown in FIG. 7a, the 2K by 8 SRAM is used as a 32 word by 8-bit RAM because the lowest six address bits are connected to ground. PAL 46b, input PAL 56 and output PAL 60 are all implemented using conventional 16-input, 8-output and-or-invert programmable array logic devices (Part No. PAL 16L8, available from Texas Instruments, Inc.). The logic diagram of the programmed input PAL device 56 is shown in FIG. 7b. The logic diagram of the programmed output PAL device 60 is shown in FIG. 7c. The logic diagram of the programmed sequencer/interface device 46b is shown in FIG. 7d.

The scheduler sequencer 46a is a programmable sequence generator (Part No. PSG 507, available from Texas Instruments, Inc.). The scheduler sequencer 46a is programmed in accordance with the scheduler sequencer flow-diagrams shown in FIGS. 7e–7f. The flow-diagram illustrates the operation of the sequencer 46 as described above with reference to FIG. 5. The PAL programming equations for programming the scheduler sequencer are given in Appendix A. Appendix A shows the source code for programming the scheduler sequencer 46a generated using the ProLogic Compiler (1988 Copyright Inlab, Inc.) available from Texas Instruments, Inc. The source code is readily convertible into standard JEDIC format used for programming the sequencer device.

Figure 8A:
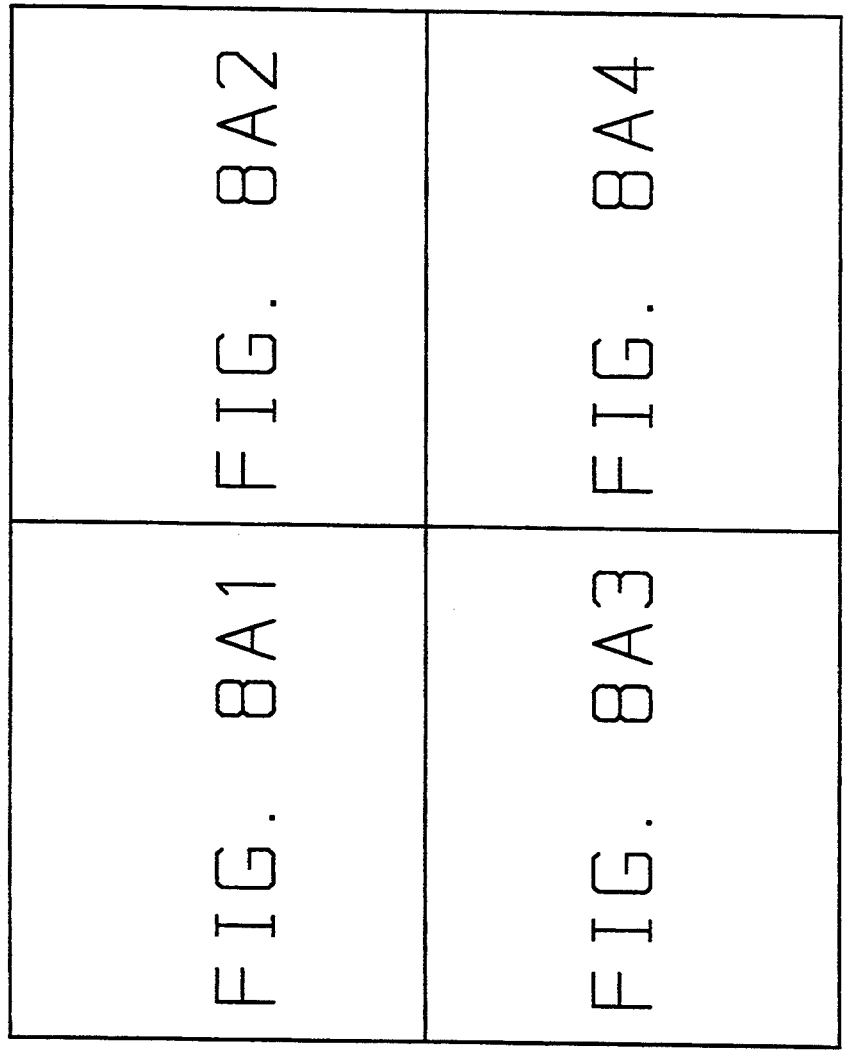
Figure 8B:
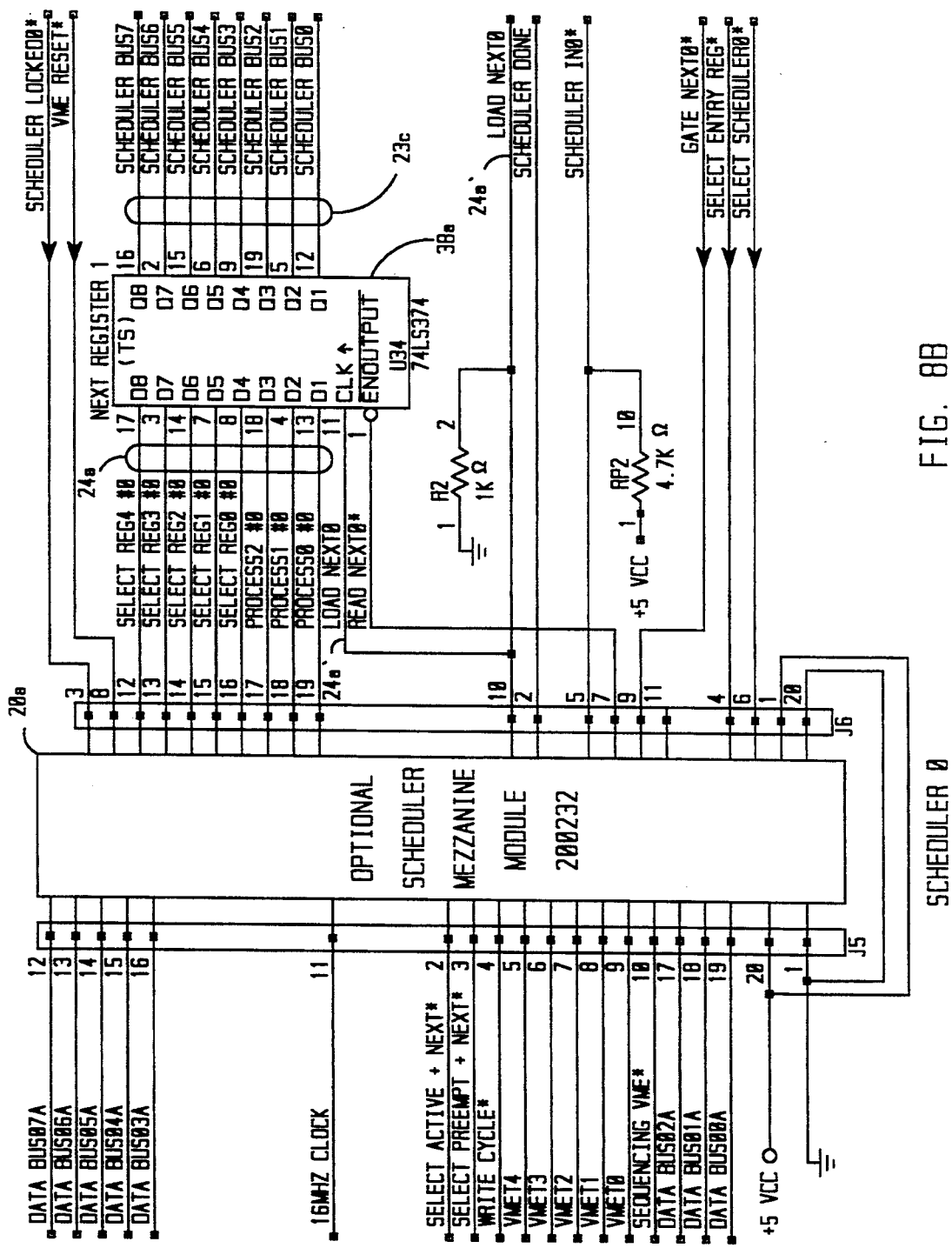
Figure 8C:
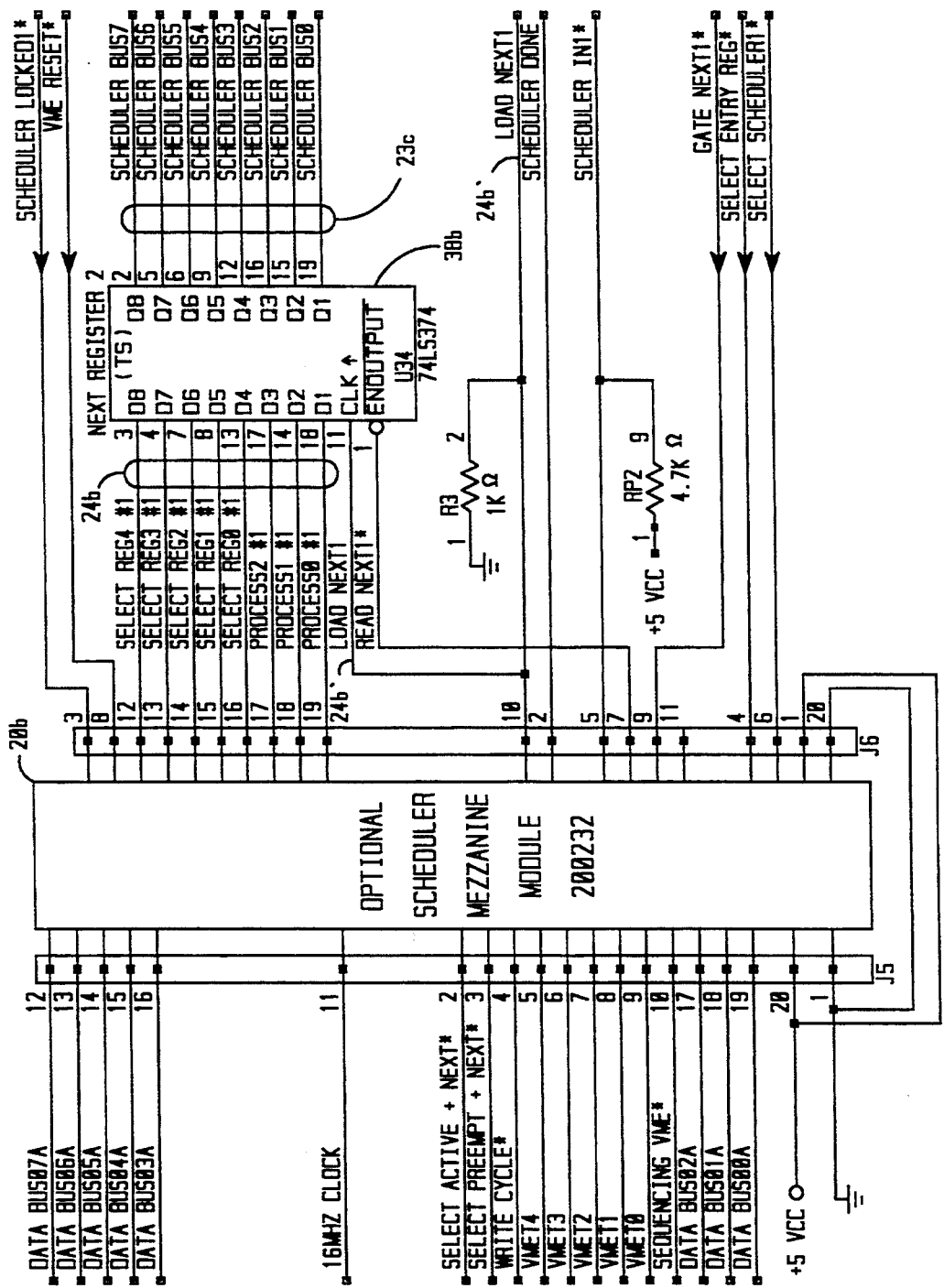
Figure 8D:
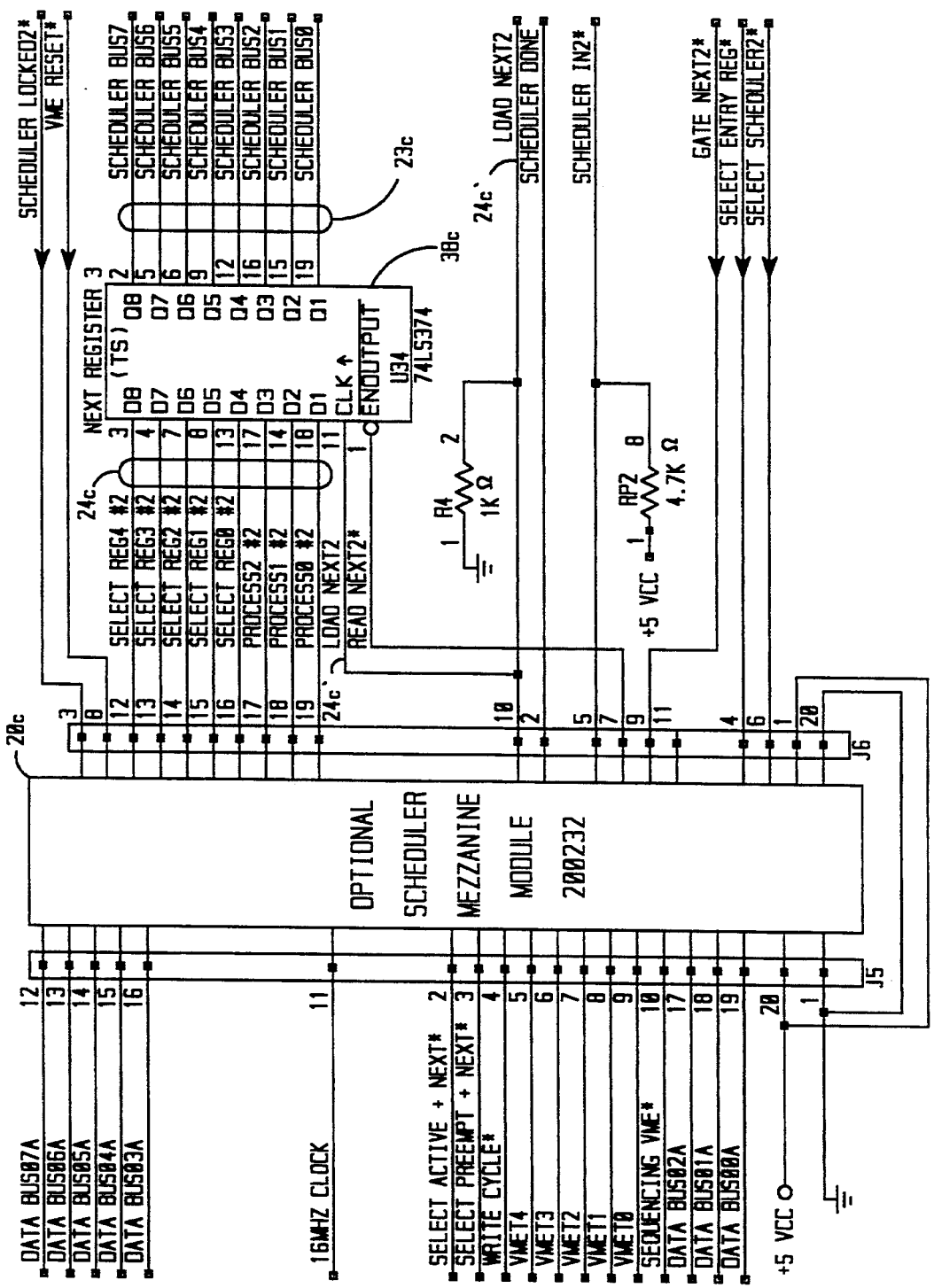
Figure 8E:
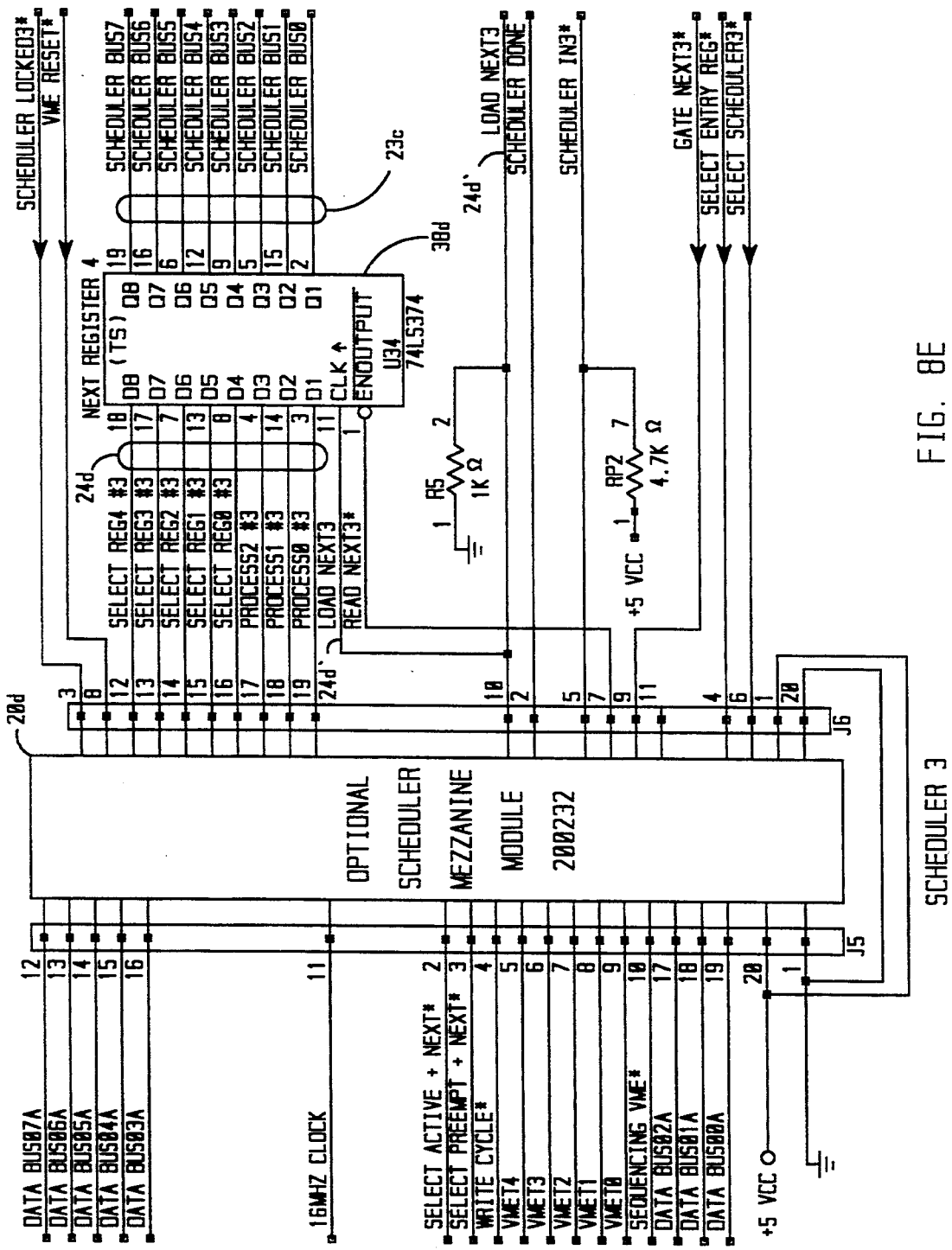
Figure 8G:
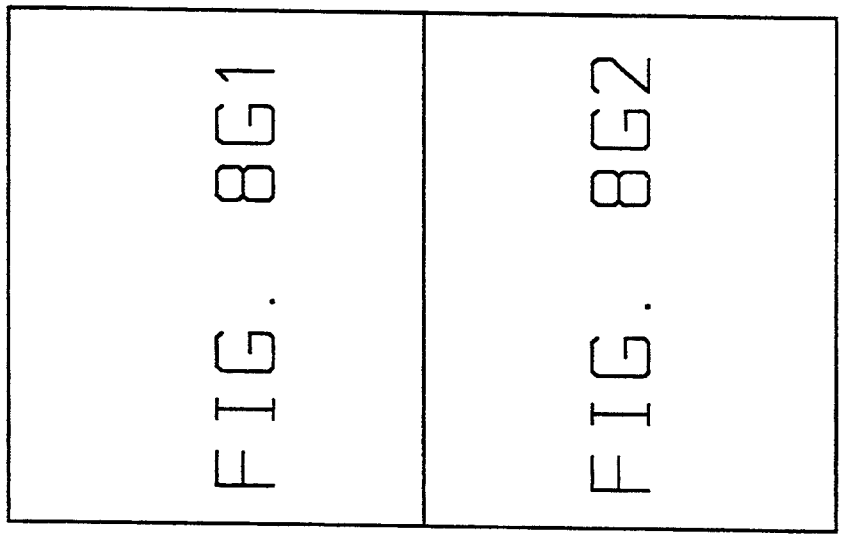
Figure 81:
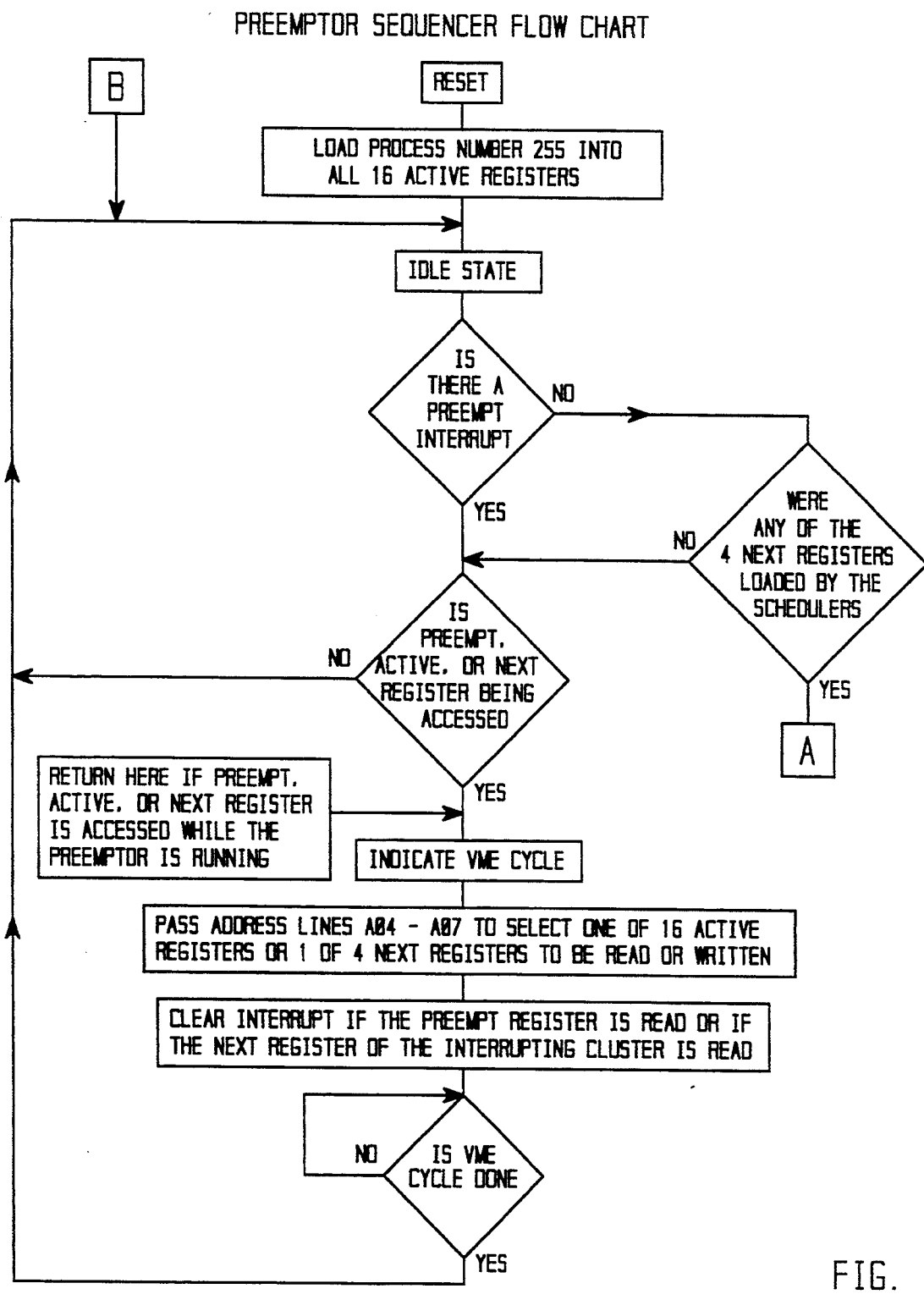
Figure 8J:
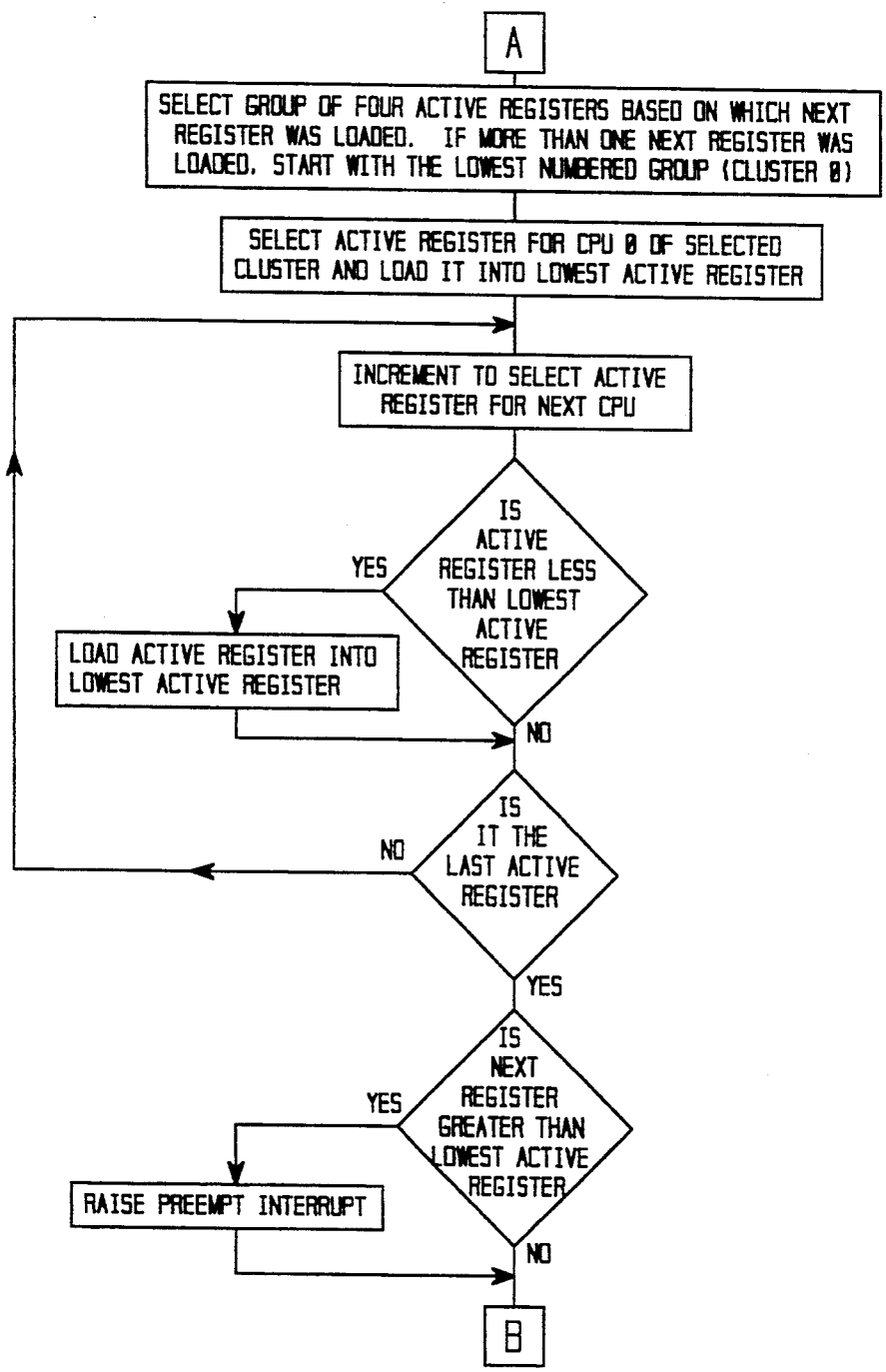

FIGS. 8a–8h, taken together with the preemptor sequencer flow-diagrams shown in FIGS. 8i–8j, in conjunction with the PAL programming equations attached in Appendix B, show the actual VME implementation of the processor interrupter 22 (of FIG. 6) of the present invention.

Referring to FIG. 8a, the processor interrupter 22 as actually implemented on the VME bus is now briefly described. As shown in FIG. 8a, this embodiment of the present invention has a processor interrupter 22 which comprises a preemptor sequencer 80a, PAL 80b and PAL 80c (which together implement the preemptor sequencer 80 of FIG. 6), an active process RAM 82, an eight-bit register referred to as the lowest register 84, an eight-bit comparator circuit 86, and a four-bit preempt latch PAL 88. In addition, processor interrupter has four next registers as described above with reference to FIG. 6.

FIGS. 8b–8e show the four "tri-state" next registers 38a–38d of the processor interrupter 22. The four next registers 38a–38d are loaded by the four cluster schedulers 20a–20d (shown in FIGS. 8b–8e as optional mezzanine modules) with the highest priority number of all the waiting processes in the cluster schedulers. Referring simultaneously to FIGS. 8b–8e, next register 38a is loaded by cluster scheduler 20a, next register 38b is loaded by cluster scheduler 20b, next register 38c is loaded by cluster scheduler 20c and next register 38d is loaded by cluster scheduler 20d. The next register outputs may be accessed by any processor on the bus via bus 23c. The next registers are implemented with octal edge-triggered tri-state flip-flop devices (Part No. 74LS374, available from Signetics Company).

Referring now to FIG. 8a, the four load control lines 24a'–24d' are monitored by the preemptor sequencer 80a–80c shown in FIG. 8a. The preemptor sequencer 80a–80c controls the operation of the processor interrupter 22. The processor interrupter 22 functions as described above with reference to FIG. 6, with the exception that PALs 80b and 80c perform some VME interface functions as well as assisting the preemptor sequencer 80a. Specifically, the preempt latch 88, active process RAM 82, next registers 38a–38d (shown in FIGS. 8b–8e), and lowest latch 84 perform as described above with reference to FIG. 6.

The active process RAM 82 is implemented with a conventional 2048 word by 8-bit Static RAM (Part No. CY7C128, available from Cypress Semiconductor Corp.). As shown in FIG. 8a, the 2K by 8 SRAM is used as a 16 word by 8-bit RAM because the seven most significant address bits are connected to ground. PAL 80b and preempt latch 88 are implemented using conventional 16-input, 8-output and-or-invert programmable array logic devices (Part No. PAL 16L8, available from Texas Instruments, Inc). The logic diagram of the programmed preempt latch 88 PAL device is shown in FIG. 8f. The logic diagram of the programmed PAL device 80b is shown in FIG. 8g. PAL 80c is implemented using a conventional programmable array logic device (Part No. PAL 16R4, available from Texas Instruments, Inc.). The logic diagram of the programmed PAL device 80c is shown in FIG. 8h.

The preemptor sequencer 80a is a programmable logic sequencer (Part No. PLS 506, available from Texas Instruments, Inc.). The preemptor sequencer 80a is programmed in accordance with the preemptor sequencer flow-diagram shown in FIGS. 8i–j. The flow-diagram illustrates the operation of the sequencer 80 as described above with reference to FIG. 6. The PAL programming equations for programming the preemptor sequencer 80a are given in Appendix B. Appendix B shows the source code for programming the preemptor sequencer 80a generated using the ProLogic Compiler (1988 Copyright Inlab, Inc.) available from Texas Instruments, Inc. The source code is readily convertible into standard JEDIC format used for programming the sequencer device.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

APPENICE A

```
title    {       Device: PSG507
                 Machine: BELOBOX
                 Module: PSI
                 Purpose: SCHEDULER'S Sequencer
                 Engineer: DAVE
                 Date: 7 AUG 92
                 Part Number: 093017-003
                 Version: A.0
}
include a507;
define   DATABUS07A           =  pin2;
define   DATABUS06A           =  pin3;
define   DATABUS05A           =  pin4;
define   DATABUS03A           =  pin5;
define   DATABUS04A           =  pin6;
define   SCHEDULERLOCKEDX     =  !pin7;
define   SCHEDULERDONEX       =  pin8;
define   INITIALIZEX          =  pin9;
define   SELECTREG3X          =  pin10;
define   SELECTREG4X          =  pin11;
define   SELECTREG2X          =  pin13;
define   SELECTREG0X          =  pin14;
define   SELECTREG1X          =  pin15;
define   LOADNEXTX            =  pin16;
define   ANYBITX              =  pin18;
define   VMERESET             =  !pin19;
define   ALLOWSCHEDULEX       =  pin20;
define   Q_INIT               =  p0.q;
define   S_INIT               =  p0.s;
define   R_INIT               =  p0.r;
define   Q_RUN                =  p1.q;
define   S_RUN                =  p1.s;
define   R_RUN                =  p1.r;
define   Q_LOAD               =  p2.q;
define   S_LOAD               =  p2.s;
define   R_LOAD               =  p2.r;
define   Q_SELECTVME          =  p3.q;
define   S_SELECTVME          =  p3.s;
define   R_SELECTVME          =  p3.r;
define   Q_WRTRAM             =  p4.q;
define   S_WRTRAM             =  p4.s;
define   R_WRTRAM             =  p4.r;
define   CHECKBITS            =  c0;
define   CTR0                 =  c1;
define   CTR1                 =  c2;
define   CTR2                 =  c3;
define   CTR3                 =  c4;
define   CTR4                 =  c5;
define   INITCTR              =  sclr0;
```

```
define   S_CLRCTR              =  sclr1.s;
define   R_CLRCTR              =  sclr1.r;
define   STOPCTR               =  hld0;
define   S_HOLDCTR             =  hld1.s;
define   R_HOLDCTR             =  hld1.r;
define   P_RESET               =  pt00;
define   P_VMESELECTREG0X      =  pt01;
define   P_VMESELECTREG1X      =  pt02;
define   P_VMESELECTREG2X      =  pt03;
define   P_VMESELECTREG3X      =  pt04;
define   P_VMESELECTREG4X      =  pt05;
define   P_CTRSELECTREG0X      =  pt06;
define   P_CTRSELECTREG1X      =  pt07;
define   P_CTRSELECTREG2X      =  pt08;
define   P_CTRSELECTREG3X      =  pt09;
define   P_CTRSELECTREG4X      =  pt10;
define   P_INITDONE            =  pt11;
define   P_INITIALIZEX         =  pt12;
define   P_STARTSCHEDULE       =  pt13;
define   P_BEGINSCHEDULE       =  pt14;
define   P_ENDSCHEDULE         =  pt15;
define   P_LOADDONE            =  pt16;
define   P_FULLCOUNT           =  pt17;
define   P_BITSSET             =  pt18;
define   P_FULLCOUNTSTOP       =  pt19;
define   P_BITSSETSTOP         =  pt20;
define   P_SCHEDULERLOCKEDXED  =  pt21;
define   P_FINISHED            =  pt22;
define   P_VMECYCLE            =  pt23;
define   P_NOVMECYCLE          =  pt24;
define   P_SETWRTRAM           =  pt25;
define   P_RSTWRTRAM           =  pt26;
define   P_WRTRAM              =  pt27;
oe = 1;

P_RESET                 = VMERESET;

SELECTREG0X             = P_VMESELECTREG0X
                        | P_CTRSELECTREG0X;

P_VMESELECTREG0X        = Q_SELECTVME     & DATABUS03A;

P_CTRSELECTREG0X        = !Q_SELECTVME    & !CTR0;

SELECTREG1X             = P_VMESELECTREG1X
                        | P_CTRSELECTREG1X;

P_VMESELECTREG1X        = Q_SELECTVME     & DATABUS04A;

P_CTRSELECTREG1X        = !Q_SELECTVME    & !CTR1;

SELECTREG2X             = P_VMESELECTREG2X
                        | P_CTRSELECTREG2X;

P_VMESELECTREG2X        = Q_SELECTVME     & DATABUS05A;

P_CTRSELECTREG2X        = !Q_SELECTVME    & !CTR2;

SELECTREG3X             = P_VMESELECTREG3X
                        | P_CTRSELECTREG3X;

P_VMESELECTREG3X        = Q_SELECTVME     & DATABUS06A;

P_CTRSELECTREG3X        = !Q_SELECTVME    & !CTR3;

SELECTREG4X             = P_VMESELECTREG4X
                        | P_CTRSELECTREG4X;
```

```
P_VMESELECTREG4X       = Q_SELECTVME      & DATABUS07A;

P_CTRSELECTREG4X       = !Q_SELECTVME     & !CTR4;

INITIALIZEX            = P_INITIALIZEX;
P_INITIALIZEX          = Q_INIT           & Q_RUN;

S_INIT                 = P_RESET;

R_INIT                 = P_INITDONE;

P_INITDONE             = Q_INIT           & Q_RUN      & Q_LOAD     & !VMERESET;

S_RUN                  = P_RESET
                       | P_STARTSCHEDULE
                       | P_SCHEDULERLOCKEDXED;

R_RUN                  = P_ENDSCHEDULE;

P_SCHEDULERLOCKEDXED   = SCHEDULERLOCKEDX & !Q_INIT;

P_STARTSCHEDULE        = Q_SELECTVME      & !VMERESET;

P_ENDSCHEDULE          = Q_LOAD           & !VMERESET;

S_LOAD                 = P_FULLCOUNT
                       | P_BITSSET;

R_LOAD                 = P_LOADDONE
                       | P_RESET;

P_FULLCOUNT            = Q_RUN            & !Q_LOAD    & CHECKBITS & !VMERESET &
                         CTR0             & CTR1       & CTR2       & CTR3       &
                         CTR4;

P_BITSSET              = Q_RUN            & !Q_LOAD    & CHECKBITS & ANYBITX    &
                         !Q_INIT          & !VMERESET;

P_LOADDONE             = Q_RUN            & Q_LOAD     & !VMERESET;

S_SELECTVME            = P_VMECYCLE;

R_SELECTVME            = P_NOVMECYCLE
                       | P_RESET;

P_VMECYCLE             = !ALLOWSCHEDULEX  & !Q_INIT    & !VMERESET;

P_NOVMECYCLE           = ALLOWSCHEDULEX;

INITCTR                = P_RESET
                       | P_STARTSCHEDULE
                       | P_SCHEDULERLOCKEDXED;

S_CLRCTR               = P_LOADDONE;

R_CLRCTR               = P_RESET
                       | P_STARTSCHEDULE
                       | P_SCHEDULERLOCKEDXED;

STOPCTR                = P_FULLCOUNTSTOP
                       | P_BITSSETSTOP
                       | P_SCHEDULERLOCKEDXED;
```

```
P_FULLCOUNTSTOP       = Q_RUN           & CHECKBITS & CTR0      & CTR1      &
                        CTR2            & CTR3      & CTR4;

P_BITSSETSTOP         = Q_RUN           & CHECKBITS & ANYBITX   & !Q_INIT;

S_HOLDCTR             = P_STARTSCHEDULE;

R_HOLDCTR             = P_BEGINSCHEDULE
                      | P_RESET;

P_BEGINSCHEDULE       = !Q_SELECTVME;

LOADNEXTX             = P_ENDSCHEDULE;

SCHEDULERDONEX        = P_FINISHED
                      | P_SCHEDULERLOCKEDXED
                      | P_WRTRAM;

P_FINISHED            = !Q_RUN;

P_WRTRAM              = Q_WRTRAM;

S_WRTRAM              = P_SETWRTRAM
                      | P_RESET;

R_WRTRAM              = P_RSTWRTRAM;

P_SETWRTRAM           = Q_INIT          & !Q_WRTRAM;

P_RSTWRTRAM           = !CHECKBITS      & Q_WRTRAM & !VMERESET;
```

APPENDICE B

```
title   {       Device: PLS506
                Machine: BELOBOX
                Module: PSI
                Purpose: PREEMPTOR SEQUENCER
                Engineer: DAVE
                Date: 6 AUG 92
                Part Number: 093016-001
                Version: A.0
}
include a506;
define  SELACTNEXT          = !pin2;
define  VMERESET            = !pin3;
define  ACTIVEGTNEXT        = !pin4;
define  ACTIVEEQUNEXT       = !pin5;
define  LOADNEXT2           =  pin6;
define  LOADNEXT3           =  pin7;
define  CLUSTERSELECT1      =  pin8;
define  CLUSTERSELECT0      =  pin9;
define  CPUSELECT1          =  pin10;
define  CPUSELECT0          =  pin11;
define  S_LOADACTIVE        =  pin13.s;
define  R_LOADACTIVE        =  pin13.r;
define  REDORNEXT           =  pin14;
define  WRTORNEXT           =  pin15;
define  S_SCHEDINT          =  pin16.s;
define  R_SCHEDINT          =  pin16.r;
define  SELPREENEXT         = !pin17;
define  LOADNEXT1           =  pin18;
define  LOADNEXT0           =  pin19;
define  ADDRESS07           =  pin20;
define  ADDRESS04           =  pin21;
define  ADDRESS05           =  pin22;
define  ADDRESS06           =  pin23;
define  Q_RUN               =  p0.q;
```

```
define  S_RUN            = p0.s;
define  R_RUN            = p0.r;
define  Q_INTRPT         = p1.q;
define  S_INTRPT         = p1.s;
define  R_INTRPT         = p1.r;
define  Q_SELECTVME      = p2.q;
define  S_SELECTVME      = p2.s;
define  R_SELECTVME      = p2.r;
define  Q_CL1            = p3.q;
define  S_CL1            = p3.s;
define  R_CL1            = p3.r;
define  Q_CL0            = p4.q;
define  S_CL0            = p4.s;
define  R_CL0            = p4.r;
define  Q_CMP            = p5.q;
define  S_CMP            = p5.s;
define  R_CMP            = p5.r;
define  Q_CP1            = p6.q;
define  S_CP1            = p6.s;
define  R_CP1            = p6.r;
define  Q_CP0            = p7.q;
define  S_CP0            = p7.s;
define  R_CP0            = p7.r;
define  Q_ADR1           = p8.q;
define  S_ADR1           = p8.s;
define  R_ADR1           = p8.r;
define  Q_ADR0           = p9.q;
define  S_ADR0           = p9.s;
define  R_ADR0           = p9.r;
define  Q_NEWPROC0       = p10.q;
define  S_NEWPROC0       = p10.s;
define  R_NEWPROC0       = p10.r;
define  Q_NEWPROC1       = p11.q;
define  S_NEWPROC1       = p11.s;
define  R_NEWPROC1       = p11.r;
define  Q_NEWPROC2       = p12.q;
define  S_NEWPROC2       = p12.s;
define  R_NEWPROC2       = p12.r;
define  Q_NEWPROC3       = p13.q;
define  S_NEWPROC3       = p13.s;
define  R_NEWPROC3       = p13.r;
define  Q_INIT           = p14.q;
define  S_INIT           = p14.s;
define  R_INIT           = p14.r;
define  Q_8MHZ           = p15.q;
define  S_8MHZ           = p15.s;
define  R_8MHZ           = p15.r;
define  C_RSTSELECTVME   = c0;
define  C_SETSELECTVME   = 1c0;
define  P_RESET          = pt00;
define  P_NRUN           = pt01;
define  P_RST8MHZ        = pt02;
define  P_SET8MHZ        = pt03;
define  P_RSTINIT        = pt04;
define  P_SETRUN0        = pt05;
define  P_SETRUN1        = pt06;
define  P_SETRUN2        = pt07;
define  P_SETRUN3        = pt08;
define  P_RSTRUN0        = pt09;
define  P_NSELECTVME     = pt10;
define  P_SETINTRPT0     = pt11;
define  P_SETINTRPT1     = pt12;
define  P_SETINTRPT2     = pt13;
define  P_RSTINTRPT0     = pt14;
define  P_RSTINTRPT1     = pt15;
define  P_RSTINTRPT2     = pt16;
define  P_RSTINTRPT3     = pt17;
define  P_RSTINTRPT4     = pt18;
define  P_RSTINTRPT5     = pt19;
define  P_SETSELECTVME   = pt20;
define  P_RSTSELECTVME   = pt21;
define  P_SETCL1A        = pt22;
define  P_SETCL1B        = pt23;
define  P_SETCL0A        = pt24;
define  P_SETCL0B        = pt25;
define  P_RSTCL1A        = pt26;
```

```
define   P_RSTCL1B           =  pt27;
define   P_RSTCL0A           =  pt28;
define   P_RSTCL0B           =  pt29;
define   P_SETCMP            =  pt30;
define   P_RSTCMP            =  pt31;
define   P_SETCP1            =  pt32;
define   P_RSTCP1            =  pt33;
define   P_SETCP0            =  pt34;
define   P_RSTCP0            =  pt35;
define   P_SETADR1A          =  pt36;
define   P_SETADR1B          =  pt37;
define   P_RSTADR1A          =  pt38;
define   P_RSTADR1B          =  pt39;
define   P_SETADR0A          =  pt40;
define   P_SETADR0B          =  pt41;
define   P_RSTADR0A          =  pt42;
define   P_RSTADR0B          =  pt43;
define   P_SETNEWPROC0       =  pt44;
define   P_SETNEWPROC1       =  pt45;
define   P_SETNEWPROC2       =  pt46;
define   P_SETNEWPROC3       =  pt47;
define   P_RSTNEWPROC0       =  pt48;
define   P_RSTNEWPROC1       =  pt49;
define   P_RSTNEWPROC2       =  pt50;
define   P_RSTNEWPROC3       =  pt51;
define   P_CPUSELECT0A       =  pt52;
define   P_CPUSELECT0B       =  pt53;
define   P_CPUSELECT0C       =  pt54;
define   P_CPUSELECT1A       =  pt55;
define   P_CPUSELECT1B       =  pt56;
define   P_CPUSELECT1C       =  pt57;
define   P_CLUSTERSELECT0A   =  pt58;
define   P_CLUSTERSELECT0B   =  pt59;
define   P_CLUSTERSELECT1A   =  pt60;
define   P_CLUSTERSELECT1B   =  pt61;
define   P_SETSCHEDINT       =  pt62;
define   P_RSTSCHEDINT       =  pt63;
define   P_SETLOADACTIVE     =  pt64;
define   P_WRTORNEXTA        =  pt65;
define   P_WRTORNEXTB        =  pt66;
define   P_REDORNEXT         =  pt67;
define   P_RSTINTRPT6        =  pt68;
define   P_RSTLOADACTIVE     =  pt69;
define   P_CPUSELECT0D       =  pt70;
define   P_CPUSELECT1D       =  pt71;
define   P_CLUSTERSELECT0C   =  pt72;
define   P_CLUSTERSELECT1C   =  pt73;

oe = 1;

S_8MHZ            = P_SET8MHZ;

R_8MHZ            = P_RESET
                  | P_NSELECTVME
                  | P_NRUN
                  | P_RST8MHZ;

P_SET8MHZ         = Q_RUN          & !Q_8MHZ        & !VMERESET;

P_RESET           = VMERESET;

P_NRUN            = !Q_RUN;

P_RST8MHZ         = Q_RUN          & Q_8MHZ;

S_INIT            = P_RESET;

R_INIT            = P_RSTINIT;

P_RSTINIT         = !Q_NEWPROC0    & !Q_NEWPROC1    & !Q_NEWPROC2    & !Q_NEWPROC3
     &
                    !Q_RUN         & Q_INIT         & !VMERESET;
```

```
S_RUN              = P_SETRUN0
                   | P_SETRUN1
                   | P_SETRUN2
                   | P_SETRUN3;

R_RUN              = P_RESET
                   | P_RSTRUN0;

P_SETRUN0          = !Q_RUN            & Q_NEWPROC0      & !Q_INTRPT        &
                     !SELPREENEXT      & !SELACTNEXT     & !VMERESET        &
                     !Q_SELECTVME;

P_SETRUN1          = !Q_RUN            & Q_NEWPROC1      & !Q_INTRPT        &
                     !SELPREENEXT      & !SELACTNEXT     & !VMERESET        &
                     !Q_SELECTVME;

P_SETRUN2          = !Q_RUN            & Q_NEWPROC2      & !Q_INTRPT        &
                     !SELPREENEXT      & !SELACTNEXT     & !VMERESET        &
                     !Q_SELECTVME;

P_SETRUN3          = !Q_RUN            & Q_NEWPROC3      & !Q_INTRPT        &
                     !SELPREENEXT      & !SELACTNEXT     & !VMERESET        &
                     !Q_SELECTVME;

P_RSTRUN0          = Q_RUN             & Q_CMP           & Q_8MHZ;

S_INTRPT           = P_SETINTRPT0
                   | P_SETINTRPT1
                   | P_SETINTRPT2;

R_INTRPT           = P_RSTINTRPT0
                   | P_RSTINTRPT1
                   | P_RSTINTRPT2
                   | P_RSTINTRPT3
                   | P_RSTINTRPT4
                   | P_RSTINTRPT5
                   | P_RSTINTRPT6
                   | P_RESET;

P_SETINTRPT0       = Q_RUN             & !Q_INTRPT       & !Q_CMP           & !Q_ADR0 &
                     !Q_ADR1           & !VMERESET;

P_SETINTRPT1       = Q_RUN             & !Q_INTRPT       & !Q_CMP           & !Q_INIT &
                     Q_8MHZ            & ACTIVEGTNEXT    & !VMERESET;

P_SETINTRPT2       = Q_RUN             & !Q_INTRPT       & Q_8MHZ           & Q_CMP   &
                     !ACTIVEGTNEXT     & !ACTIVEEQUNEXT  & !Q_INIT          & !VMERESET;

P_RSTINTRPT0       = Q_RUN             & Q_INTRPT        & !Q_CMP           &
                     Q_8MHZ            & !Q_INIT;

P_RSTINTRPT1       = !Q_RUN            & Q_SELECTVME     & !SELACTNEXT      &
                     SELPREENEXT;

P_RSTINTRPT2       = !Q_RUN            & Q_SELECTVME     & SELACTNEXT       &
                     SELPREENEXT       & !Q_CL1          & !Q_CL0           &
                     !ADDRESS07        & !ADDRESS06;

P_RSTINTRPT3       = !Q_RUN            & Q_SELECTVME     & SELACTNEXT       &
                     SELPREENEXT       & !Q_CL1          & Q_CL0            &
                     !ADDRESS07        & ADDRESS06;

P_RSTINTRPT4       = !Q_RUN            & Q_SELECTVME     & SELACTNEXT       &
                     SELPREENEXT       & Q_CL1           & !Q_CL0           &
                     ADDRESS07         & !ADDRESS06;

P_RSTINTRPT5       = !Q_RUN            & Q_SELECTVME     & SELACTNEXT       &
                     SELPREENEXT       & Q_CL1           & Q_CL0            &
                     ADDRESS07         & ADDRESS06;

P_RSTINTRPT6       = Q_RUN             & Q_INTRPT        & Q_INIT           &
```

```
                    - Q_8MHZ        & Q_ADR0        & Q_ADR1;

S_SELECTVME     = P_SETSELECTVME;

R_SELECTVME     = P_RSTSELECTVME
                | P_RESET;

P_SETSELECTVME  = !Q_INIT        & !Q_RUN         & C_SETSELECTVME & !VMERESET;

C_RSTSELECTVME  = P_RSTSELECTVME;

P_RSTSELECTVME  = !SELACTNEXT    & !SELPREENEXT;

S_CL1           = P_SETCL1A
                | P_SETCL1B;

R_CL1           = P_RSTCL1A
                | P_RSTCL1B
                | P_RESET;

P_SETCL1A       = !Q_RUN         & !Q_INTRPT      & !Q_SELECTVME   &
                  !Q_NEWPROC0    & !Q_NEWPROC1    & Q_NEWPROC2     &
                  !SELACTNEXT    & !SELPREENEXT   & !VMERESET;

P_SETCL1B       = !Q_RUN         & !Q_INTRPT      & !Q_SELECTVME   &
                  !Q_NEWPROC0    & !Q_NEWPROC1    & Q_NEWPROC3     &
                  !SELACTNEXT    & !SELPREENEXT   & !VMERESET;

P_RSTCL1A       = !Q_RUN         & !Q_INTRPT      & Q_NEWPROC0     &
                  !Q_SELECTVME   & !SELACTNEXT    & !SELPREENEXT;

P_RSTCL1B       = !Q_RUN         & !Q_INTRPT      & Q_NEWPROC1     &
                  !Q_SELECTVME   & !SELACTNEXT    & !SELPREENEXT;

S_CL0           = P_SETCL0A
                | P_SETCL0B;

R_CL0           = P_RSTCL0A
                | P_RSTCL0B
                | P_RESET;

P_SETCL0A       = !Q_RUN         & !Q_INTRPT      & !Q_SELECTVME   &
                  !Q_NEWPROC0    & Q_NEWPROC1     & !SELACTNEXT    &
                  !SELPREENEXT   & !VMERESET;

P_SETCL0B       = !Q_RUN         & !Q_INTRPT      & !Q_SELECTVME   &
                  !Q_NEWPROC0    & !Q_NEWPROC2    & Q_NEWPROC3     &
                  !SELACTNEXT    & !SELPREENEXT   & !VMERESET;

P_RSTCL0A       = !Q_RUN         & !Q_INTRPT      & Q_NEWPROC0     &
                  !Q_SELECTVME   & !SELACTNEXT    & !SELPREENEXT;

P_RSTCL0B       = !Q_RUN         & !Q_INTRPT      & !Q_NEWPROC1    &
                  !Q_SELECTVME   & !SELACTNEXT    & !SELPREENEXT   &
                  Q_NEWPROC2;

S_CMP           = P_SETCMP;

R_CMP           = P_RESET
                | P_RSTCMP
                | P_NRUN;

P_SETCMP        = Q_RUN          & Q_8MHZ         & !ACTIVEGTNEXT  &
                  Q_ADR0         & Q_ADR1         & !VMERESET;

P_RSTCMP        = Q_CMP          & Q_8MHZ;

S_CP1           = P_SETCP1;

R_CP1           = P_RSTCP1
                | P_RESET;
```

```
P_SETCP1        = Q_RUN          & Q_INTRPT        & Q_ADR1         &
                  !Q_INIT         & !VMERESET;

P_RSTCP1        = Q_RUN          & Q_INTRPT        & !Q_ADR1        & !Q_INIT;

S_CP0           = P_SETCP0;

R_CP0           = P_RSTCP0
                | P_RESET;

P_SETCP0        = Q_RUN          & Q_INTRPT        & Q_ADR0         &
                  !Q_INIT         & !VMERESET;

P_RSTCP0        = Q_RUN          & Q_INTRPT        & !Q_ADR0        & !Q_INIT;

S_ADR1          = P_SETADR1A
                | P_SETADR1B;

R_ADR1          = P_RSTADR1A
                | P_RSTADR1B
                | P_NRUN
                | P_RESET;

P_SETADR1A      = Q_RUN          & Q_8MHZ          & !Q_ADR1        & Q_ADR0 &
                  !Q_CMP          & !ACTIVEGTNEXT   & !VMERESET;

P_SETADR1B      = Q_RUN          & Q_8MHZ          & !Q_ADR1        & Q_ADR0 &
                  !Q_CMP          & Q_INTRPT        & !VMERESET;

P_RSTADR1A      = Q_RUN          & Q_8MHZ          & Q_ADR1         & Q_ADR0 &
                  !Q_CMP          & !ACTIVEGTNEXT;

P_RSTADR1B      = Q_RUN          & Q_8MHZ          & Q_ADR1         & Q_ADR0 &
                  !Q_CMP          & Q_INTRPT;

S_ADR0          = P_SETADR0A
                | P_SETADR0B;

R_ADR0          = P_RSTADR0A
                | P_RSTADR0B
                | P_NRUN
                | P_RESET;

P_SETADR0A      = Q_RUN          & Q_8MHZ          & !Q_ADR0        & !Q_CMP &
                  !ACTIVEGTNEXT   & !VMERESET;

P_SETADR0B      = Q_RUN          & Q_8MHZ          & !Q_ADR0        & !Q_CMP &
                  Q_INTRPT        & !VMERESET;

P_RSTADR0A      = Q_RUN          & Q_8MHZ          & Q_ADR0         & !Q_CMP &
                  !ACTIVEGTNEXT;

P_RSTADR0B      = Q_RUN          & Q_8MHZ          & Q_ADR0         & !Q_CMP &
                  Q_INTRPT;

S_NEWPROC0      = P_SETNEWPROC0
                | P_RESET;

R_NEWPROC0      = P_RSTNEWPROC0;

P_SETNEWPROC0   = LOADNEXT0      & !Q_INIT;

P_RSTNEWPROC0   = !LOADNEXT0     & Q_CMP           & Q_8MHZ         & !Q_CL1 &
                  !Q_CL0          & !VMERESET;

S_NEWPROC1      = P_SETNEWPROC1
                | P_RESET;

R_NEWPROC1      = P_RSTNEWPROC1;

P_SETNEWPROC1   = LOADNEXT1      & !Q_INIT;
```

```
P_RSTNEWPROC1      = !LOADNEXT1      & Q_CMP           & Q_8MHZ          & !Q_CL1 &
                     Q_CL0           & !VMERESET;

S_NEWPROC2         = P_SETNEWPROC2
                   | P_RESET;

R_NEWPROC2         = P_RSTNEWPROC2;

P_SETNEWPROC2      = LOADNEXT2       & !Q_INIT;

P_RSTNEWPROC2      = !LOADNEXT2      & Q_CMP           & Q_8MHZ          & Q_CL1 &
                     !Q_CL0          & !VMERESET;

S_NEWPROC3         = P_SETNEWPROC3
                   | P_RESET;

R_NEWPROC3         = P_RSTNEWPROC3;

P_SETNEWPROC3      = LOADNEXT3       & !Q_INIT;

P_RSTNEWPROC3      = !LOADNEXT3      & Q_CMP           & Q_8MHZ          & Q_CL1 &
                     Q_CL0           & !VMERESET;

CPUSELECT0         = P_CPUSELECT0A
                   | P_CPUSELECT0B
                   | P_CPUSELECT0C
                   | P_CPUSELECT0D;

P_CPUSELECT0A      = !Q_SELECTVME    & Q_RUN           & Q_ADR0;

P_CPUSELECT0B      = !Q_SELECTVME    & !Q_RUN          & Q_CP0;

P_CPUSELECT0C      = Q_SELECTVME     & SELACTNEXT      & ADDRESS04;

P_CPUSELECT0D      = Q_SELECTVME     & !SELACTNEXT     & Q_CP0;

CPUSELECT1         = P_CPUSELECT1A
                   | P_CPUSELECT1B
                   | P_CPUSELECT1C
                   | P_CPUSELECT1D;

P_CPUSELECT1A      = !Q_SELECTVME    & Q_RUN           & Q_ADR1;

P_CPUSELECT1B      = !Q_SELECTVME    & !Q_RUN          & Q_CP1;

P_CPUSELECT1C      = Q_SELECTVME     & SELACTNEXT      & ADDRESS05;

P_CPUSELECT1D      = Q_SELECTVME     & !SELACTNEXT     & Q_CP1;

CLUSTERSELECT0     = P_CLUSTERSELECT0A
                   | P_CLUSTERSELECT0B
                   | P_CLUSTERSELECT0C;

P_CLUSTERSELECT0A  = !Q_SELECTVME    & Q_CL0;

P_CLUSTERSELECT0B  = Q_SELECTVME     & SELACTNEXT      & ADDRESS06;

P_CLUSTERSELECT0C  = Q_SELECTVME     & !SELACTNEXT     & Q_CL0;

CLUSTERSELECT1     = P_CLUSTERSELECT1A
                   | P_CLUSTERSELECT1B
                   | P_CLUSTERSELECT1C;

P_CLUSTERSELECT1A  = !Q_SELECTVME    & Q_CL1;

P_CLUSTERSELECT1B  = Q_SELECTVME     & SELACTNEXT      & ADDRESS07;

P_CLUSTERSELECT1C  = Q_SELECTVME     & !SELACTNEXT     & Q_CL1;

S_SCHEDINT         = P_SETSCHEDINT;
```

```
R_SCHEDINT        = P_RSTSCHEDINT
                  | P_RESET;

P_SETSCHEDINT     = !Q_INIT      & !Q_RUN      & Q_INTRPT     & !VMERESET;

P_RSTSCHEDINT     = !Q_INTRPT;

S_LOADACTIVE      = P_SETLOADACTIVE;

R_LOADACTIVE      = P_RSTLOADACTIVE
                  | P_RESET;

P_SETLOADACTIVE   = Q_RUN        & Q_INTRPT    & !Q_INIT      & !VMERESET;

P_RSTLOADACTIVE   = !Q_INTRPT;

WRTORNEXT         = P_WRTORNEXTA
                  | P_WRTORNEXTB;

P_WRTORNEXTA      = Q_RUN        & !Q_INIT     & !Q_SELECTVME & Q_CMP;

P_WRTORNEXTB      = Q_RUN        & Q_INIT      & Q_8MHZ;

REDORNEXT         = P_REDORNEXT;

P_REDORNEXT       = Q_RUN        & !Q_INIT     & !Q_SELECTVME;
```

What is claimed is:

1. A general-purpose hardware process scheduler for scheduling a process for execution by a processor in a parallel processing data processing system, the process having a processing priority number indicative of system processing significance, comprising:
   storage means for storing a priority number associated with each process requesting execution by the processor;
   means, connected to the storage means, for selecting a process priority number having the greatest system processing significance from among the priority numbers stored in the storage means;
   means, connected to the storage means and responsive to the selecting means, for reading the selected process priority number from the storage means; and
   means, responsive to the selecting means, for indicating to the data processing system that the selecting means has selected a process priority number.

2. The process scheduler of claim 1, wherein the storage means comprises a register having a plurality of storage locations, wherein the storage locations are individually addressable by the processor.

3. The process scheduler of claim 1, wherein the storage means comprises a random access memory having a plurality of storage locations, and wherein the storage locations are individually addressable by the processor.

4. The process scheduler of claim 1, wherein the selecting means comprises a priority encoder, and wherein the priority encoder selects the most significant priority number in the storage means.

5. A general-purpose hardware processor interrupter for interrupting a processor in a parallel processing data processing system, the data processing system having a waiting process awaiting execution on the processor and an active process executing on the processor, the active and waiting processes having active and waiting processing priority numbers, respectively, indicative of system processing significance, and wherein the processor interrupter interrupts the processor whenever the waiting process priority number is greater than the active process priority number, comprising:
   first storage means for storing the waiting process priority numbers;
   means, connected to the first storage means, for inserting the waiting process priority numbers into the processor interrupter;
   second storage means for storing the active process priority numbers;
   means, connected to the second storage means, for accessing the second storage means;
   means, connected to the first storage means and the second storage means, for comparing the waiting process priority numbers stored in the first storage means with the active process priority numbers stored in the second storage means, wherein said comparing means generates a first signal when a waiting process priority number has a greater value than an active process priority number; and
   means, connected to the first storage means, the second storage means, the inserting means, the accessing means, and the comparing means for controlling the operation of the processor interrupter, wherein the controlling means generates a second signal to interrupt the processor in response to generation of the first signal.

6. The processor interrupter of claim 5, wherein the first storage means comprises a plurality of registers.

7. The processor interrupter of claim 5, wherein the second storage means comprises a random access memory.

8. The processor interrupter of claim 5, wherein the comparing means comprises:

means for selecting a process priority number having the lowest system processing significance from among the priority numbers stored in the second storage means;

third storage means, connected to the selecting means, for storing the selected process priority number; and a comparator having a first input operatively connected to the first storage means and a second input operatively connected to the third storage means.

9. The processor interrupter of claim 5, wherein the controlling means comprises a programmable logic sequencer.

* * * * *